(12) United States Patent
Crawley

(10) Patent No.: US 8,540,926 B2
(45) Date of Patent: Sep. 24, 2013

(54) PROFILING OF TUBES

(76) Inventor: Alan Mark Crawley, Redwoodtown (NZ)

( * ) Notice: Subject to any disclaimer, the term of this patent is extended or adjusted under 35 U.S.C. 154(b) by 644 days.

(21) Appl. No.: 12/094,244

(22) PCT Filed: Nov. 20, 2006

(86) PCT No.: PCT/NZ2006/000306
§ 371 (c)(1),
(2), (4) Date: Jan. 21, 2009

(87) PCT Pub. No.: WO2007/058553
PCT Pub. Date: May 24, 2007

(65) Prior Publication Data
US 2009/0283608 A1    Nov. 19, 2009

(30) Foreign Application Priority Data

Nov. 18, 2005 (NZ) ........................................ 540110
Jun. 2, 2006 (NZ) ........................................ 547642

(51) Int. Cl.
*B29C 59/00* (2006.01)
*B29C 49/00* (2006.01)
*B29D 23/00* (2006.01)
*A47G 21/18* (2006.01)

(52) U.S. Cl.
USPC ........... 264/506; 264/509; 264/523; 264/573; 425/522; 239/33

(58) Field of Classification Search
None
See application file for complete search history.

(56) References Cited

U.S. PATENT DOCUMENTS

| | | | | | |
|---|---|---|---|---|---|
| 781,939 | A | * | 2/1905 | Fulton | 220/565 |
| 2,077,653 | A | * | 4/1937 | Westin | 138/119 |
| 3,194,705 | A | * | 7/1965 | Caplan | 264/506 |
| 3,346,187 | A | * | 10/1967 | Mueller | 239/33 |
| 3,409,224 | A | * | 11/1968 | Harp et al. | 239/33 |
| 3,844,700 | A | * | 10/1974 | Sokolow | 425/526 |
| 3,914,101 | A | * | 10/1975 | Stefanka | 425/387.1 |
| 4,017,244 | A | * | 4/1977 | Vellani | 425/326.1 |
| 4,266,926 | A | * | 5/1981 | Gordon | 425/387.1 |
| 4,609,113 | A | * | 9/1986 | Seki | 215/382 |
| 5,839,653 | A | * | 11/1998 | Zadravetz | 229/403 |
| 6,887,418 | B2 | * | 5/2005 | Olaru et al. | 264/328.1 |

FOREIGN PATENT DOCUMENTS

| | | | |
|---|---|---|---|
| DE | 4402295 C1 | * | 10/1995 |
| JP | 06134887 A | * | 5/1994 |
| JP | 08019462 A | * | 1/1996 |
| JP | 08029714 A | * | 2/1996 |

* cited by examiner

*Primary Examiner* — Benjamin Schiffman
(74) *Attorney, Agent, or Firm* — Laubscher & Laubscher, p.C.

(57) ABSTRACT

A method of, and apparatus for, profiling a tube to form at least one profiled product having a first open end and a second open end. The tube (30) is supported on a support (19) which supports the tube along at least a substantial part of the length of the tube corresponding to the product(s) to be formed. At least a portion of the tube is heated to form at least one heat-softened portion of the tube in the region(s) corresponding to the product(s) to be formed. A fluid pressure change (28) is applied to the region(s) of the tube corresponding to the product(s) to be formed to form at least one profiled product having a first open end, a second open end, and a predetermined shape with one or more three dimensional profile features.

15 Claims, 53 Drawing Sheets

Prior Art

PROFILING OF TUBES

FIELD OF THE INVENTION

This invention relates to the profiling of tubes. In one or more preferred embodiments, the invention relates to a method of profiling a tube with a first open end and second open end to form at least one profiled product having a first open end and second open end, whereby any combination of geometric profiles, contours or shapes may be formed in the or each product, each profile, contour or shape either increasing, decreasing or maintaining the original mean diameter of the tube and whether running circumferentially, diametrally or longitudinally along the length of the tube, and where one or more products may be formed per tube, each as-formed product having a first open end and second open end. Alternative aspects of the invention relate to a drinking straw, a cup, and a bottle.

BACKGROUND

In broad definition, a tube may be any hollow object that has at least a first open end and second open end. There are many kinds of products in the market based on a tube.

Relative to drinking straws, and since its advent in time immemorial, the drinking straw has always been a tube with a first open end and second open end and of circular cross section. Prior to the existence of manufactured drinking straws, the circular shape was as a result of drinking straws being little more than a length of hollow rye grass or the like.

In 1888, Marvin Stone invented the first manufactured drinking straw by spiral winding paper around a circular shaft and gluing it together.

In current day production, the material of choice is plastic, and most typically polypropylene, and the production method of choice is extrusion. With the process of extrusion, many cross-sectional forms can be generated, however drinking straws have typically remained of circular cross section.

With the ever increasing need to achieve higher production rates in order to minimise unit production costs, one of the main production bottlenecks is the grooving of drinking straws to create one or more flexible sections. Currently extruders can produce in excess of 1,200 drinking straws per minute while the fastest grooving machines typically can only operate at speeds in the order of 600 drinking straws per minute. This upper limit speed of drinking straw grooving is principally dependent on the number of grooves being formed down the length of the drinking straw.

There are a number of existing methods relative to forming corrugations or grooves in a drinking straw.

U.S. Pat. No. 2,631,645, U.S. Pat. No. 2,985,077 and U.S. Pat. No. 3,242,828 teach a range of methods of corrugating or circumferentially grooving sections of a drinking straw by means of various blades or dies rotating around the exterior surface of the drinking straw with the purpose of deforming the surface into corrugations or grooves.

U.S. Pat. No. 3,339,004 teaches a method of corrugating or circumferentially grooving a section of a drinking straw by means of inserting rods into each end of a drinking straw, clamping the drinking straw on to the rods, then moving the rods towards each other thereby causing the drinking straw section entrapped between the rods to collapse and form into pleats.

U.S. Pat. No. 3,751,541 teaches a method of corrugating or circumferentially grooving a section of a drinking straw by means of an external mould that moves at the same speed as the drinking straw tube as it exits the extrusion die head and whereby a vacuum is applied to the outside of the drinking straw to draw the drinking straw into the mould where it assumes the external configuration of the mould cavity.

U.S. Pat. No. 4,613,474 teaches a method of corrugating or circumferentially grooving a section of a drinking straw by inserting up inside the drinking straw a grooved mandrel and then rotating the drinking straw and grooved mandrel over external and similarly grooved bars or dies, whereby the drinking straw is deformed to assume the externally grooved configuration of the mandrel.

U.S. Pat. No. 6,685,103 teaches a method of longitudinally grooving a section of a drinking straw by means of inserting a shaped mandrel up inside the drinking straw and deforming the drinking straw to assume the external configuration of the mandrel by means of external rollers.

There are also a number of existing methods relative to forming corrugations or grooves in tubes for applications other than drinking straws.

U.S. Pat. No. 3,021,245 teaches a method of corrugating or circumferentially grooving a section of a tube by applying material to the surface of a shaped mandrel, applying a vacuum to draw the material to conform to the external configuration of the mandrel, using an external mould if necessary to assist with forming the external shape of the tube, then pressurising inside the mandrel in order to expand the tube so it can be removed from the mandrel.

U.S. Pat. No. 3,949,045 teaches a method of forming a pipe coupling by means of a pipe being softened by heat then placed inside an external mould while an expandable mandrel is inserted inside the pipe, and whereby on the mechanical expansion of the mandrel, the pipe is deformed into the external configuration of the mould cavity to form a pipe coupling.

U.S. Pat. No. 5,529,743, U.S. Pat. No. 6,170,535 and U.S. Pat. No. 6,508,275 teach variations of a method of corrugating or circumferentially grooving sections of a tube by means of extruding a parison of thermoplastic material, placing the still hot parison into a mould, then blow moulding the parison such that it expands outwardly under pressure to assume the external configuration of the mould cavity.

The major drawbacks in the existing methods become apparent when one seeks to achieve the maximum possible extent of surface profiling, contouring, shaping, corrugating or circumferential grooving whilst at the same time achieve the maximum possible production speed.

While there are a number of methods that deform the surface of a drinking straw into corrugations or grooves through the use of various mandrels, dies and rotating blades, the method that has proven to yield the highest production rate with the highest degree of consistency is the method as taught by U.S. Pat. No. 4,613,474.

The method currently adopted in the marketplace as the standard is based on the insertion of a grooved mandrel up inside the drinking straw followed by the rolling of the drinking straw and the grooved mandrel between external and similarly grooved dies. As already stated, such machines can operate at production speeds in the order of 600 drinking straws per minute.

With the existing method however, once the grooves in the drinking straw have been formed through the deformation process, difficulty arises in maintaining the straightness of the flexible drinking straw.

This difficulty is accentuated as either production speed is increased or the number of grooves down the length of the drinking straw is increased and standard practice has shown that production speeds in the order of 600 drinking straws per minute are typically only achievable when in the order of 10 to 12 grooves are formed at one time. Any increase in the number of grooves to improve drinking straw flexibility results in a necessary reduction in production speed in order to maintain straightness.

As a production process, blow moulding allows any reasonable combination of surface shapes to be formed without using an internal mandrel that conforms to the inner surface of the product being produced. The existing methods for the production of corrugated bottles, tubes and the like are typically based on the blow moulding method of extruding a parison, and then while the parison is still hot, placing the parison in an external mould and using pressure to conform the parison to the configuration of the mould cavity.

While as a process this maximises the range of shapes that can be formed, the process of extruding parisons is slow compared to that of current day extruders. A typical parison extruder produces in the order of 4 to 6 parisons per minute.

The slow production rate of this style of machinery was also an issue relative to the requirement of high speed blow moulding of plastic bottles, particularly for the beverage sector. To resolve this production speed bottleneck, a new method of blow moulding was introduced as taught by U.S. Pat. No. 3,969,060.

U.S. Pat. No. 3,969,060 teaches a method of blow moulding bottles based on the deformation of a tubular slug of thermoplastic material. The slug, or preform as it is known, is produced in an injection-moulding process then at a later time it is inserted into a stretch blow-moulding machine whereby the preform is heated then expanded outwardly under pressure to assume the configuration of the cavity of an external mould.

Irrespective of which blow moulding technique is used, whether blow moulding from a parison extruded directly on a blow-moulding machine or from an externally produced preform, all of these processes are typically based on a closed-loop system, that is where there is only one open end such that the product can be expanded or 'blown' outwardly under pressure, as with air being pumped in to expand or 'blow up' a balloon.

In order to achieve the highest production speed possible for any form of tube, the primary production method should preferably be via high-speed extrusion, however irrespective of the method of tube construction or the tube profile, whether circular or any other cross-sectional form, a tube is open-loop, that is it has a first open end and a second open end. A tube therefore is not inherently suitable for known blow moulding processes.

U.S. Pat. No. 3,079,637 teaches a method of bottle production based on the re-heating of an extruded tube by the placing of the tube on a mandrel, applying heat to soften the tube, placing the heated tube and mandrel in a mould whereby the mould pinches dosed one end of the tube and then conforms the heated tube to the mould cavity through the application of blow-moulding techniques to produce a bottle with only one open end.

U.S. Pat. No. 3,149,373 teaches the same method as U.S. Pat. No. 3,079,637 with the addition of teaching a plurality of tubes and mandrels blow-moulded at the same time, each individual tube and mandrel producing only one bottle in each mould cycle and each bottle having only one open end.

U.S. Pat. No. 3,449,792 teaches a similar method to U.S. Pat. No. 3,079,637 and U.S. Pat. No. 3,149,373. The apparatus in this specification uses a separate member to grip the unsupported end of the tube in an attempt to symmetrically centre the unsupported end of the tube after the heating process, due to frozen-in stresses from the extrusion process that cause the tube to assume a 'banana' shape during re-heating of the tube on the mandrel in a significant percentage of cases.

The above three patents teach only the production of a single bottle out of a tube. The mandrel as taught is a wireframe arrangement that does not extend through the full length of the tube and does not fully support the tube as the tube is re-heated.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

The object of at least preferred embodiments of the present invention is to overcome some of the disadvantages with the existing apparatuses or methods, or to at least provide a useful alternative choice.

SUMMARY OF THE INVENTION

The term "comprising" as used in this specification means "consisting at least in part of"; that is to say when interpreting statements in this specification which include "comprising", the features prefaced by this term in each statement all need to be present but other features can also be present. Related terms such as "comprise" and "comprised" are to be interpreted in similar manner.

In accordance with a first aspect of the present invention, there is provided a method of profiling a tube to form at least one profiled product having a first open end and a second open end, comprising: providing a tube having a first open end and second open end; supporting the tube on a support which supports the tube along at least a substantial part of the length of the tube corresponding to the product(s) to be formed, heating at least a portion of the tube to form at least one heat-softened portion of the tube in the region(s) corresponding to the product(s) to be formed; and applying a fluid pressure change to the region(s) of the tube corresponding to the product(s) to be formed to form at least one profiled product having a first open end, a second open end, and a predetermined shape with one or more three dimensional profile features.

The pressure change is effected by application of a fluid. The fluid may be a liquid, but more preferably is a gas. The fluid or gas required to effect the pressure change may be any fluid or gas suitable for blow-moulding purposes. The fluid or gas may be at any temperature suitable for blow-moulding purposes. The preferred fluid or gas is air at an elevated temperature to assist with the heat-forming process.

The method may comprise forming a plurality of profiled products from the tube on the support and, following the forming of the products separating the products from one another.

The support may extend substantially the length of all of the products to be formed.

Alternatively, the support may extend beyond the entire length of the product(s) to be formed. Preferably, the support extends beyond the length of the tube.

In one embodiment, the tube is profiled using one or more shaped moulds, and the tube is at least partly sealed by pinching an end of the tube between the support and the mould(s).

The method may comprise at least partly sealing at least one of the first and second open ends of the tube prior to applying the fluid pressure change. The fluid pressure change may be applied in the interior of the heat-softened portion(s)

of the tube in one or more shaped moulds to deform the heat-softened portion(s) of the tube.

The method may comprise separating the at least partly sealed end(s) of the tube from the profiled product(s) post-profiling.

The method may comprise applying a pressure change around the exterior of the heat-softened portion(s) of the tube in one or more shaped moulds.

The support may be substantially rigid. Additionally, the support may be substantially solid. A substantially rigid support is one that is sufficiently rigid to minimise or prevent any undesired lateral deformation of the tube when it is in the heated state. The support thereby preferably maintains a longitudinal axis of the tube substantially straight when in the heated state.

The support or fixture may be in any number of forms, including but by no means limited to:
- A single-piece support that extends substantially through the full length of the tube;
- A multiple-component support whereby separate components are inserted separately through the first open end and second open end of the tube and mechanically and/or sealingly engage into a composite support at some point;
- A multiple-component support whereby separate components are inserted separately through the first open end and second open end of the tube and the separate components do not mechanically or sealingly engage at any point; or
- Any combination thereof.

The support may:
Contact onto the inside of the tube;
Contact onto the outside of the tube;
Contact on to a combination of the inside and the outside of the tube;
Protrude fully through and extend outwards beyond the end of the tube; or
Substantially extend through the tube.

The support may have any suitable cross-sectional form, including but by no means limited to:
Substantially circular;
Substantially square;
Substantially ovoid;
Substantially polygonal; or
Any combination thereof along the length of the support such that the support is substantially solid.

In some embodiments, rather than having a substantially solid and substantially rigid support, other types of support could be used.

The preferred substantially rigid support cross-sectional form is substantially circular or substantially ovoid.

Similarly, the tube may have any suitable cross-sectional form, including but by no means limited to:
Substantially circular;
Substantially ovoid;
Substantially square; or
Substantially polygonal.

The support may comprise one or more apertures in communication with a flow pathway and through which fluid can be delivered to the interior of the tube, to increase pressure in the interior of the heat-softened portion(s) of the tube.

The integral flow pathway(s) in the support may open:
Through the first open end of the tube;
Through the second open end of the tube; or
A combination thereof.

When a pressure change is introduced via the integral flow pathways to deformingly conform the heat-softened section of the tube to the configuration of a mould cavity, the pressure change can be introduced:
Directly adjacent to the product or plurality of products being formed;
Directly adjacent to the sections to be separated, that is between the required product separation locations and their adjacent seal points; or
A combination of being adjacent to the product or plurality of products being formed and adjacent to the separation sections.

The preferred location for the introduction of the pressure change is adjacent to the separation sections.

The pressure change may be provided by a pressure source configured to:
Apply an increase in pressure inside the heat-softened tube to expand the tube outwardly under pressure to assume the configuration of the mould cavity;
Apply a reduction in pressure to the outside of the heat-softened tube to expand the tube outwardly under vacuum to assume the configuration of the mould cavity; or
Apply a combination of both internal pressure and external vacuum.

The pressure source may be applied by a separate attachment that engages once the mould has closed, or by an integral connection with one or more parts of the mould.

The mould may be formed out of any solid material suitable for the temperatures and pressures of blow-moulding, including but by no means limited to:
Any form of steel;
Aluminium;
Wood;
Clay; or
Any form of resin based material such as epoxy.

The preferred materials for the mould are any form of metal or resin.

The support may be formed out of any solid material suitable for the temperatures and pressures of blow-moulding, including but by no means limited to the materials listed for the mould above.

The mould cavity may be:
Larger than the effective diameter of the tube such that the heat softened section of the tube expands outwardly under pressure to assume the configuration of the mould cavity;
Smaller than the effective diameter of the tube such that the heat softened section of the tube deforms inwardly under contact with the mould to assume the configuration of the mould cavity; or
Any combination of the above along the length of the tube.

The profiles, contours or shapes inside the mould cavity may deform the tube:
Inwardly or outwardly in a circumferential or radial direction;
Inwardly or outwardly in a longitudinal direction; or
Any combination of profiles that both deform the tube inwardly and outwardly in circumferential, radial and longitudinal directions.

The profiles, contours and shapes may be of any geometric form, including but by no means limited to:
Letters or numerals of any known alphabet embossed or integrated inwardly or outwardly onto the tube;
Any symbol, logo, promotional shape, object, item, article, character, emblem, feature, handwriting, sign, figurine, icon, idol, image, motto, representation, statuary, design, or gadget embossed or integrated inwardly or outwardly onto the product;

Any combination of profiles, contours or shapes that form one or more known shapes, animate or inanimate objects, flowers, plants, fruits, vegetables, insects, birds, animals, vehicles of land, sea or air, vessels, instruments, household or industrial objects or human forms;

Any combination of profiles, contours or shapes relative to arts and crafts;

Any combination of profiles, contours or shapes relative to ornaments or decorations;

Any combination of profiles, contours or shapes that form one or more flexible or concertina sections to increase the flexibility of the tube with a first open end and second open end;

Any combination of profiles, contours or shapes that form one or more flexible or concertina sections to decrease the effective length of the product during transit;

Any combination of profiles, contours or shapes that enable one or more sections of the product to integrally telescope inwardly thereby reducing the effective length of the product with a first open end and second open end during transit;

Any combination of profiles, contours or shapes that form one or more changes in geometric cross section along the longitudinal direction of the product;

Any combination of profiles, contours or shapes that are formed longitudinally down the length of the product to provide vent pathways to prevent reduction in pressure inside a drinking container;

Any known shape or plurality of shapes in the marketplace, including but by no means limited to, oral care, cosmetic or pharmaceutical tubes, and other form of tube, cup, beaker, mug, pottle or bottle;

Any combination of profiles, contours or shapes that may subsequent have sections cut, trimmed or removed in order to transform the profiles, contours or shapes from one form into another;

Any combination of profiles, contours or shapes that either as a composite or subsequent to being cut or trimmed into subcomponents of profiles, contours or shapes, may be connected to other objects or items, be threaded through other objects or items or have other objects or items threaded through them;

Any toy or plurality of toys;

Any utensil or plurality of utensils;

As a structural element to be utilised in the construction of a frame, such as the frame of a model airplane, a model bridge, model tower, model crane or the like;

Any combination of profiles, contours or shapes wherein one of the open ends is slightly larger than the other open end, such that the as-profiled product can be bent at such an angle that one open end engages with the other open end thereby forming a continuous loop of any shape or form;

Any combination of profiles, contours or shapes that are apparent to those versed in the art; or Any combination of the above.

The combination of profiles, contours or shapes that form one or more flexible or concertina sections to increase the flexibility of a tube with a first open end and second open end may be:

In the form of a saw-tooth arrangement being a low pitch-angled wall of substantially straight section adjacent to a high pitch-angled wall of substantially straight section, such that the concertina action is as a result of plastic deformation of the angular wall transitions between each alternate substantially straight sections of wall in the saw-tooth pattern in conjunction with the high pitch-angled walls in the saw-tooth repeat pattern inverting position in a snap-action; or In the form of a saw-tooth arrangement being a low pitch-angled wall of substantially straight section adjacent to a sinuous wall oriented at an angle to the low pitch-angled wall, such that the concertina action is as a result of minimal if any angular displacement in the wall transitions between each alternate low pitch-angled wall and sinuous wall section in the saw-tooth pattern in conjunction with the sinuous walls in the saw-tooth repeat pattern inverting position in a snap-action.

The profiling of a single tube with a first open end and second open end may form a single profiled product with a first open end and second open end or may form a plurality of profiled products each with a first open end and second open end that are each complete products within themselves, as examples including but by no means limited to:

One, two or more as-profiled drinking straws;

One, two or more as-profiled drinking straws which include letters, symbols, icons, flowers, plants, birds, animals, human forms, household or industrial objects, vehicles of land, sea or air, integral stirring devices, or has ornamental, decoration, or arts or crafts attributes;

One, two or more as-profiled drinking straws that once utilised as a drinking straw, can be further utilised as a toy; such as a child's building block or a component or implement in a game;

One, two or more as-profiled drinking straws that once utilised as a drinking straw may be attached to another object or item, threaded through another object or item, or have another object or item threaded through it;

One, two or more as-profiled drinking straws that once utilised as a drinking straw, can be transformed into another object or form by the action of cutting off predefined sections or cutting into predefined sections, or a combination of both;

One, two or more oral care, cosmetic or pharmaceutical tubes or any other known form of tube;

One, two or more bottles, cups, beakers, mugs or pottles;

One, two or more telescoping, concertina or collapsing bottles whereby flexible sections may be integrated into a bottle's external wall and whereby the bottle can be substantially reduced in height during storage and transit;

One, two or more drinking vessels whereby a single or multiple-wall configuration allows for the drinking vessel to be utilised with hot beverages without the need for a separate insulating sleeve or provides an additional barrier to isolate the user from external condensation when utilised with chilled beverages;

One, two or more toys;

One, two or more utensils;

One, two or more structural elements to be utilised in the construction of a frames, such as the frame of a model airplane, a model bridge, model tower, model crane or the like;

Any combination of profiles, contours or shapes wherein one of the open ends is slightly larger than the other open end, such that the as-profiled product can be bent at such an angle that one open end engages with the other open end thereby forming a continuous loop of any shape or form; or Any combination thereof.

Alternatively, the profiling of a single tube with a first open end and second open end may form a single profiled product with a first open end and second open end or may form a plurality of profiled products each with a first open end and second open end that are sub-components of composite products, as for example including but by no means limited to:

- One, two or more subcomponents of as-profiled drinking straws;
- One, two or more subcomponents of as-profiled drinking straws which include letters, symbols, icons, flowers, plants, birds, animals, human forms, household or industrial objects, vehicles of land, sea or air, integral stirring devices, or has ornamental, decoration, or arts or crafts attributes;
- One, two or more subcomponents of as-profiled drinking straws that once utilised as individual drinking straws, can be transformed into a plurality of products, toys objects or forms by means of cutting off one or more predefined sections, cutting into one or more predefined sections or a combination of both; such as separate pieces or implements in a board game or subcomponents of a build block set;
- One, two or more subcomponents of as-profiled drinking straws that once utilised as a drinking straw may be attached to another object or item, threaded through another object or item, or have another object or item threaded through it;
- One, two or more subcomponents of oral care, cosmetic or pharmaceutical tubes or any other known form of tube;
- One, two or more subcomponents of bottles, cups, beakers, mugs or pottles;
- One, two or more subcomponents of toys;
- One, two or more subcomponents of structural elements to be utilised in the construction of frames, such as the frame of a model airplane, a model bridge, model tower, model crane or the like;
- One, two or more sub-components of utensils;
- Any combination of subcomponent profiles, contours or shapes wherein one of the open ends is slightly larger than the other open end, such that the as-profiled product can be bent at such an angle that one open end engages with the other open end thereby forming a continuous loop of any shape or form; or
- Any combination thereof.

In one embodiment, the support comprises first and second support parts and the method comprises bringing the first support part into contact with the first open end of the tube to at least partly seal the first end of the tube and bringing the second support part into contact with the second open end of the tube to at least partly seal the second end of the tube, prior to applying the fluid pressure change.

The heating step may occur prior to placing said tube in the mould(s).

The method may comprise heating the support to maintain the tube at an elevated temperature as the pressure change is applied.

The profiling or deformation of the tube may be:
- Inwards as a result of the mould cavity inwardly deforming the heat-softened section of the tube through contact between the mould cavity and the heat-softened section of the tube;
- Outwards as a result of the pressure source outwardly conforming the heat-softened section of the tube to the configuration of the mould cavity; or
- Any combination thereof along the length of the tube.

The tube with a first open end and second open end may be produced by any known process, including but by no means limited to:
- Extrusion;
- Injection Moulding;
- Casting;
- Vacuum Forming;
- Rolling of a film or substantially flat sheet into any known cross-sectional form or shape and seam-welding, where the seam welding process may include, but is by no means limited to; a fin seal format, a fold seal format, any form of hot seal process or any process whereby an additional component such as additional hot resin of the same or different resin-base as the film or substantially flat sheet is injected or additionally extruded into the joint region; or
- Any combination thereof.

The method may further comprise longitudinally compressing the tubes to form profiled feature(s) in the profiled product(s).

Preferably, said tube having a first open end and a second open end is an extruded tube.

Where the extrusion process is conducted remote to the tube forming process, the preferred cross-sectional form of the tube is generally flat, thereby maximising the efficiency of tube transportation from the extrusion process to the tube forming process by minimizing air space in a container and therefore maximising packing density. The method may comprise opening the tube prior to, or as a result of, supporting the tube on the support. The method may comprise initially forming said generally flat tube from a sheet of material.

The tube may be made out of any appropriate material capable of being heat-formed, including but by no means limited to any form of polymer or glass. The preferred materials are polypropylene, polyethylene, polystyrene, or PET.

For applications such as profiled drinking straw production, the tube will preferably be small or thin-walled, typically in the range of about 0.1 mm to about 0.5 mm in wall thickness. For applications such as the production of oral care and cosmetic tubes or the production of bottles, cups, beakers and pottles and the like, the preferred wall thickness will be greater or thick-walled, typically in the range of about 0.5 mm or more in wall thickness.

The tube may be any suitable length and any suitable diameter.

The tube may be any colour or combination of colours. The combination of colours may be in the form of one or more alternate colour stripes down the length of the tube. The alternate colour stripes may be parallel or spiral in nature relative to the longitudinal axis of the tube. Typically, the tube will be of single colour, thereby allowing any offcuts as part of the trimming process to be recycled back through the tube forming process.

The tube with a first open end and second open end may be a single layer, or any combination of multiple layers. Typically for applications such as drinking straws, the tube will be of a single layer.

For more rigorous applications where, for example, barriers properties are required (such as gas barrier properties), typically at least three layers will be required though in some barrier applications five layers or more may be required. In such layered barrier applications at least one of the inner layers will be a high barrier layer and two or more of the inner layers may be adhesive layers to bond the barrier layer to the outer layers. Alternatively, additives may be used to bond inner barrier layers to outer layers, thereby reducing the number of layers by removing the requirement for adhesive layers.

The seals at either end of the tube may be full seals at either end, a full seal at one end and a partial seal at the other end, or a partial seal at either end.

The method of sealing the open ends of the tube may include, but are by no means limited to being:
- As a result of a press fit which sandwiches the tube between the mould and the support as a result of the support extending through the full length of or outwards beyond the end of the tube;
- By a deformable seal arrangement between the mould and the tube as a result of the support extending through the full length of or outwards beyond the end of the tube;
- By the localised deformation of the tube into a seal configuration between the mould and the support as a result of the support extending through the full length of or outwards beyond the end of the tube;
- By the mould pinching closed one end of the tube as a result of the support substantially extending through the full length of the tube; or
- By a combination of the above.

The preferred method of tube-sealing is through the sandwiching of the first open end and second open end of the tube between the fixture and the mould.

The profiled product or plurality of profiled products may:
- Be formed without any need to trim either the first open end or second open end; or
- Require separating at the first open end and/or second open end between the seal in the tube and the product as-profiled or plurality of products as-profiled.

The separating may be via trimming or any other suitable form of separating. If trimming is required, the cutting action at the first open end and second open end of the as-profiled product (or between the products) may be by any known cutting method, including but by no means limited to:
- A scissor action;
- A guillotine action;
- A knife action;
- A high-speed jet of flowable material;
- Laser cutting; or
- A combination thereof.

The tube may have, post-profiling, the feature of cut zone indicia to indicate where a user should employ a cutting device or similar to transform the as-profiled product into another form. The cut zone indicia may be delineated by raised or recessed cut zone features. Such indicia may additionally be used to indicate where the seals should be separated from the as-profiled product(s), or where multiple products in one tube should be separated.

When a plurality of products are to be formed from a single tube with a first open and end second open end, there may be more than two partial or full seal points between the first open end and second open end of the tube.

The method may comprise providing a plurality of supports, supporting a tube on each support, and concurrently forming at least one profiled product having a first open end and a second open end from each tube. The method may comprise concurrently forming a plurality of profiled products each having a first open end and a second open end from each tube.

The plurality of supports may form an integral comb arrangement. The integral comb arrangement may include a manifold for the interconnection of integral airflow pathways. The individual substantially solid and substantially rigid fixtures can have individual dampening elements, integral dampening elements, or any combination thereof, for dampening or preventing unwanted fixture movement. The manifold may assist in maintaining latent heat when heating is applied through the substantially solid and substantially rigid fixtures.

The or each profiled product may have a plurality of cross-sectional shapes or geometric forms along at least a portion of its length.

The or each profiled product may have embossing along at least a portion of its length. The embossing may be raised above the surface and/or depressed below the surface of the product.

The or each profiled product may have one or more enlarged sections along at least a portion of its length.

At least a portion of the or each profiled product may be flexible as a result of having circumferential grooving formed during the forming step.

In one embodiment, the profiled product is capable of being reduced in length during storage and transportation. The reduction in length may be able to occur as a result of one or more sections of the product integrally telescoping inside at least one other section of the product.

The product may comprise one or more grooved sections to further reduce the length of the product to provide a region of enhanced flexibility.

The profiled product(s) may be a drinking straw having one or more three dimensional profile features. The drinking straw(s) may have a wall thickness of between about 0.1 mm and about 0.5 mm. Preferably, the drinking straw has a wall thickness of between about 0.1 mm and about 0.3 mm.

The method may comprise closing one or both of the open ends of the or each profiled product as a post-forming step. The profiled product(s) may be a bottle for holding a liquid. The bottle may have an adjustable height, and is preferably capable of maintaining the reduced height configuration in the absence of any external force. The profiled product(s) may be a cup for holding a liquid that has an integral heat and condensation barrier. The profiled product(s) may be a tube for storage of a substance.

For non-drinking straw applications such as bottles, tubes, and cups for example, the wall thickness of the product may about 0.35 mm or greater.

The heat source to soften the section of the tube bounded by the fixture may be:
- Outside the tube;
- Inside the tube; or
- A combination of inside and outside the tube.

The preferred location is a combination of inside and outside the tube.

When heat is applied on the outside of the tube, any number of known heating processes can be employed, including but by no means limited to:
- Hot air, other gas, or liquid;
- Radiant heat;
- Infra-red heat;
- The heating of the mould; or
- Any combination thereof.

When heat is applied to the inside of the tube, any number of known heating processes can be employed, including but by no means limited to:
- Hot air, other gas, or liquid, passed through the support;
- Pre-heating of the support;
- An alternate fluid inside the support which by means of convection transfers heat from outside the support to inside the support and then the support transfers heat to the tube;
- A heater element as an integral part of the support; or
- Any combination thereof.

When hot air or gas is blown through the support, the substantially solid nature of the substantially solid and substantially rigid support can be employed to retain latent heat thereby assisting in keeping the temperature of the tube substantially constant during the forming process.

When hot air or gas is blown through the support during the heating process, there may be a need for an exit pathway for the hot air or gas as well as an entry pathway. The integral flow pathways may be employed as either the entry or exit pathway for this hot air or gas flow, however a second entry or exit pathway may also be provided.

The second entry or exit pathway may therefore require a separate sealing arrangement when the support and heated tube are encased in the mould and prior to application of the pressure change. This additional sealing arrangement can be as a result of:

Direct contact between the support and the mould;
An additional sealing apparatus that makes sealing contact with the support and thereby seals the second entry or exit pathway; or
A combination of the above.

One or more tubes may be profiled at one time in a single mould, or in a plurality of moulds.

Following heat forming, the one or more as-profiled products may be packed or retail packed by any method known to those versed in the arts. Due to the three-dimensional nature of the as-profiled products, multiple as-profiled products may be attached together by a band or strap prior to being inserted into the pack or retail pack.

The as-profiled products or plurality of as-profiled products may subsequently have labelling applied to them by methods including, but by no means limited to:

Laser printing directly on to the as-profiled products;
Any ink printing process directly on to the as-profiled products;
By the attachment of separate labels; or
Any combination of the above.

The labelling can occur either while the as-profiled products are still on the supports or following removal from supports.

If external printing processes are employed while the as-profiled product or plurality of as-profiled products remain on the support(s), the integral flow pathways of the support(s) may be used to at least partially inflate the as-profiled product or plurality of as-profiled products as an aid to the printing process.

The method of profiling a tube can be completed in a series of simple steps such that the method can readily be integrated into a continuous motion or indexed motion machine. Preferably, the motion is a combination of continuous and indexed motion.

A preferred method comprises:
Loading a tube with a first open end and second open end on to the substantially rigid support with one or more integral flow pathways such that the tube with a first open end and second open end passes fully down the support until the first open end of the tube has fully engaged against the base section of the support and the free end of the substantially rigid fixture has extended freely out of the second open end of the tube;
Applying external and/or internal heat to soften the tube whilst supportingly mounted on the support;
Closing the mould around the support and heat-softened tube such that the two open ends of the tube are at least partially sealed with the exception of the integral flow pathways. This step also effects any requisite inward deformation of the tube as a result of any contact between the mould cavity and the heat softened section of the tube;
Applying pressure to the heat-softened section of the tube to effect any desired outward deformation of the tube;
Stopping the application of pressure and removing the mould;
Removing the as-profiled product or plurality of as-profiled products from the support; and
If required, trim or individually separate the first open end and/or second open ends of the as-profiled product or plurality of as-profiled products;

Simple ejection techniques may be required to remove the as-profiled product or plurality of products from the support.

Another preferred method comprises:
Loading a tube with a first open end and second open end on to a first support part with one or more integral flow pathways such that the tube with a first open end and second open end passes fully down the lesser diameter section of the first support part until the first open end of the tube has fully engaged on to the larger diameter section of the first support part and the free end of the first support part's lesser diameter section has extended freely out of the second open end of the tube;
Engaging a second support part on to the lesser diameter section of the first support part where it extends freely out of the second end of the tube then slidingly moving the second support part along the lesser diameter of the first support part until it is fully engaged with the second end of the tube;
Applying external and/or internal heat to soften the section of tube bounded by the two support parts;
Closing the mould around the two support parts and heat-softened tube such that the two open ends of the tube are substantially sealed with the exception of the integral flow pathways. This step also effects any requisite inward deformation of the tube as a result of any contact between the mould cavity and the heat softened section of the tube;
During the mould closing, the second support part and also parts of the first support part can make first-contact with the mould-face in the event that indexing motions have cause lateral movement in the fixture assembly, and thereby stabilise such lateral fixture movement before full closing of the mould;
Applying pressure to the heat-softened section of the tube to effect any desired outward deformation of the tube with a first open end and second open end;
Stopping the application of pressure and removing the mould;
Closing one or more dies, rods or guides around the as-profiled tube in succession whilst also pushing down or pulling up on the second support part which slidingly moves down or up the lesser diameter section of the first support part to deform the as-profiled tube in the longitudinal direction;
Removing the second support part from its engagement with the second end of the as-profiled tube and from its sliding engagement with the first support part;
Removing the as-profiled product or plurality of as-profiled products with a first open end and second open end from the first support part; and
If required, trim or individually separate the first open ends and/or second open ends of the as-profiled product or plurality of as-profiled products with a first open end and second open end.

Simple ejection techniques may be required to remove the second support part from the as-profiled product or plurality of as-profiled products and the as-profiled product or plurality of as-profiled products from the first support part.

In the above methods, with an indexed automation machine, multiple tubes with a first open end and second open end can be fed and processed in parallel, whereby significant production rates can be achieved.

The preferred methods result in deformingly conforming the heat-softened section(s) of the tube to the configuration of the mould cavity or cavities, thereby producing an as-formed product or plurality of as-formed products each with a first open end and second open end.

One as-profiled product or a plurality of as-profiled products each with a first open end and second open end can be formed from a single tube with a first open end and second open end on a single fixture. Such as-profiled products with a first open end and second open end can include, but are by no means limited to:

- Personalised drinking straws; with company logos, names or slogans, cartoon characters, items from movies or TV series, any animate or inanimate object, fruit, plant or vegetable shapes, insect, bird, animal or human shapes, messages relative to religious holidays, weddings, birthdays and the like, any known shape in the home, at work, in the leisure or sport world, any vehicle of land, sea or air, any object in the arts and crafts world whether embossed or integrated longitudinally or circumferentially down the drinking straw;
- Drinking straws or subcomponents of drinking straws that can be subsequently used as games, toys, ornaments, decorations and the like, have pieces cut off of them or are themselves cut into smaller pieces and whereby some or all of the smaller pieces can be used in games or as toys, ornaments, decorations and the like;
- Drinking straws or subcomponents of drinking straws that can subsequently be attached to other objects or items, be threaded through other objects or items or have other objects or items threaded through them;
- Drinking straws with multiple cross sections; such as circular at either end with central sections that combine square, triangular or star shaped sections, or sections of any other geometric form desired;
- Drinking straws with one or more significantly larger diameter sections along their length; of any cross section or geometric form, for aesthetic or fun value or for integral beverage stirrer purposes;
- Any of the above drinking straw options with flexible sections;
- Drinking straws with significantly extended groove sections; in order to minimise drinking straw length during transit or purely for aesthetic or fun value;
- Drinking straws that can be integrally telescoped; in order to minimise drinking straw length during transit or purely for aesthetic or fun value;
- Any form of tube, such as oral care, cosmetic, pharmaceutical, home handyman product or automotive product;
- Any form of bottle, beaker, cup, mug or pottle;
- Any form of telescoping, concertina or collapsing bottle;
- Any form of cup suitable for thermal protection when used with hot beverages or condensation suppression when used with cold beverages;
- Any form of utensil or sub-component of a utensil;
- Any form of toy or sub-component of a toy;
- Any form of structural element to be utilised in the construction of a frame, such as the frame of a model airplane, a model bridge, model tower, model crane or the like;
- Any combination of profiles, contours or shapes wherein one of the open ends is slightly larger than the other open end, such that the as-profiled product can be bent at such an angle that one open end engages with the other open end thereby forming a continuous loop of any shape or form;
- Any other form apparent to those versed in the art; or
- Any combination of the above.

The as-profiled products with a first open end and second open end can then be fed through any known post-production process, including but by no means limited to:

- Pre-wrapping, banding or strapping prior to final packing or retail packing;
- Counting out and retailing packing in any form of retail pack;
- Surface printing, either through the attachment of a label, screen printing or any digital printing process that transfers ink directly on to the as-profiled product with a first open end and second open end;
- Wrapping individually for transportation or hygiene purposes;
- Wrapping in multiples for transportation or hygiene purposes;
- Additional items being attached for retail purposes including any form of pre-printed label;
- Additional sub-components being added to form a final composite product;
- Sealing off or closing at least one of the open ends in the as-profiled product to complete a product where a single open end is a requisite, such as for bottles, cups, beakers, mugs and pottles and the like, or sealing off both open ends where no open end is a requisite.

In accordance with a second aspect of the present invention, there is provided a profiled product formed by any of the methods outlined in relation to the first aspect above.

In accordance with a third aspect of the present invention, there is provided an apparatus for profiling a tube to form at least one profiled product having a first open end and a second open end, comprising: a support adapted to support the tube along at least a substantial part of the length of the tube corresponding to the product(s) to be formed; at least one heat source arranged to heat-soften at least one portion of the tube in the region(s) corresponding to the product(s) to be formed to provide one or more heat-softened portions of the tube; one or more shaped moulds arranged to receive at least said heat-softened portion(s) of the tube; and one or more pressure sources configured to apply a fluid pressure change to the region(s) of the tube corresponding to the product(s) to be formed to form at least one profiled product having a first open end, a second open end, and a predetermined shape with one or more three dimensional profile features.

The apparatus may be adapted to form multiple profiled products from the tube on the support.

The support may be adapted to extend substantially the length of the product(s) to be formed.

The support may be adapted to extend beyond the entire length of the product(s) to be formed. Preferably, the support is adapted to extend beyond the entire length of the tube.

The apparatus may be adapted to at least partly seal an end of the tube between the support and the mould(s).

The pressure source(s) may be configured to apply a fluid pressure change around the exterior of the heat-softened portion(s) of the tube in the shaped mould(s).

The apparatus may comprise an arrangement to at least partly seal at least one of the first and second open ends of the tube, and wherein the pressure source(s) is/are adapted to apply a fluid pressure change in the interior of the heat-softened portion(s) of the tube in the shaped mould(s) to deform the heat-softened portion(s) of the tube.

The support may be substantially rigid. Additionally, the support may be substantially solid.

The support preferably maintains a longitudinal axis of the tube substantially straight when in the heated state The support may comprise one or more apertures in communication with a flow pathway through which fluid can be delivered to the interior of the tube, to increase pressure in the interior of the heat-softened portion(s) of the tube.

The mould(s) may comprise(s) one or more pathways through which fluid can be extracted, to reduce pressure around the exterior of the heat-softened portion(s) of the tube.

The apparatus may be additionally be configured to deform part of the heat-softened portion(s) inwardly as a result of contact with the mould(s).

The apparatus may be additionally configured to longitudinally deform the tube.

In one embodiment, the support comprises first and second support parts, with the first support part arranged to substantially seal inside the first open end of the tube, outside the first open end of the tube, or a combination of inside and outside of the first open end of the tube. The first support part may have a shoulder arranged to abut against the first open end of the tube.

The first support part may have a portion arranged to fit into and engage the inner surface of the first open end of the tube. In one embodiment, the first support part has a portion having a width that is less than or equal to the minimum internal deformed width of the tube and is sufficiently long to extend free and clear from the second open end of the tube when the first open end of the tube abuts the shoulder of the first support part. The first support part may comprise a tapered section between the portion arranged to fit into the first open end of the tube and the portion having a width that is less than or equal to the minimum internal deformed width of the tube, to facilitate engagement with the first open end of the tube.

The first support part may have a shaped end to facilitate engagement with the second support part.

The second support part may be arranged to substantially seal inside the second open end of the tube, outside the second open end of the tube, or a combination of inside and outside of the second open end of the tube. In one embodiment, the first support part has a portion having a width that is less than or equal to the minimum internal deformed width of the tube and is sufficiently long to extend free and clear from the second open end of the tube when the first open end of the tube abuts the shoulder of the first support part, and wherein the second support part has a central bore configured to slidingly engage with said portion of the first support part. The second support part may have a tapered section to facilitate engagement with the second open end of the tube.

The second support part may have a portion arranged to fit into and engage the inner surface of the second open end of the tube.

The second support part may have a shoulder arranged to abut against the second open end of the tube.

One or both of the first and second support parts may have an external recess extending at least partly around its perimeter to enhance sealing between the fixture and the respective end of the tube.

The first and second support parts may be arranged to engage with the tube to create an internal cavity inside the tube and create at least one free wall section of the tube bounded by the first and second support parts. The heat source(s) may be configured to heat-soften the free wall section(s).

In one embodiment, the mould(s) is/are arranged to enclose around the tube and the first and second support parts to seal the internal cavity with the exception of flow pathway(s) through one or more of the support parts.

The internal cavity may be fully sealed through the sandwiching of the first and second free ends of the tube between the mould(s) and the first and second support parts. Alternatively, the internal cavity may be fully sealed through a separate sealing arrangement on the mould where the mould is in contact with the first and second open ends of the tube adjacent to the first and second support parts. As another alternative, the internal cavity may be fully sealed through the deformation of the first and second open ends of the tube into circumferential recesses in the first and second support parts.

The apparatus may be configured to profile a plurality of cross-sectional shapes or geometric forms along at least a portion of the length of the or each tube.

The apparatus may comprise a guide or guides adapted to support the outside surface of the tube to keep the tube substantially straight during longitudinal deformation of the tube to form additional profiled features. In one embodiment, the apparatus has a first support part arranged to at least partly seal the first end of the tube and a second support part arranged to at least partly seal the second end of the tube, wherein at least one of the support parts has a portion having a width that is less than or equal to the minimum internal deformed width of the tube and which is sufficiently long to extend through the tube, and wherein that portion serves as an internal guide to keep the tube substantially straight during said longitudinal deformation. The guide or guides could comprise one or more dies or rods for example.

During the further deformation process, the support may be used as a guide to further deformation. That is, the tube may remain on the support during the longitudinal deformation.

The longitudinal deformation may be effected by moving the first support part with respect to the second support part to either deformingly expand or deformingly compress the length of the tube to form at least one modified product.

The support may be heated to maintain the tube at an elevated temperature as the pressure change is applied.

The apparatus may comprise a plurality of supports, each adapted to support a respective tube. The apparatus may be adapted to concurrently form at least one profiled product having a first open end and a second open end from each tube. The apparatus may be adapted to concurrently form a plurality of profiled products from each tube.

In a preferred embodiment apparatus and its use, the tube has a first open end and second open end, the substantially rigid and substantially solid support is of single piece construction and of a shape and cross-section such that it causes the tube to open outwards and snugly conform to the cross section of the support at least in the region of the first open end and second open end of the tube, the support extends substantially through the full length of the tube with a first open end and second open end, the support has integral flow pathways and the mould sealingly engages the tube between the mould and the support thereby at least partially sealing closed the first open end and second open end of the tube with the exception of the integral flow pathways.

When heat is applied to heat-soften the section of the tube with a first open end and second open end bounded by the support and the mould is closed to sealingly enclose the heat-softened tube, the heat softened tube can be inwardly deformed by the mould where it makes contact with the heat-softened tube and outwardly deformed until the heat-softened tube conforms to the configuration of the mould cavity as a result of increasing the internal pressure inside the heat-softened tube through the integral flow pathways and/or through decreasing the external pressure in the mould adjacent to the heat-softened tube.

Using that preferred apparatus, the tube is thus formed into an as-profiled product with a first open end and second open end or a plurality of as-profiled products each with a first open end and second open end. It may be necessary to separate the at least partly sealed first end and second end of the tube from the ends of the product formed by the tube, by cutting or any suitable process.

In an alternative preferred embodiment apparatus and its use, the tube has a first open end and second open end, the first support part is substantially solid and substantially rigid and of a diameter such that it snugly fits into the first open end of the tube and extends for a distance inside the tube at this same diameter at which point the first support part transitions down to a second and lesser diameter such that it no longer makes contact with the inside surface of the tube and at this lesser diameter the first support part extends through the full length of the tube and protrudes freely out of the second open end of the tube, and along the length of the lesser diameter there are recessed longitudinal grooves to serve as integral flow pathways, the second support part which is substantially solid and substantially rigid is of a diameter such that it snugly fits into the second open end of the tube and the second fixture also has a central aperture such that it slidingly engages down the protrudingly free end of the first support part until such point as the second support part extends for a distance inside the second open end of the tube, the second support part also capable of mould-face interaction to dampen any lateral fixture movement resulting from of any motion, the mould which engages with the first support part and the second support part outside the bounds of the tube also engages with the tube in the sections of the tube snugly in contact with the two support parts whereby the tube with is thus sealingly engaged between the mould and the two support parts such that the first and second open ends of the tube with have been at least partially sealed with the exception of the integral flow pathways.

When heat is applied to soften the section of the tube with a first open end and second open end bounded by the two support parts and the mould is closed to sealingly enclose the heat-softened tube, the heat softened tube can be inwardly deformed by the mould where it makes contact with the heat-softened tube and outwardly deformed until the heat-softened tube conforms to the configuration of the mould cavity as a result of increasing the internal pressure inside the heat-softened tube through the integral flow pathways and/or through decreasing the external pressure in the mould adjacent to the heat-softened tube.

On removing the mould the second support part can engagingly now be slid up or down the lesser diameter section of the first fixture in order to further deform the as-profiled tube. Dies or guides can be used when the as-profiled tube is being longitudinally deformed to ensure the as-profiled tube stays substantially straight during deformation. The second and lesser diameter of the first support part can be so designed as to further assist in the guidance of any longitudinal deformation on the inside of the as-profiled tube. One or more sets of dies or guides can be used to longitudinally deform the as-profiled tube in one or more stages. The second support part can also have integral flow pathways.

Using that preferred apparatus, the tube with a first open end and second open end is thus formed into an as-profiled product with a first open end and second open end or a plurality of as-profiled products with a first open end and second open end.

The first support part may instead be used to form flow pathways in the first open end of the tube and the second support part engagingly attached to the lesser diameter of the first fixture may instead form a seal on to the second open end of the tube, or alternatively both support parts may be used as the entry and exit points for internal pressure to deform the tube.

The apparatus of the third aspect may have any one or more of the features outlined in relation to the first aspect above.

In accordance with a fourth aspect of the present invention, there is provided a drinking straw having a generally tubular body comprising a portion which can telescope at least partly into another integral portion of the generally tubular body, to reduce the overall length of the drinking straw without compressing the portion that can telescope at least partly into the integral portion and without expanding the integral portion.

In one embodiment, the generally tubular body comprises a first enlarged portion, a second transition portion and a third portion having a width smaller than the first enlarged portion, wherein the second transition portion is configured such that it can be inverted to telescope at least partly into the enlarged first portion to reduce the overall length of the drinking straw and wherein there is a transition wall between the second transition portion and the third smaller diameter portion. The first enlarged portion may be grooved to provide a region of enhanced flexibility and to enable further reduction in the overall length of the drinking straw.

The second transition portion may be tapered.

Inversion of the transition wall may serve as a lead-in for the inverting of the transition portion upon further longitudinal deformation.

Upon longitudinal deformation, the third portion may be pushed inside the enlarged first portion causing the transition portion to invert thereby substantially reducing the length of the drinking straw by an integral telescoping action.

In one embodiment, by pulling on both ends of the integrally telescoped drinking straw the inverted transition portion is restored to its original form, thereby returning the drinking straw to its original length.

In accordance with a fifth aspect of the present invention, there is provided a drinking straw having one or more three dimensional profile features and a wall thickness of between about 0.1 mm and about 0.5 mm.

Preferably, the wall thickness is between about 0.1 mm and about 0.3 mm.

The drinking straw may comprise one or more regions of enhanced flexibility.

In accordance with a sixth aspect of the present invention, there is provided a cup having a first section, a second section, and a transition region between and integrally formed with the first section and second section, whereby the second section is invertible from a position generally external of the first section to a position generally in the interior of the first section such that the second section forms an inner layer of the cup and the first section forms an outer layer of the cup.

The second section, following inversion, may be at least partly spaced from the first section.

One or both of the first and second sections may have at least one rib that is/ate adapted to maintain the first section and second section in the partially spaced configuration following inversion. The rib(s) is/are advantageously located in the first section.

One or both of the first section and second section may be formed with one or more apertures, and wherein the aperture(s) is/are closed as a post-forming process.

In accordance with a seventh aspect of the present invention, there is provided a bottle having a base, a neck, and a body, wherein the body has one or more profile features that enable(s) the body to reduce in height to a reduced height configuration for transit or storage purposes, and wherein the bottle is capable of maintaining the reduced height configuration in the absence of any external force.

The body may comprise concertina features that enable the body to reduce in height, and to be expanded back to full height by pulling the base of the bottle away from the neck. The body may comprise a plurality of larger diameter annular wall sections, and a plurality of smaller diameter annular wall sections between the larger diameter sections, and wherein the smaller diameter annular wall sections are sized and configured to fit within the larger diameter annular wall sections when the bottle is reduced in height.

The base may be adapted to be pushed inside another part of the body, so the bottle can stand upright on said another part of the body.

The bottle may be formed with at least one aperture that is closed as a post-forming process.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Further aspects of the invention, which should be considered in all its novel aspects, will become apparent from the following description, which is given by way of example only.

BRIEF DESCRIPTION OF DRAWINGS

Examples of the invention will become apparent from the following description which is given by way of example with reference to the accompanying drawings in which.

DETAILED DESCRIPTION

Figure 1:
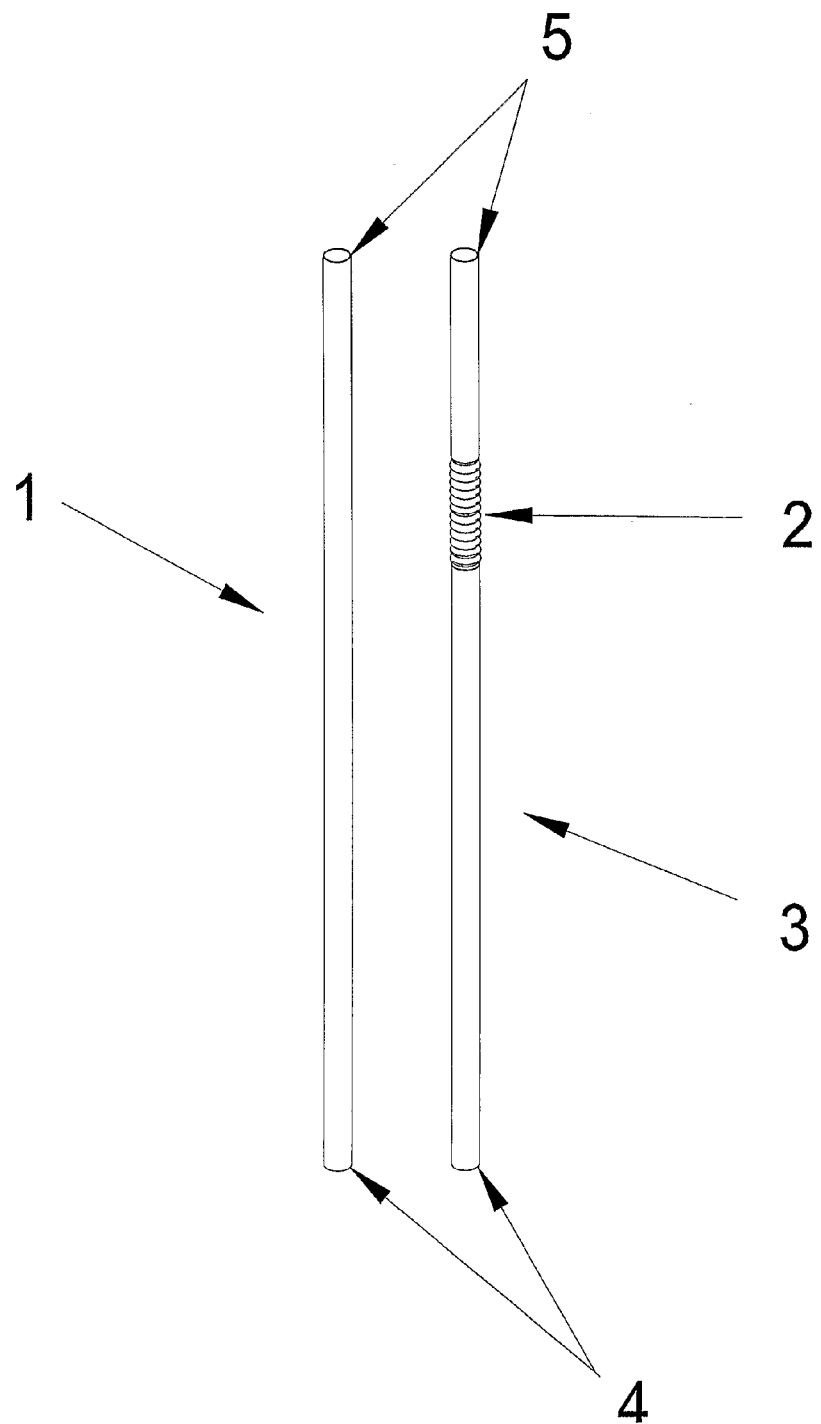
FIG. 1 shows perspective views of two typical prior art drinking straws.

It will be appreciated that terminology "upper", "lower", "down", "up", etc used in this specification refer to the orientations shown in the drawings. The terms are used to indicate relative orientations, but should not be considered to be otherwise limiting.

As will be apparent from the following description, preferred embodiment methods comprise: providing a tube having a first open end and second open end; supporting the tube on a support which supports the tube along at least a substantial part of the length of the tube corresponding to the product(s) to be formed, heating at least a portion of the tube to form at least one heat-softened portion of the tube in the region(s) corresponding to the product(s) to be formed; and applying a fluid pressure change to the region(s) of the tube corresponding to the product(s) to be formed to form at least one profiled product having a first open end, a second open end, and a predetermined shape with one or more three dimensional profile features.

As will be apparent from the following description, preferred embodiment apparatuses comprise: a support adapted to support the tube along at least a substantial part of the length of the tube corresponding to the product(s) to be formed; at least one heat source arranged to heat-soften at least one portion of the tube in the region(s) corresponding to the product(s) to be formed to provide one or more heat-softened portions of the tube; one or more shaped moulds arranged to receive at least said heat-softened portion(s) of the tube; and one or more pressure sources configured to apply a fluid pressure change to the region(s) of the tube corresponding to the product(s) to be formed to form at least one profiled product having a first open end, a second open end, and a predetermined shape with one or more three dimensional profile features.

A three dimensional profile feature is a feature that is a variation from a straight parallel-walled tube shape. It could be, by way of example, any of the features described herein. It could be, for example, a transition region between a smaller sized portion of the product and a larger sized portion of the product, or alternatively a more complex shape.

Referring to FIG. 1, two prior art drinking straws are depicted that can be used in the preferred embodiment methods and apparatuses. For use in the preferred embodiment methods and apparatuses, the drinking straws 1 and 3 can be drinking straws of any suitable heat-formable material and any length, width, cross-section, wall thickness, colour or combination of colours. The drinking straw may be a substantially straight drinking straw 1, or may have circumferential grooves 2 formed along its length to create a flexible drinking straw 3. The substantially straight drinking straw 1 and the flexible drinking straw 3 each have a first open end 4 and a second open end 5.

Figure 2:
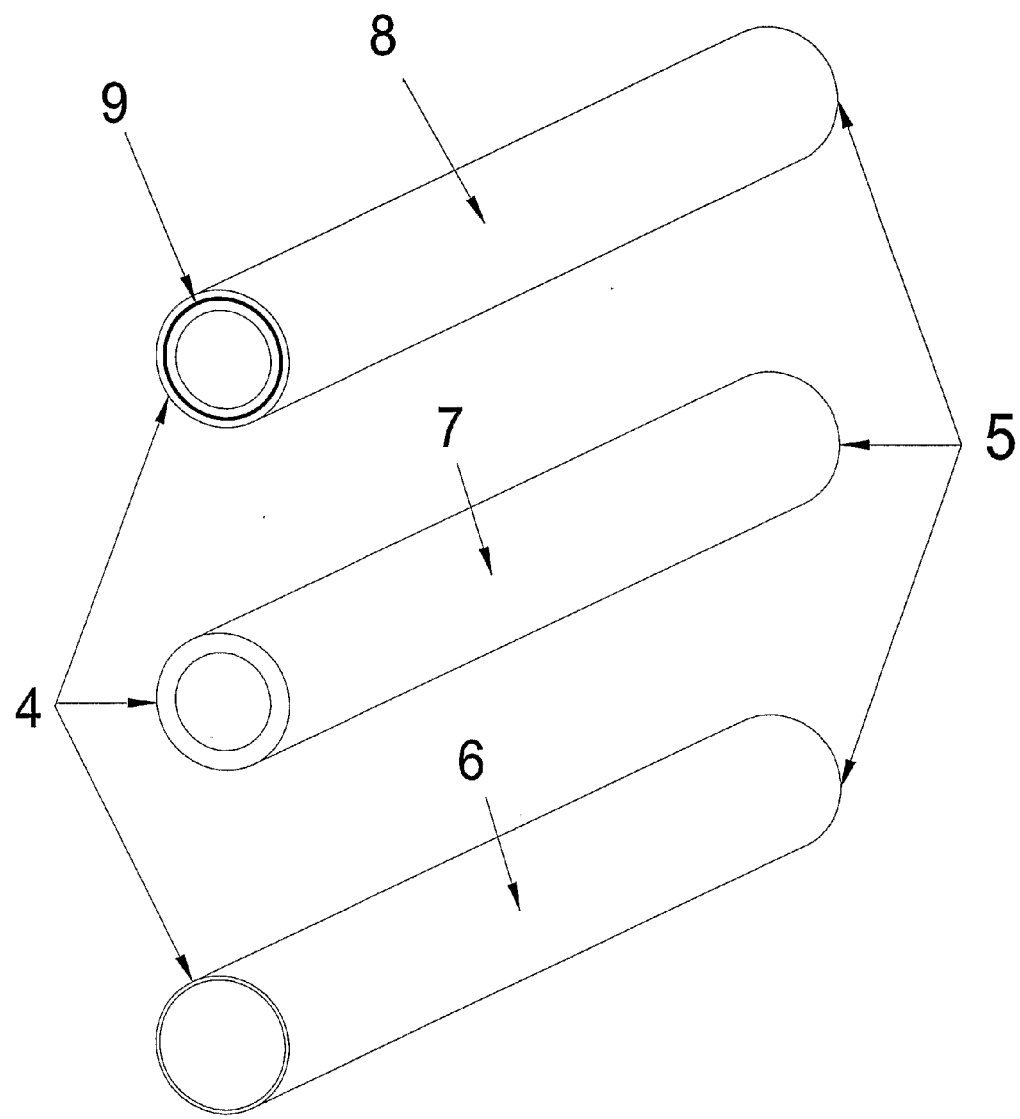
FIG. 2 shows perspective views of tubes with a first open end and second open end that are substantially round according to a first preferred tube embodiment.

Referring to FIG. 2, three substantially round tubes each with a first open end and second open end are depicted, all of which are suitable for tube forming using the preferred embodiment methods and apparatuses. The first is a substantially round single-layer thin walled tube 6. The second is a substantially round single-layer thick-walled tube 7. The third is a substantially round multi-layer thick-walled tube 8, with at least one inner barrier layer 9. Additional inner adhesive layers may also be present in order to bond the barrier layer 9 to the outer layers of the round multi-layer thick-walled tube 8. As an alternative to adhesive layers, additives may be used in each layer to effect bonding between layers. All substantially round tubes have a first open end 4 and a second open end 5.

Figure 3:
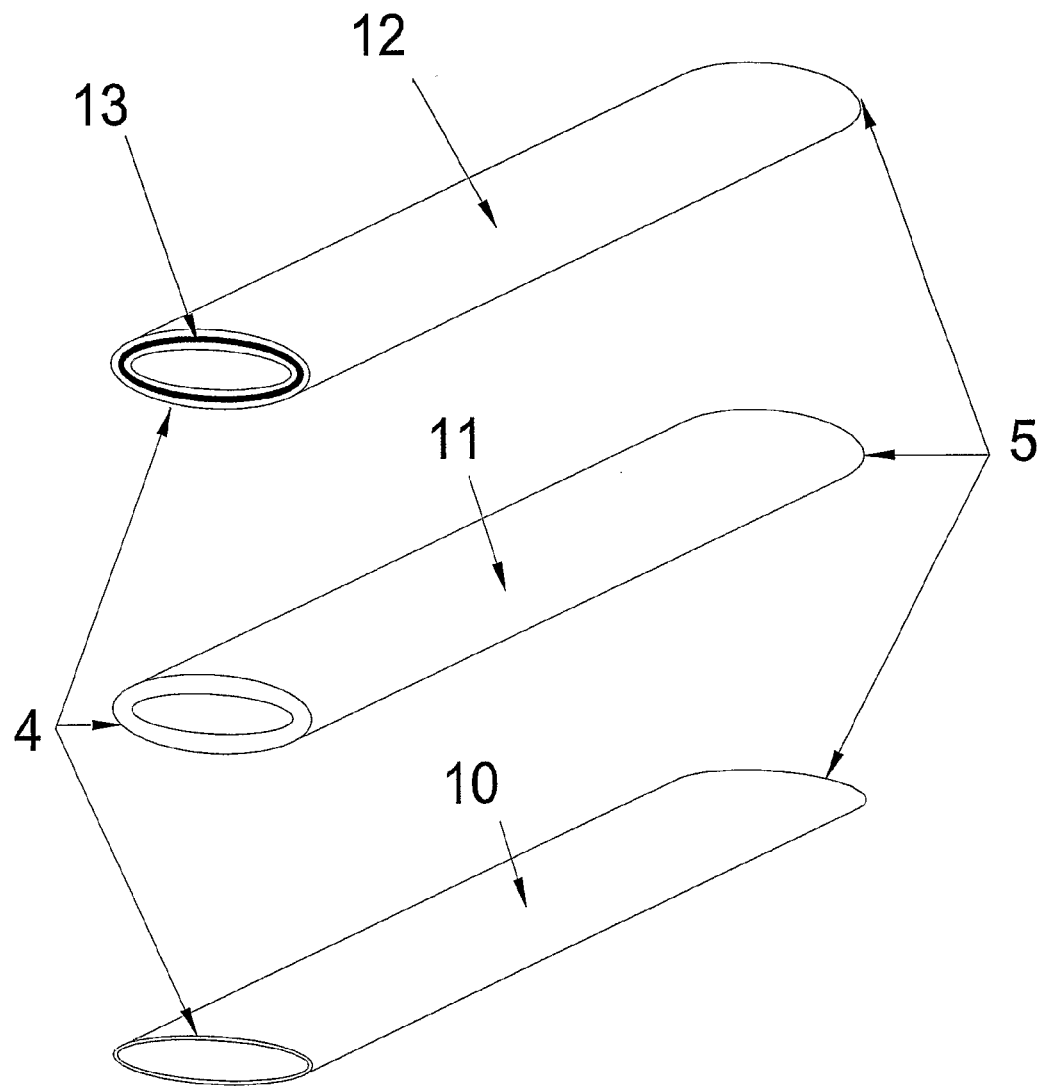
FIG. 3 shows perspective views of tubes with a first open end and second open end that are generally flat according to a second preferred tube embodiment.

Referring to FIG. 3, three substantially flat tubes each with a first open end and second open end are depicted, all of which are suitable for tube forming using preferred embodiment methods and apparatuses. The first is a substantially flat single-layer thin walled tube 10. The second is a substantially flat single-layer thick-walled tube 11. The third is a substantially flat multi-layer thick-walled tube 12, with at least one inner barrier layer 13. Additional inner adhesive layers may also be present in order to bond the barrier layer 13 to the outer layers of the substantially flat multi-layer thick-walled tube 12. As an alternative to adhesive layers, additives may be used in each layer to effect bonding between layers. The generally flat tubes all have a first open end 4 and a second open end 5.

The preferred form methods and apparatuses can be used with any suitable tube with a first open end and second open end. The tube may be, but is by no means limited to being:

Of any cross-section form/shape;
Of any wall thickness;
Of one or more laminate layers;
Of any length;
Of any colour or combination of colours;
Of any material or combination of materials suitable for heat-forming processes;
Formed by an extrusion process;
Formed by an extrusion process and then further flattened in a post-process; or
Formed by a substantially flat film that has been roll-formed and seam welded.

While the fixtures or supports referred to below are generally described as being substantially solid, that is optional. However, the fixtures or supports will preferably be substantially rigid. Most preferably, the fixtures or supports are both substantially solid and substantially rigid.

The supports are suitably of fixed width or diameter.

Figure 4:
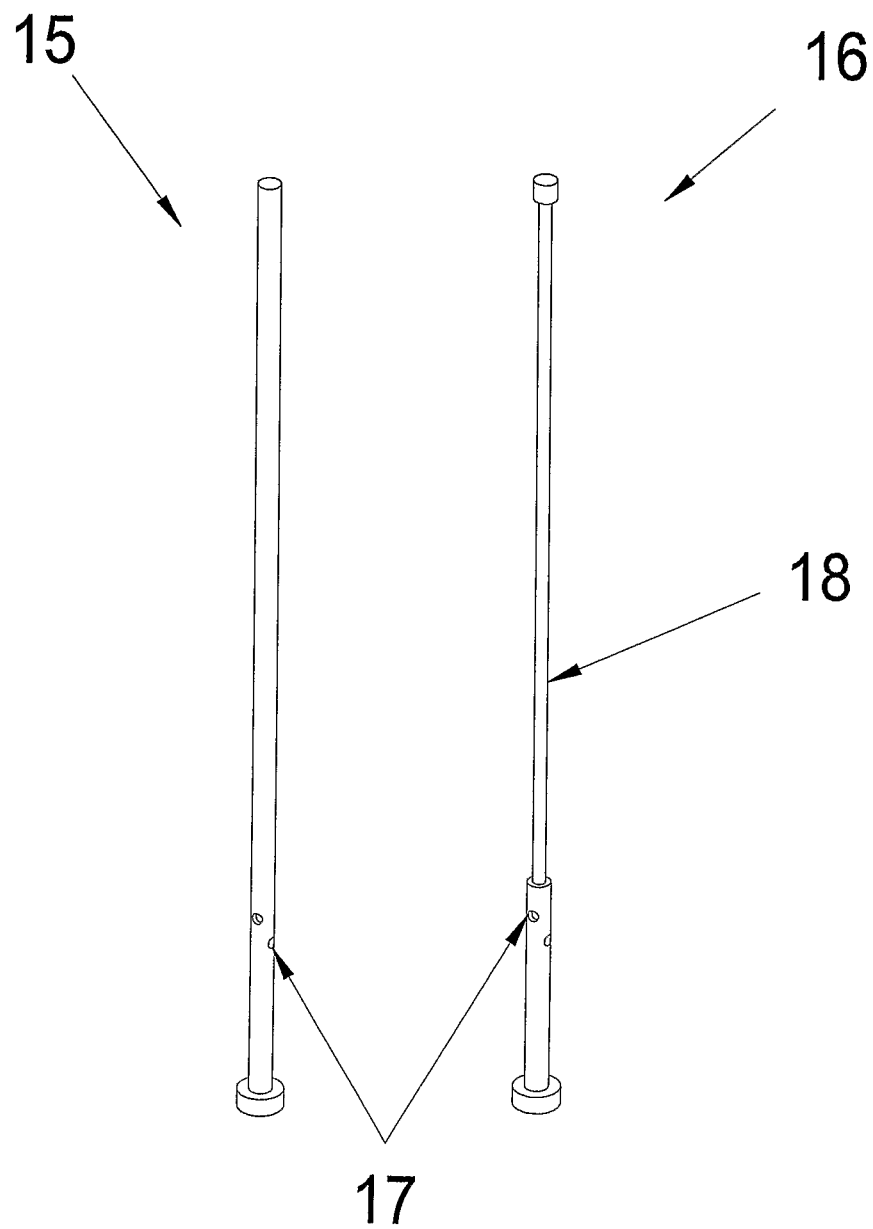
FIG. 4 shows perspective views of single-piece substantially rigid fixtures in first and second preferred fixture embodiments.

Referring to FIG. 4, two alternate substantially solid and substantially rigid fixtures or supports are depicted. The first is a substantially parallel-sided substantially solid fixture 15 which has integral flow pathways 17. The second is a compound-sided substantially solid and substantially rigid fixture 16 which has more than one compound profiled section 18. The compound-sided substantially solid fixture 16 also has integral flow pathways 17.

The compound profiled section 18 of a substantially solid and substantially rigid fixture can be for any number of purposes, including but by no means limited to:

Ease of insertion into a tube with a first open end and second open end;
An extension of the integral flow pathways to facilitate fluid flow up the length of the substantially solid fixture;
To aid mechanical stiffness or strength;
To facilitate sealing between the substantially solid fixture, a tube with a first open end and second open end and a mould;
Any combination of the above.

The preferred embodiment substantially solid and substantially rigid fixture may be:

Of single or compound section format;
Of any cross-sectional form/shape, whether it be round, square, rectangular, ovoid or any other suitable form/shape, and with successive compound sections able to be of the same or any alternate cross-sectional form;
Of any lateral, diametral and longitudinal dimension; and
Of any material suitable for the purpose.

In some embodiments, other fixtures or supports could be used.

FIGS. 5 to 11 show components of a first preferred embodiment tube profiling apparatus for carrying out a profiling method in accordance with a preferred embodiment of the present invention.

Figure 5:
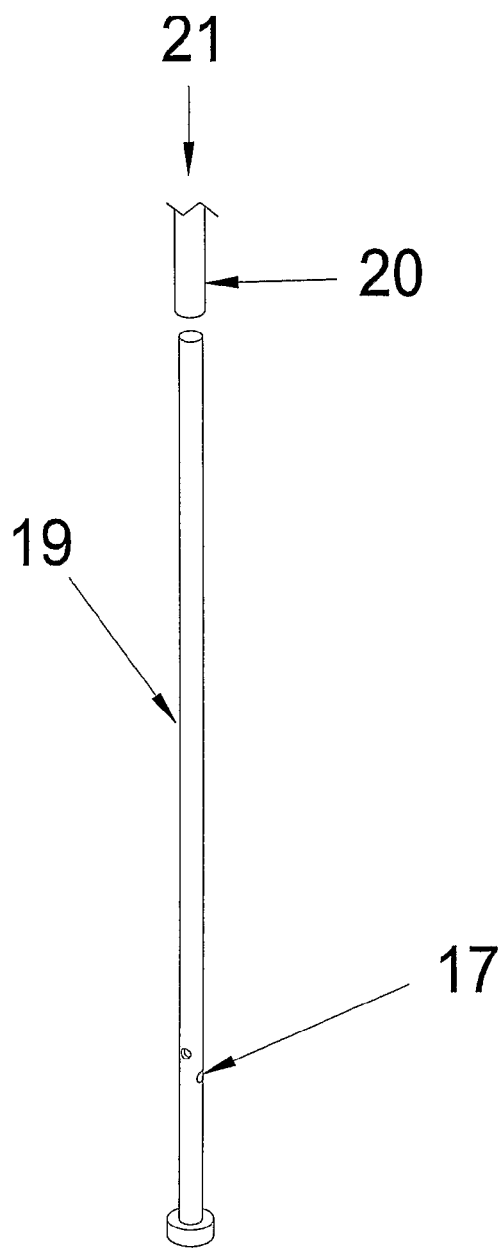
FIG. 5 shows a perspective view of a substantially rigid fixture and a partial perspective view of a tube with a first open end and second open end of a first preferred embodiment tube profiling apparatus, which fixture includes integral flow pathways.

Referring to FIG. 5, a first preferred embodiment tube profiling apparatus of the present invention has a substantially solid and substantially rigid fixture 19 or support with at least one aperture 17 in communication with one or more integral flow pathways. This figure also shows a partial view of a tube 20 with a first open end and second open end.

The first step using the first preferred embodiment tube profiling apparatus of the present invention is for the tube 20 with the first open end and the second open end to be mechanically loaded/pressed downwards 21 onto the fixture.

The substantially rigid and solid fixture as depicted could be substituted with any alternate substantially solid fixture format, either of substantially straight sided format, or compound-profiled format.

The tube with the first open end and the second open end as depicted could be of any wall thickness, length, colour, number of layers and cross-sectional form including being substantially flat whether as-formed substantially flat or formed substantially flat as the result of a post process, and of any suitable heat-formable material.

In the event that the tube with a first open end and second open end 20 was substantially flat, then the mechanical feed equipment would perform an initial step of opening out the substantially flat tube 20 with a first open end and second open end either before or as a result of mounting it on the fixture such that the tube 20 snuggly conforms to or engages with the fixture 19. Given the wall thicknesses and elasticity of the materials involved, such conformation is readily achievable. Additionally, if the tube is to be made from a sheet of material, a first step may be forming the substantially flat tube by folding the sheet and joining the free edges of the sheet.

Figure 6:
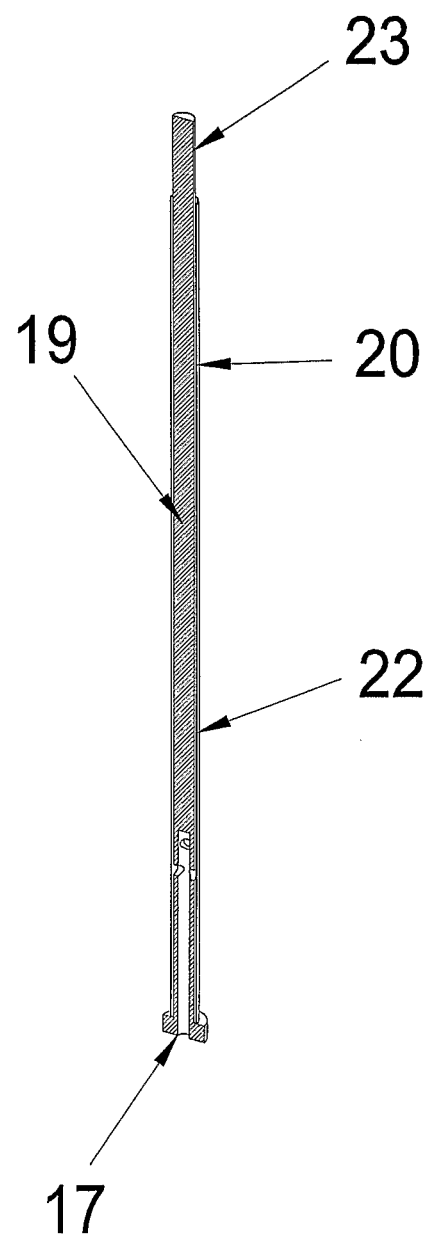
FIG. 6 shows a perspective view of the substantially rigid fixture and the tube with a first open end and second open end of FIG. 5 conformingly and snugly engaged.

Referring to FIG. 6, the tube 20 is depicted snuggly conforming to and fully supported by a substantially solid fixture. The tube has been fully pressed down on to the substantially solid fixture 19 such that the tube 20 conformingly engages with and is fully supported by 22 the substantially solid and substantially rigid fixture 19. The substantially solid and substantially rigid fixture 19 extends through the full length and an end 23 protrudingly extends out of the tube 20.

The substantially solid and substantially rigid fixture 19 may also extend through the tube 20 such that:

The substantially solid and substantially rigid fixture 19 extends the length of the tube 20 such that none of the substantially solid and substantially rigid fixture 19 protrudes out of the tube 20; or The substantially solid and substantially rigid fixture 19 extends substantially the full length of the tube 20 such that none of the substantially solid and substantially rigid fixture 19 protrudes out of the tube 20.

The key thing is for the fixture to support the tube along at least a substantial part of the tube corresponding to the product(s) to be formed. More preferably, the fixture preferably extends beyond the entire length of the product(s) to be formed.

Such configurations will enable the substantially solid and substantially rigid fixture 19 to fully support at least the portion of the tube corresponding to the product(s) to be formed during any subsequent heating phase particularly where frozen-in stresses are concerned, and additionally provides the basis of sealing engagement between the fixture 19, the tube 20 and a mould. That will maintain a longitudinal axis of the tube substantially straight when in the heated state. A farther benefit is that will minimise the potential of pinching sections of the tube when the mould is closed, in areas where that is not desired.

Figure 7:
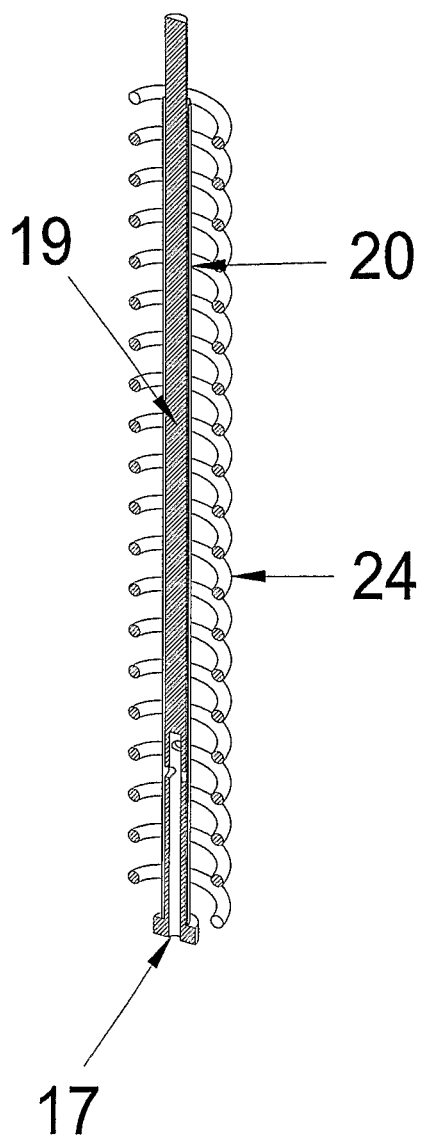
FIG. 7 shows a perspective cross-section view of the substantially rigid fixture and tube with the first open end and second open end of FIG. 6 wherein heat is being applied by a heating element of the first preferred embodiment tube profiling apparatus to heat-soften the tube with a first open end and second open end at least partially along its length.

Referring to FIG. 7, the tube 20 fully supported and engaged with the substantially solid and substantially rigid fixture 19 is depicted in cross-sectional view exposed to a heat source 24 which will heat-soften the tube 20 at least partially along its length while ensuring that any frozen-in stresses in the tube 20 as a result of the extrusion process do not lead to any appreciable tube distortion.

The heat source is depicted in the form of an electrical coil heating element, however as will be apparent to those versed in the art, alternate heat sources could be used, including but by no means limited to:

A source of heated air or gas;

Radiant heat; or

A heat tunnel.

In the embodiment shown, the heat source 24 extends substantially along the length of the tube 20. It will be appreciated that this is not essential, and could extend along only the portions to be profiled by the apparatus. It will also be appreciated that more or less heat can be applied in various zones along the length of the tube 20 dependent on the degree of profiling required at any given point.

Figure 8:
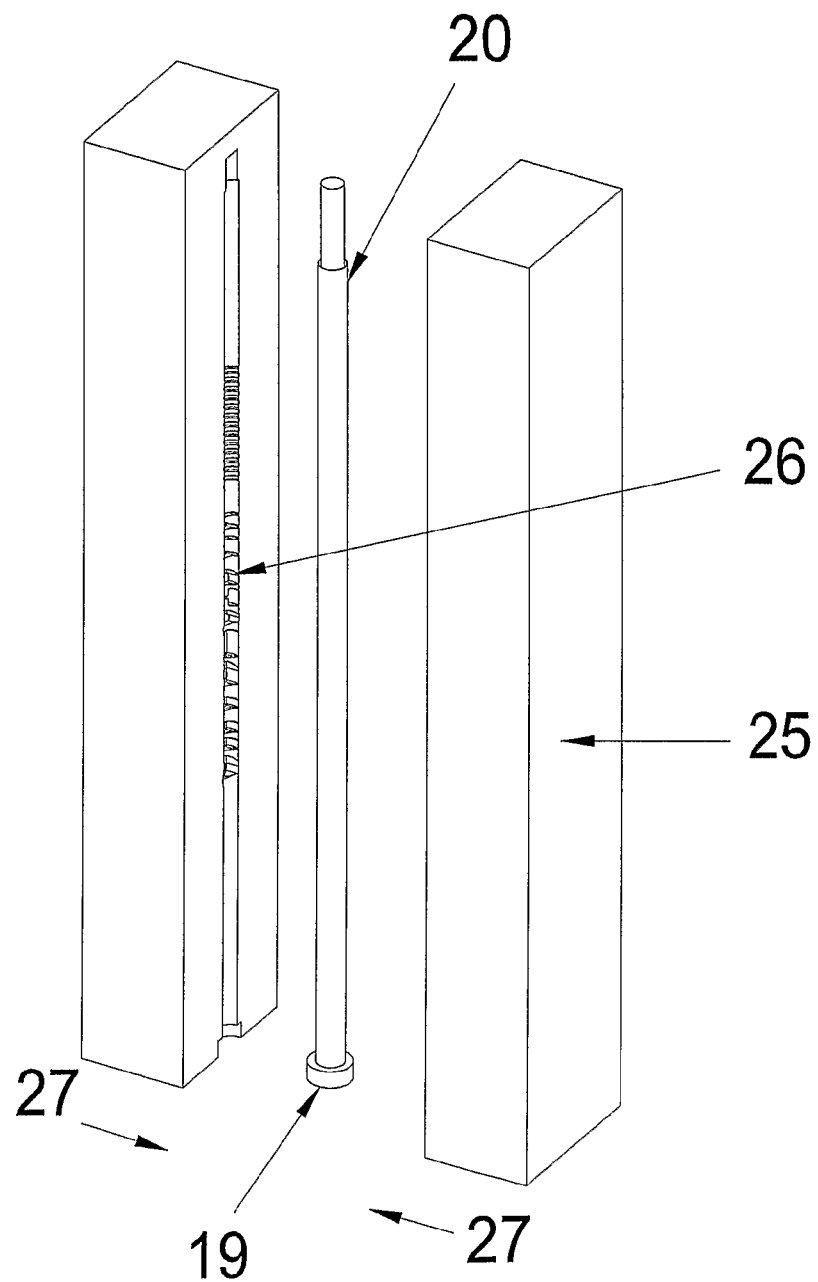
FIG. 8 shows a perspective view of the substantially rigid fixture and the heat-softened tube with a first open end and second open of FIG. 7 about to be encased in a mould.

Referring to FIG. 8, the substantially solid and substantially rigid fixture 19 and heat-softened tube 20 of FIG. 7 is depicted about to be encased in a mould. The mould 25 has profiled cavities 26 and is mechanically moved 27 in an inwards direction to encase the substantially solid and substantially rigid fixture 19 and the heat-softened tube 20.

Figure 9:
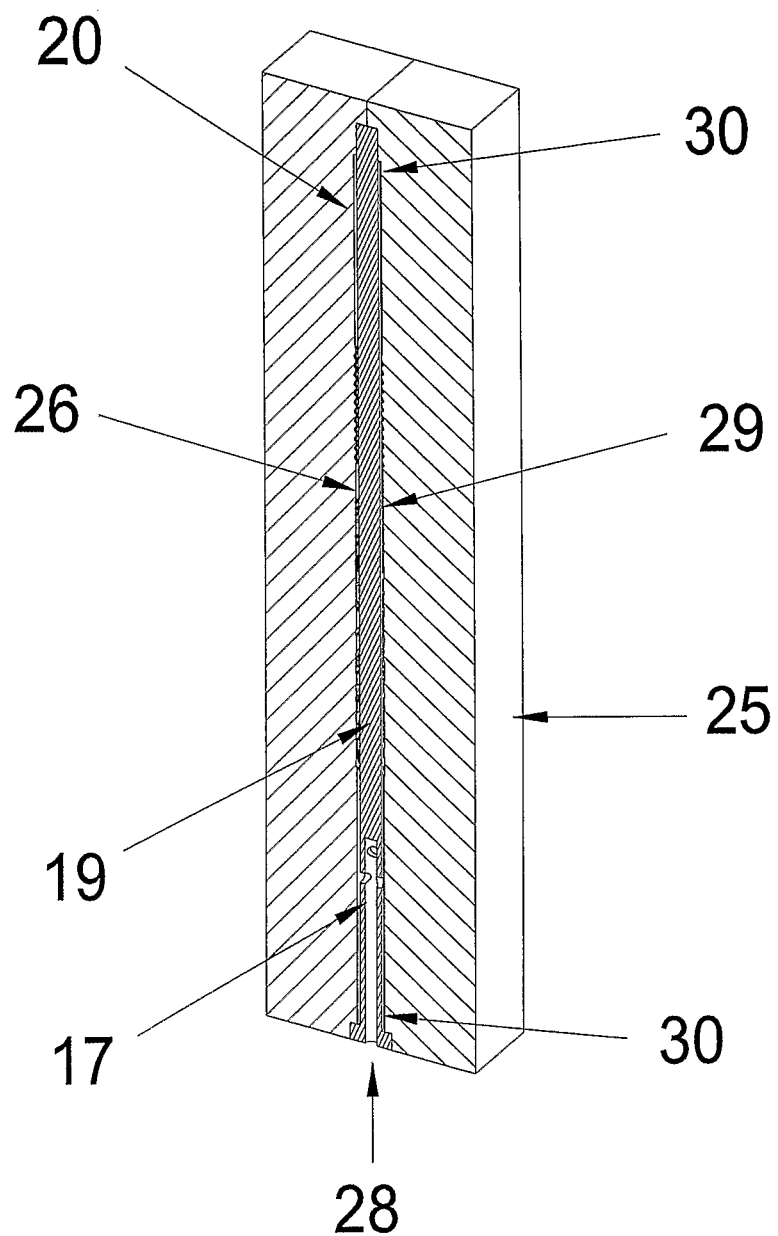
FIG. 9 shows a perspective cross-section view of the heat-softened tube with a first open end and second open end and substantially rigid fixture of FIG. 8 sealingly encased in a mould of the first preferred embodiment tube profiling apparatus, which mould includes a profiled cavity, and additionally shows application of a pressure source to conform the heat-softened tube with a first open end and second open end to the mould cavity.
Figure 10:
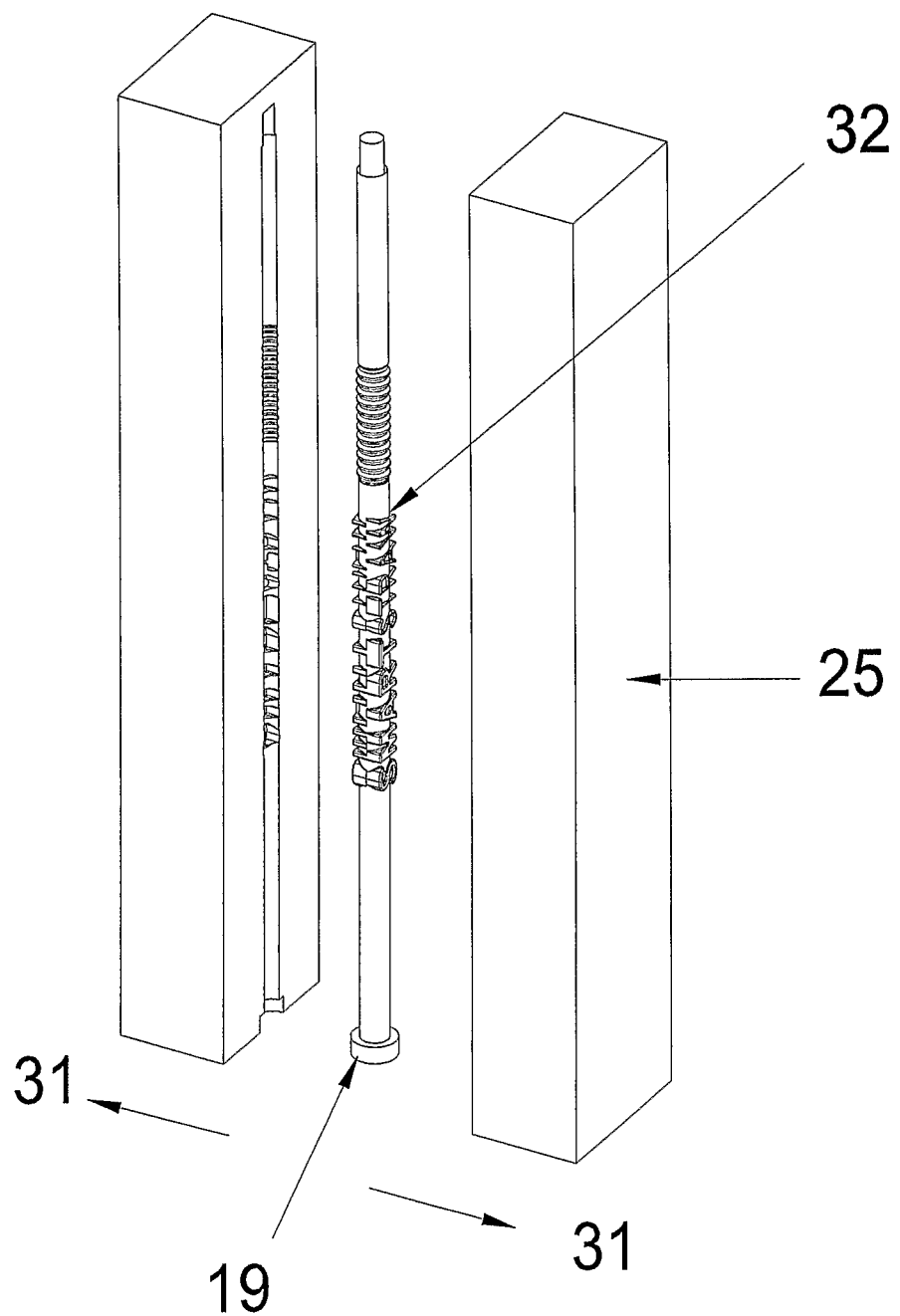
FIG. 10 shows a perspective view of the substantially rigid fixture and mould of FIG. 9 opened to release an as-profiled product with a first open end and second open end.

Referring to FIG. 9, the substantially solid and substantially rigid fixture 19 and heat-softened tube 20 and mould 25 are depicted sealingly engaged and with a pressure source applied. The seal as depicted is whereby the tube with the first open end and second open end is sandwiched 30 at both ends between the substantially solid fixture 19 and the mould 25. This sandwich 30 can be used to form either a partial or a full seal.

Any other known form of partial or full sealing arrangement may be employed. Any combination of sealing methods may also be employed.

The pressure source 28 is applied through the integral flow pathways 17 of the substantially solid and substantially rigid fixture 19 to apply a fluid pressure change to the tube, thereby conformingly deforming 29 the heat-softened tube 20 to the profiled cavities 26 of the mould 25. The pressure source 28 can:

Apply an increase in pressure inside the heat-softened tube 20;

Apply a decrease in pressure outside the heat-softened tube 20; or

Apply a combination thereof.

As the pressure 28 is applied to the heat-softened tube 20, the heat-softened tube 20 is conformingly deformed to the mould cavity 29.

Referring to Figure Ten, a mould 25 is depicted open following the forming process of FIG. 9. At the completion of the forming process of FIG. 9, the mould is mechanically moved outwards 31 thereby releasing the substantially solid and substantially rigid fixture 19 and the as-profiled tube 32 with a first open end and second open end.

Figure 11:
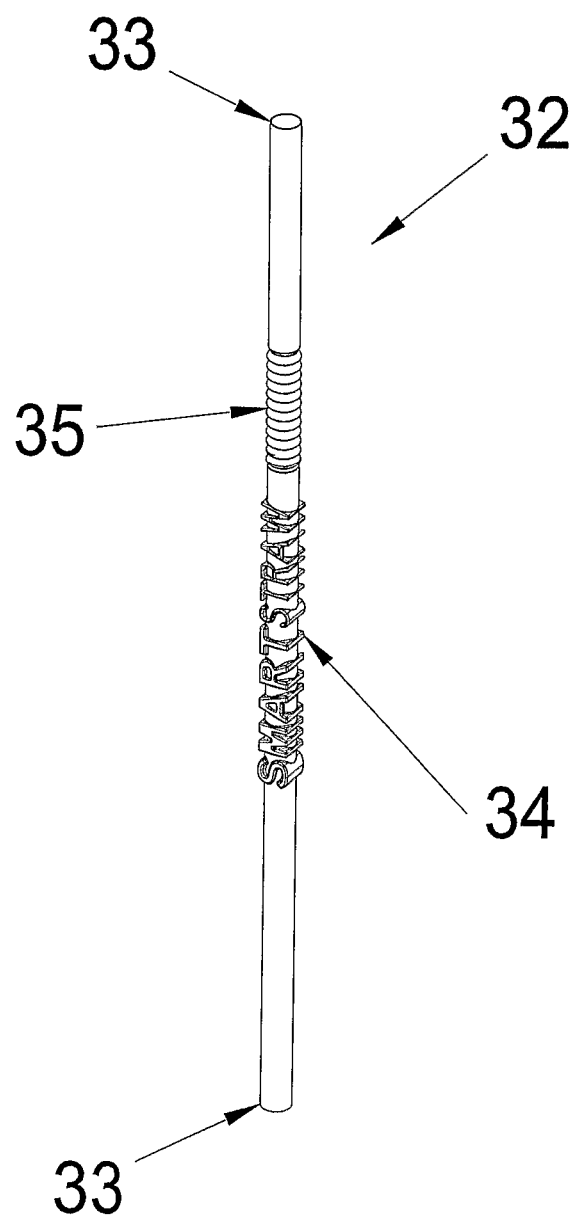
FIG. 11 shows a perspective view of the as-profiled product with a first open end and second open end in accordance with a first preferred embodiment of the present invention in the form of an as-profiled drinking straw, removed from the mould and substantially rigid fixture.

Referring to FIG. 11, the final as-profiled product 32 with a first open end and second open end made using a first preferred embodiment tube profiling apparatus of the present invention is depicted in three dimensional view as an as-profiled drinking straw with a first open end and second open end, removed from any encasement or engagement with fixtures or moulds.

Upon removal of the as-profiled drinking straw with a first open end and second open end 32 from the fixture and the mould, the previously described action of at least partially sealing the first open end and second open end of the tube may result in their need to be trimmed 33 to remove any excess material deformed as a result of the at least partial sealing action.

The amount of material trimmed 33 may be:

A small amount if the sealing action is very localised at the first open end and/or second open ends of the tube;

A larger amount if the sealing action was as a result of the mould pinching closed either end of the tube. If, upon forming the as-profiled product one or both ends are closed, the trimming will occur between the seal(s) and the product.

The as-profiled drinking straw with a first open end and second open end 32 of FIG. 11 is depicted as an as-profiled drinking straw 32 suitable for promotional purposes in accordance with a first preferred embodiment of the present invention. The as-profiled drinking straw 32 has embossed lettering 34 down its side. The embossed lettering 34 may be either convexly rising out of the surface or concavely sinking into the surface, or a combination. The as-profiled drinking straw 32 can also have circumferential grooves 35 for flexibility. The as-profiled drinking straw 32 may have:

The embossed lettering 34 without the circumferential grooves 35;

The circumferential grooves 35 without the embossed lettering 34; or

Any combination thereof.

The embossed lettering 34 may be any form of alphabetical, numerical, or geometric symbol, or any other suitable form.

The apparatus and/or method can be modified to form any combination of as-profiled drinking straws or any combination of as-profiled tubes having other profiles, a number of which are described below by way of example only.

Figure 12:
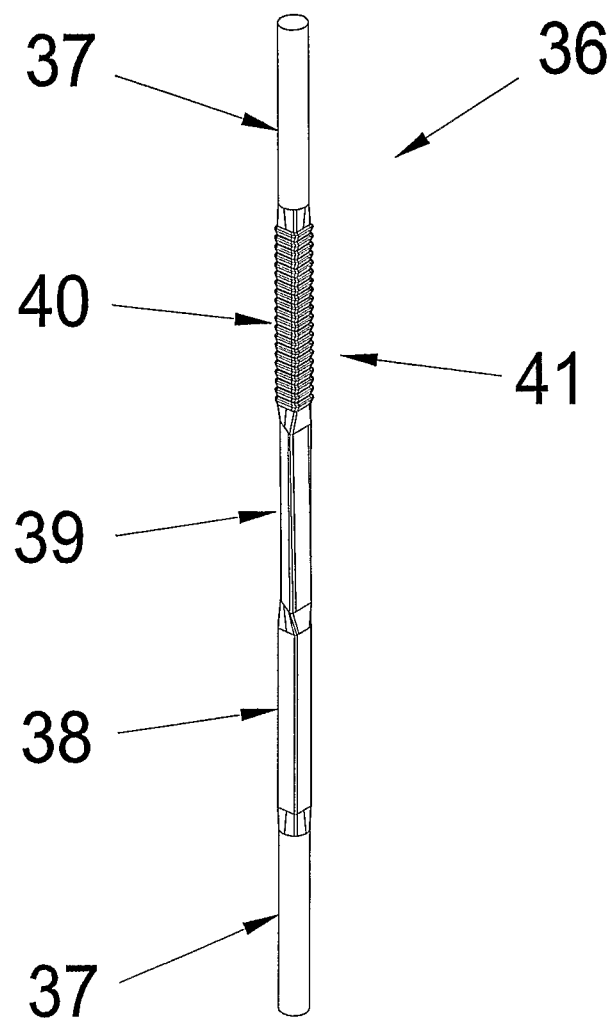
FIG. 12 shows a perspective view of an as-profiled drinking straw in accordance with a second preferred embodiment of the present invention which has multiple combinations of geometric cross-sections and grooving along its length.

Referring to FIG. 12, a second preferred embodiment as-profiled drinking straw 36 is depicted, whereby a profiled drinking straw can have fun value. The as-profiled drinking straw 36 has compound geometric cross sections including, but by no means limited to, the original circular cross sections 37 at either end of the as-profiled drinking straw 36, a square cross section 38, a triangular cross section 39 and a flexible square cross section 40 as a result of circumferential grooves 41.

The as-profiled drinking straw 36 may or may not have a flexible section and it will further be apparent that virtually any formable profile or combination of profiles can be generated and any profile or geometric form can have circumferential grooves to make a section or sections flexible.

Figure 13:
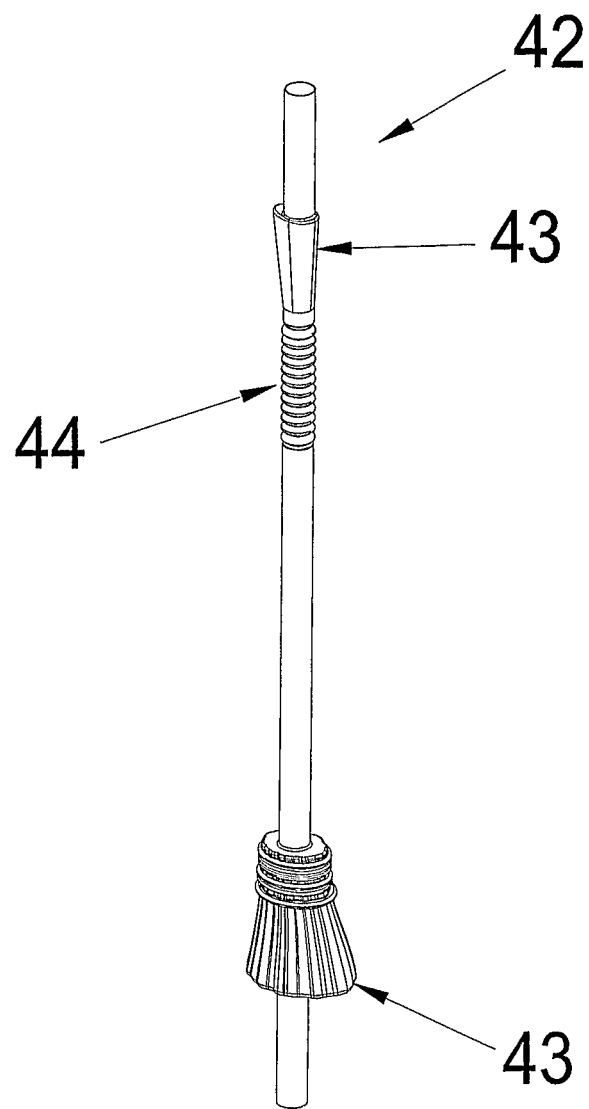
FIG. 13 shows a perspective view of an as-profiled drinking straw in accordance with a third preferred embodiment of the present invention with a shaped section of significantly larger diameter along its length.

Referring to FIG. 13, a third preferred embodiment as-profiled drinking straw 42 is depicted, whereby large changes in shape can be incorporated in the as-profiled drinking straw. The as-profiled drinking straw 42 has significantly increased diameter or width shaped sections 43.

The significantly increased diameter or width shaped sections 43 can be any shape or form desired within the capabilities of the blow-moulding technique and further that one or more significantly increased diameter shaped sections 43 may occur down the length of any as-profiled drinking straw 42. As-profiled drinking straws 42 with large changes in shape may or may not have circumferential grooves 44 for flexibility.

Figure 14:
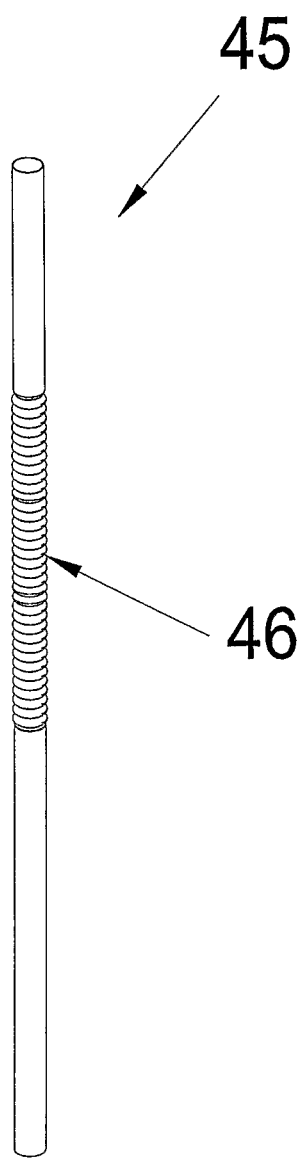
FIG. 14 shows a perspective view of an as-profiled drinking straw in accordance with a fourth preferred embodiment of the present invention with a large number of circumferential grooves down its length.

Referring to FIG. 14, a fourth preferred embodiment as-profiled drinking straw 45 is depicted, whereby any number of circumferential grooves 46 can be included down the length of the as-profiled drinking straw 45.

Unlike existing straw grooving methods where more than ten to twelve grooves have a significant and adverse impact on machine speed due to the requirement of maintaining straightness, as taught in this new method, the number of grooves have no relevance to machine speed. Whether it is one groove or the as-profiled drinking straw 45 has grooves from one end of the as-profiled drinking straw to the other, the manufacture time is the same.

Figure 15:
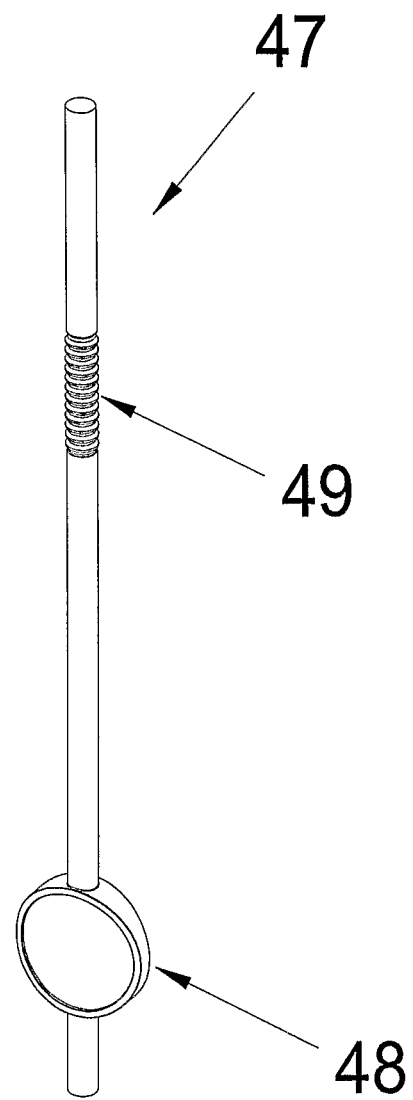
FIG. 15 shows a perspective view of an as-profiled drinking straw in accordance with a fifth preferred embodiment of the present invention with an integral beverage stirrer.

Referring to FIG. 15, a fifth preferred embodiment as-profiled drinking straw 47 is depicted which includes an integral beverage stirrer 48 section. The as-profiled drinking straw 47 with integral beverage stirrer 48 may or may not have flexible sections 49

Figure 16:
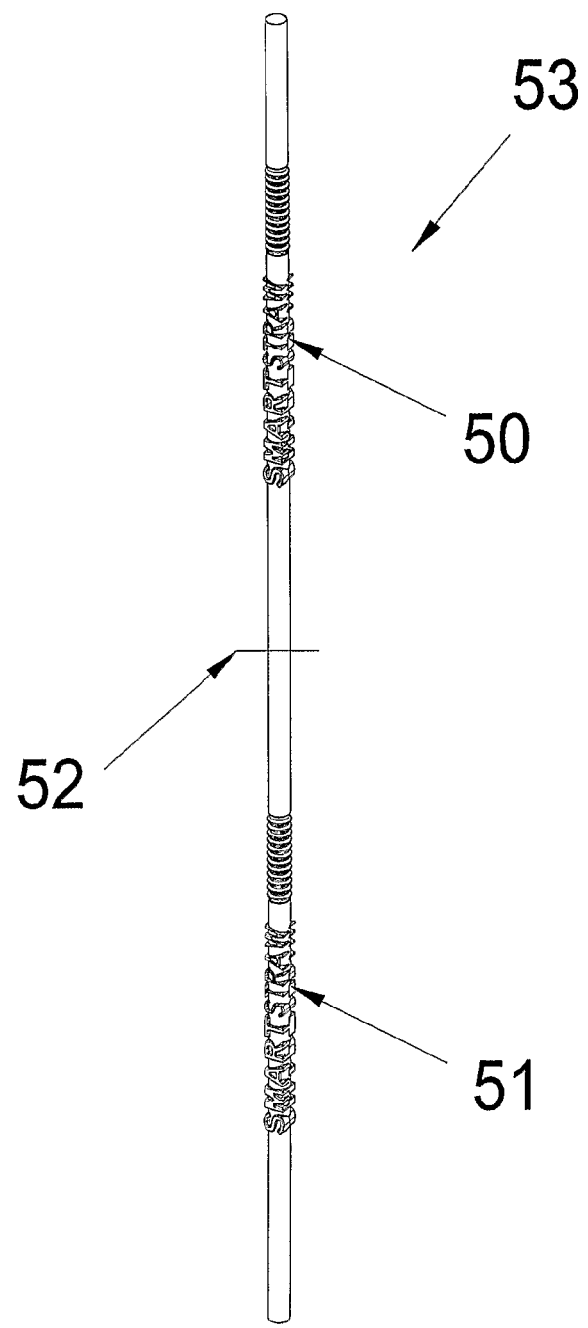
FIG. 16 shows a perspective view of a plurality of as-profiled drinking straws being produced out of a single tube, each of which has a first open end and second open end in accordance with a sixth preferred embodiment of the present invention.

Referring to FIG. 16, a plurality of as-profiled products, namely drinking straws 50 and 51 are depicted being formed out of a single tube with a first open end and second open end 53. Following the formation process as herein described, a post-process will separate the as-profiled drinking straws 50, 51 at separation region 52 by any suitable form of cutting process. Depending on fixture stability, any number or combination of as-profiled drinking straws can be produced out of a single tube with a first open end and second open end. Each product has a first open end and a second open end, although it will be appreciated that an open end of one product connects with an open end of the other product, until separated post-forming.

The process herein described can form tubes with a first open end and second open end into many other products or product subcomponents other than as-profiled drinking straws, a number of which are described below by way of example only.

Figure 17:
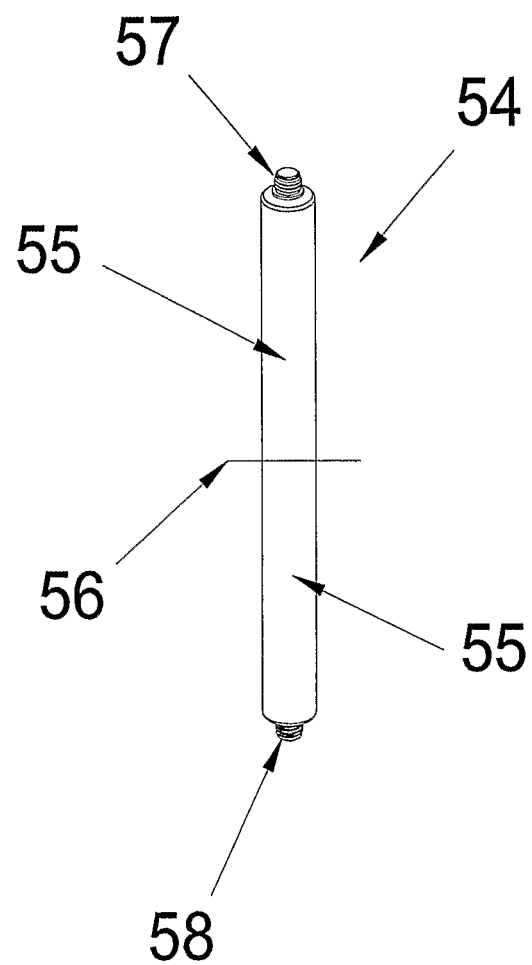
FIG. 17 shows a perspective view of two back-to-back as-formed tube-based products, each of which has a first open end and second open end in accordance with a seventh preferred embodiment of the present invention.

Referring to FIG. 17, tube 54 with a first open end and second open end has been formed into two back-to-back as-profiled tube-based products with a first open end and second open end. The products 55 will be separated at 56 in a post-process by any suitable form of cutting process. The as-profiled tube-based products 55 each with a first open end and second open end can be, including but by no means limited to:

Oral care tubes;

Cosmetic tubes;

Home handyman product tubes;

Automotive product tubes; or

Any form of pharmaceutical tube.

In this format, the first open end 57 and second open end 58 of the tube 54 have been formed into the threaded neck closure portions of respective as-profiled tube-based products 55. The second open ends of the as-profiled tube-based products 55 will be separated by the post-process of separation at 56. Each product has a first open end and a second open end, although it will be appreciated that an open end of one product connects with an open end of the other product, until separated post-forming.

Either the first open end 57 or the second open end 58 may have to be trimmed to remove any excess material deformed as a result of the at least partial sealing action.

The second open ends 56 of each product 55 can be closed or sealed in a post-forming process.

Figure 18:
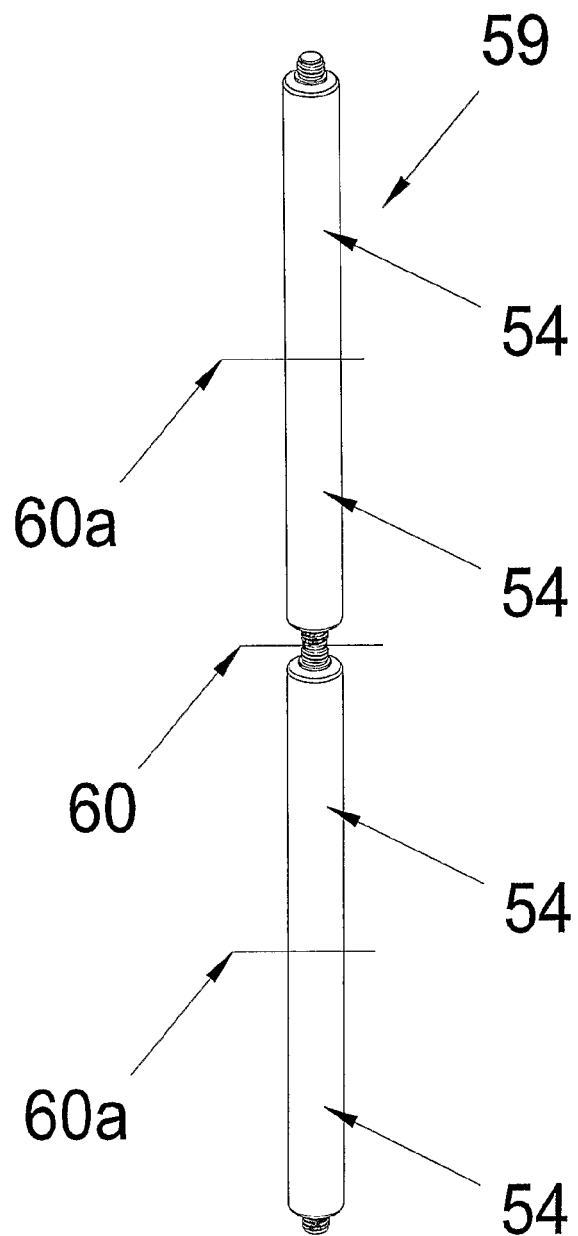
FIG. 18 shows a perspective view of a plurality of back-to-back as-formed tube-based products, each of which has a first open end and second open end in accordance with an eighth preferred embodiment of the present invention.

Referring to FIG. 18, a tube 59 with a fist open end and a second open end has been formed into a plurality of as-profiled tube-based products 59, each with a first open end and second open end. The two sets of back-to-back as-profiled tube-based products 54, as the result of a post-process, can be separated at 60 and 60a by any suitable form of cutting process.

Further cutting and trimming may occur as previously described for FIG. 17. In the form shown, the preferred embodiment method and apparatus is used to make four products from a single tube, and on a single support.

Figure 19:
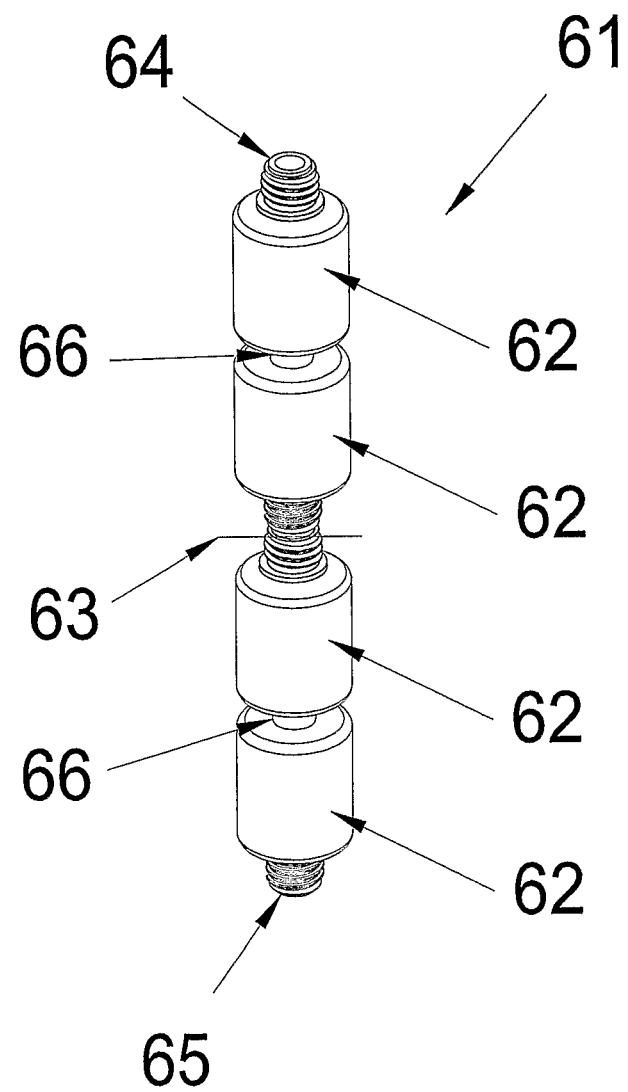
FIG. 19 shows a perspective view of a plurality of as-formed bottle-based products, each of which has a first open end and second open end in accordance with a ninth preferred embodiment of the present invention.

Referring to FIG. 19, a tube 61 with a first open end and second open end has been formed into a plurality of as-profiled bottle-based products 62, each with a first open end and second open end. The multiple sets of back-to-back as-profiled bottle-based products 62, as the result of a post-process, can be separated at 63 and 66 by any suitable form of cutting process.

As with FIG. 17, the first open end 64 and second open end 65 of the as-profiled tube with a first open end and a second open end 61 may have to be trimmed to remove any excess material deformed as a result of the at least partial sealing action.

As additional post process each as-profiled bottle-based product 62 may, and including but by no means limited to:
  Have its second open end closed such that it has only one remaining open end; and/or
  Be printed or labeled in any format, either while still mounted on the substantially solid and substantially rigid fixture or after they have been removed from the substantially solid and substantially rigid fixture.

Figure 20:
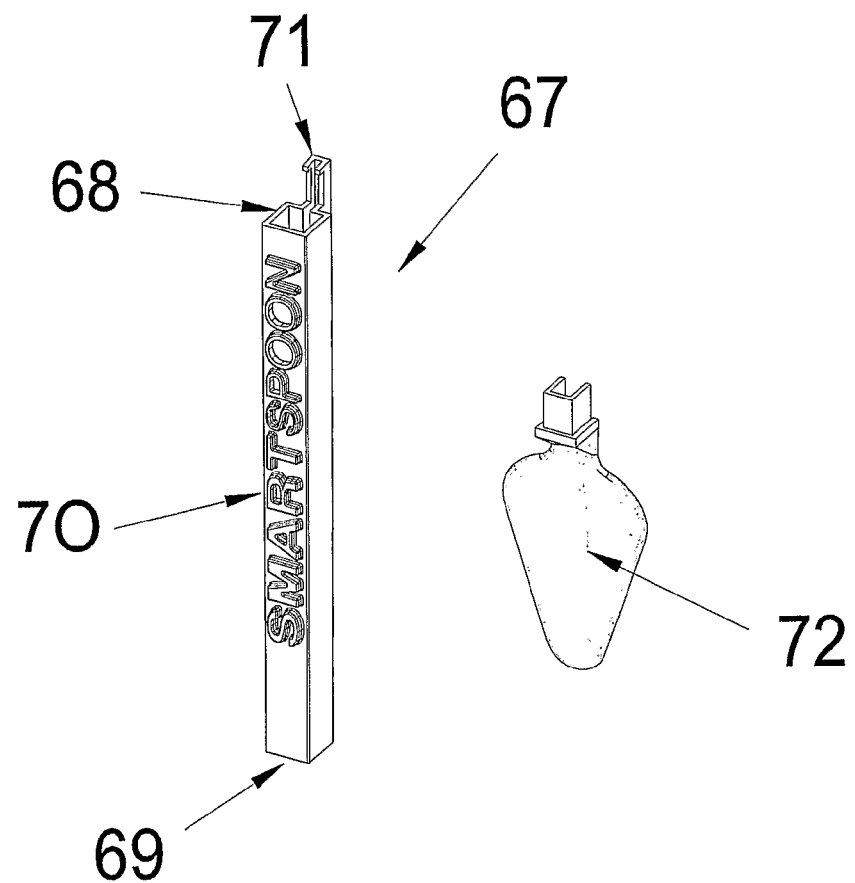
FIG. 20 shows a perspective view of an as-formed handle of a utensil with a first open end and second open end in accordance with a tenth preferred embodiment of the present invention.

Referring to FIG. 20, a tube with a first open end and second open end has been formed into an as-profiled utensil handle with a first open end 68 and second open end 69. The as-profiled utensil handle 66 with a first open end 68 and second open end 69 can have any form of lateral, diametral or longitudinal profiling 70. The as-profiled utensil handle with a first open end and second open end may have one or more clip-features 71 formed as part of the forming and/or open end trimming processes. A sample utensil head 72 is also depicted. The utensil head will be formed by any suitable process such as injection moulding for example.

In a similar manner to that described above, a plurality of as-profiled utensil handles 67, each with a first open end and second open end, may be formed from one single tube with a first open end and second open end and in a single support.

Figure 21:
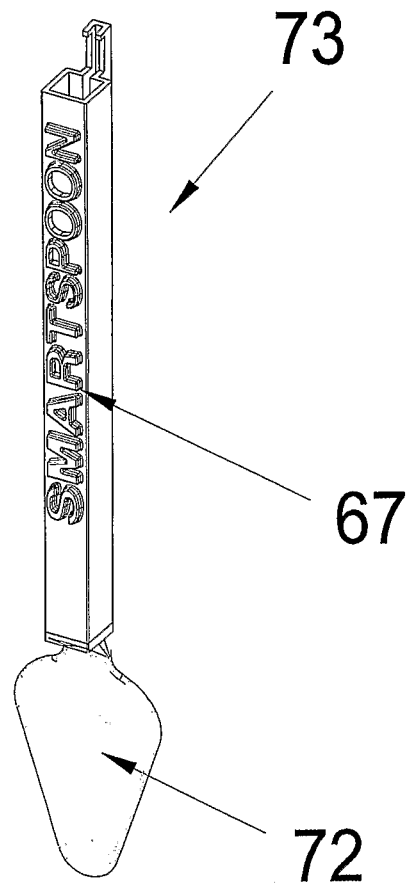
FIG. 21 shows a perspective view of a completed utensil in accordance with the same tenth preferred embodiment of the present invention as depicted in FIG. 20.

Referring to FIG. 21, a complete utensil 73 is depicted; being a composite of a utensil head 72 and an as-profiled tube utensil handle with a first open end and second open end. A portion of the utensil head 72 is preferably configured to be received in an open end of the as-profiled utensil handle, and may be held in position by the clip feature(s).

As will be apparent to those versed in the art, such a the preferred apparatus and method can be used to form tubes with a first open end and second open end into sub-components of composite products, such as those listed in the "Summary of the Invention" section and including:
  Any form of utensil; or
  Any form of toy.

FIGS. 22 to 32 show components of a second preferred embodiment tube profiling apparatus for carrying out a profiling method in accordance with a preferred embodiment of the present invention.

Figure 22:
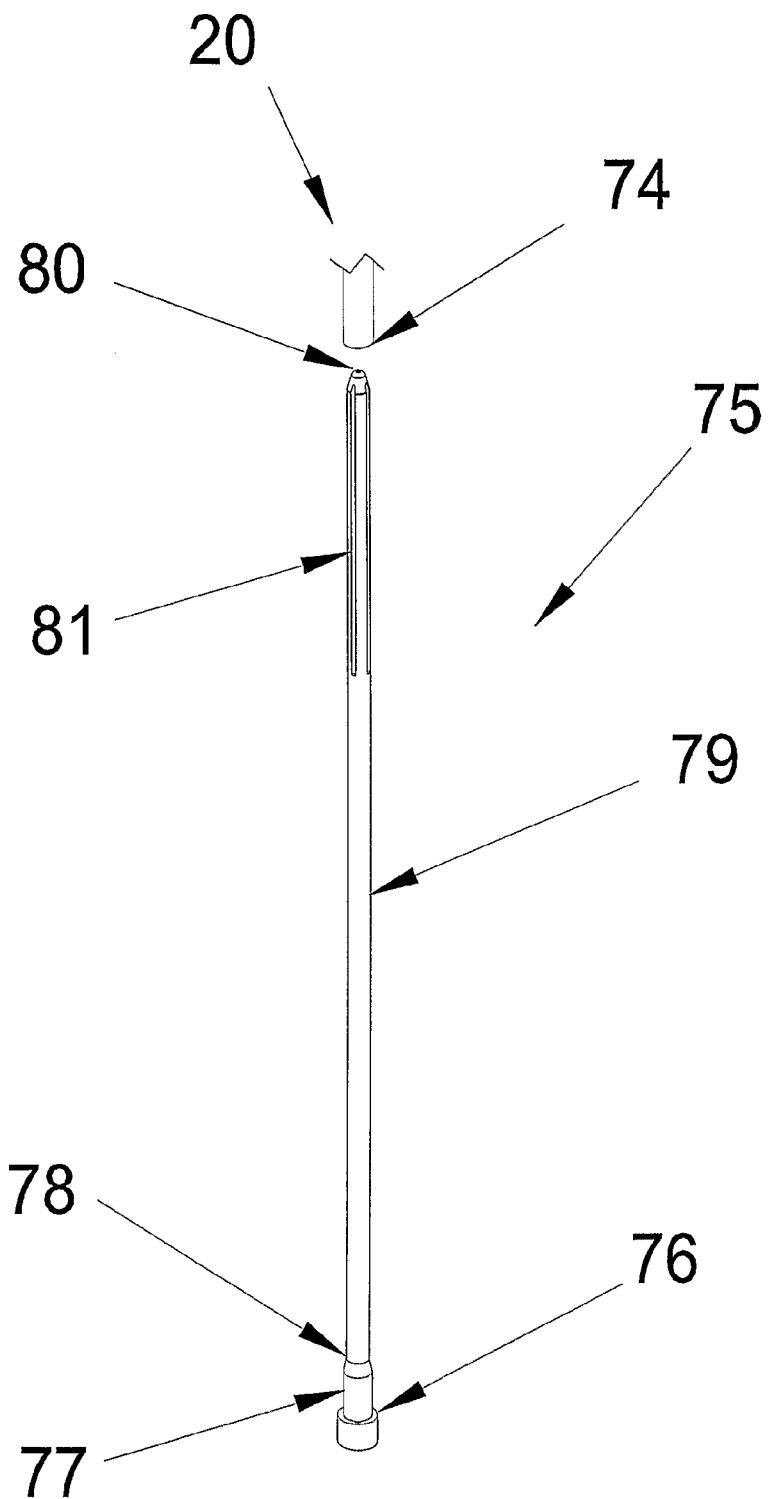
FIG. 22 shows a perspective view of a first fixture and a partial perspective view of a tube with a first open end and second open end of a second preferred embodiment tube profiling apparatus, which first fixture includes integral flow pathways.

Referring to FIG. 22, a second preferred embodiment tube profiling apparatus of the present invention includes a first fixture part or support part 75. The first fixture part 75 is substantially solid and substantially rigid, and has an enlarged portion defining a shoulder 76 against which the first open end 74 of a tube 20 with a first open end and second open end (only partly shown) will abut in use, an intermediate diameter section 77 wherein the diameter will be a snug fit into the inside of the tube 20 with a first open end and second open end, a tapered section 78 which will allow ease of insertion into the first open end 74 of the tube 20 with a first open end and second open end, a lesser diameter section 79 wherein the diameter is less than or equal to the minimum deformed internal diameter of the tube 20 with a first open end and second open end, a lead-in section 80 for ultimate engagement with at least one further mating part and at least one flow pathway 81 which extends at least partly along the length of the lesser diameter section 79 from the upper end.

Figure 23:
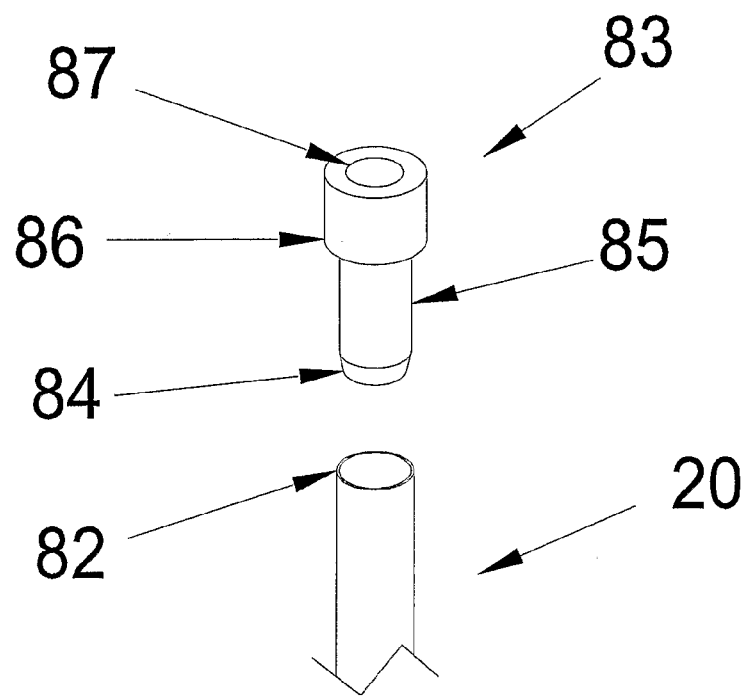
FIG. 23 shows a perspective cross-section view of a second fixture of the second preferred embodiment tube profiling apparatus.

Referring to FIG. 23, the second preferred embodiment tube profiling apparatus of the present invention also includes a second substantially solid and substantially rigid fixture part or support part 83. The second fixture part 83 has a tapered section 84 which will allow ease of insertion into the second open end 82 of a tube 20 with a first open end and second open end (only partly shown), an intermediate diameter section 85 wherein the diameter will be a snug fit into the inside of the tube 20 with a first open end and second open end, a shoulder 86 against which the second open end 82 of the tube 20 with a first open end and second open end will abut in use, and a central bore 87 for ultimate engagement with further mating parts.

Figures 24A, 24B:
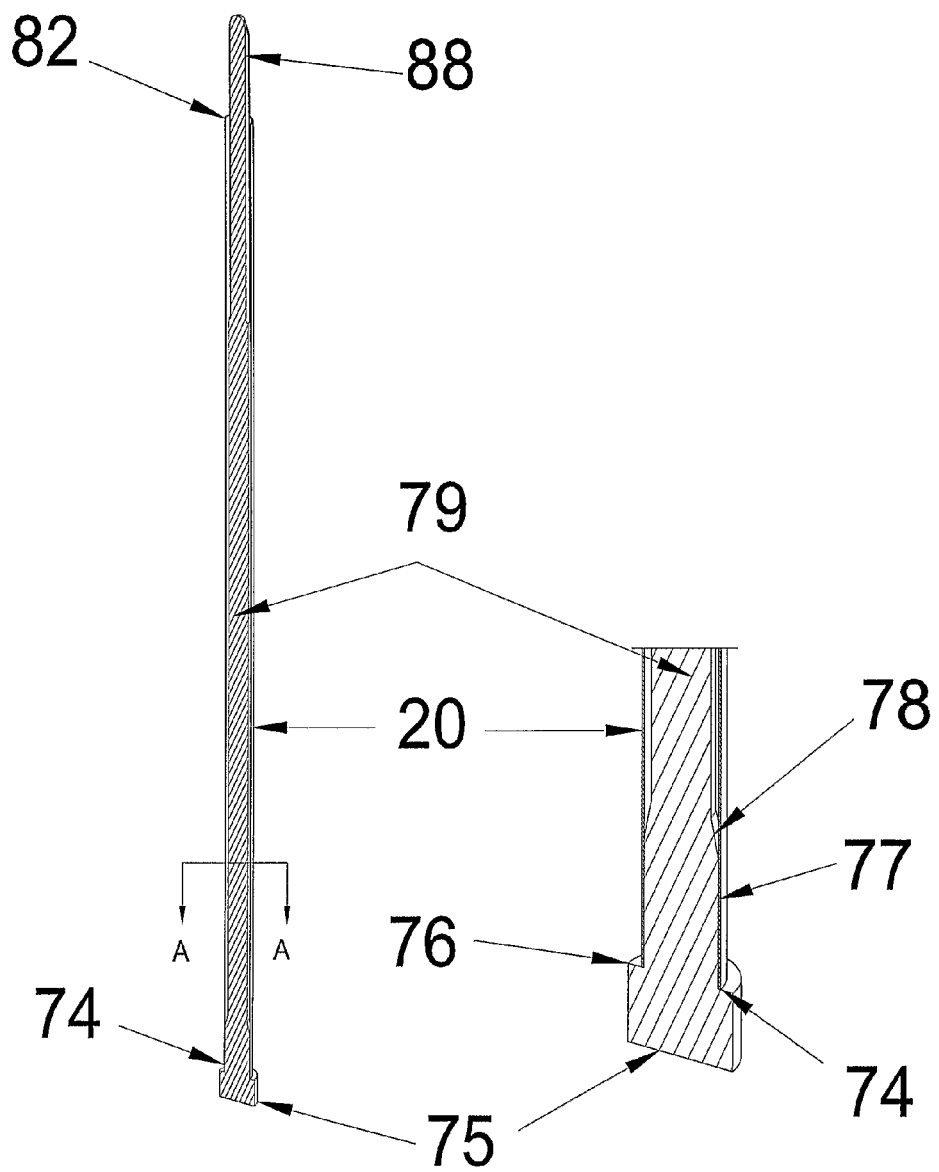
FIG. 24a shows a perspective cross-section view of a tube engaged on to the first fixture of FIG. 22.
FIG. 24b shows detail AA.

Referring to FIGS. 24a and 24b, the first fixture part 75 of FIG. 22 is depicted in cross-sectional view and in enlarged partial detail view engaged with a tube 20, wherein the tube 20 has been pushed down past the tapered section 78 of the first fixture part 75 such that the first open end 74 of the tube 20 firmly abuts against the shoulder 76 and snugly fits against the intermediate diameter 77 of the first fixture part 75. The lesser diameter section 79 of the first fixture part 75 extends free and clear 88 from the second open end 82 of the tube 20, as indicated by reference numeral 88

Figures 25A, 25B:
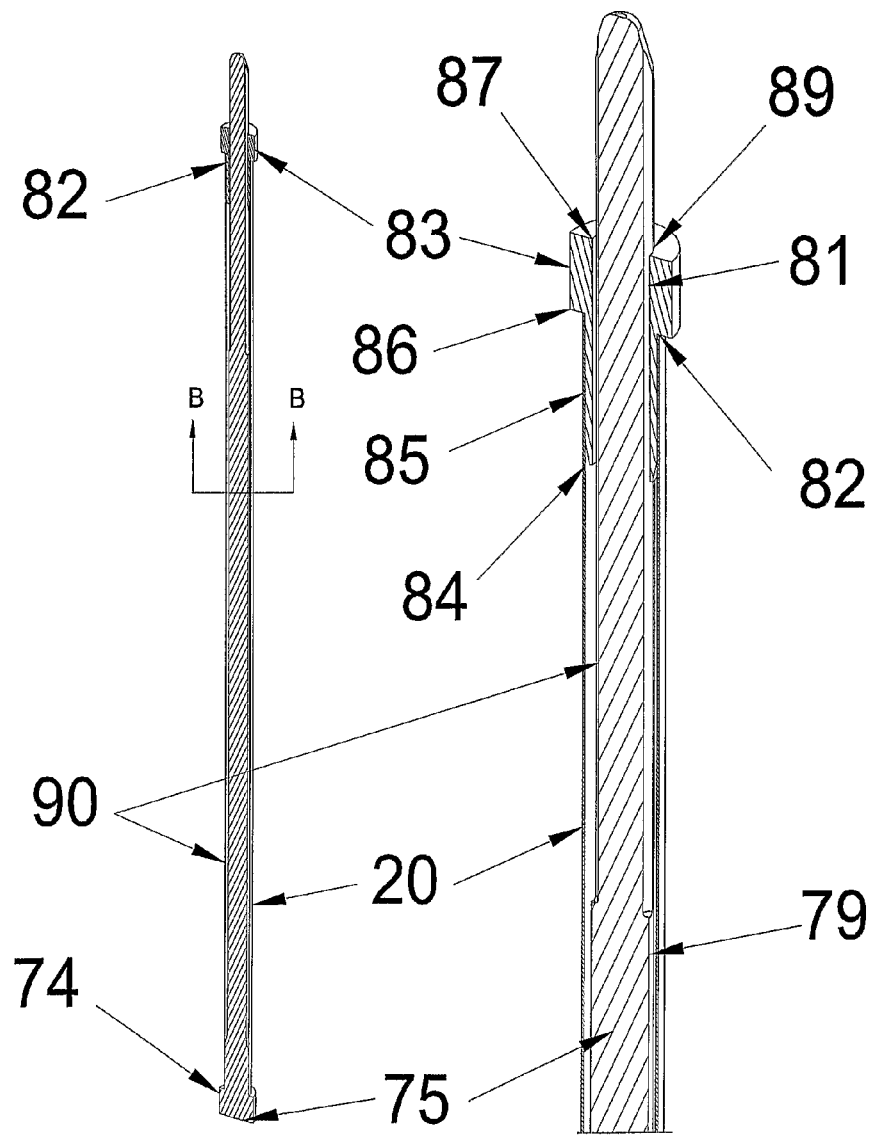
FIG. 25a shows a perspective cross-section view of the second fixture of FIG. 23 engaged on to the tube and first fixture of FIG. 24a, and FIG. 25b shows detail BB.

Referring to FIGS. 25a and 25b, the second fixture 83 of FIG. 23 is depicted in cross-sectional view and in enlarged partial detail view engaged with the tube 20 and first fixture part 75 of FIG. 24a. The central bore section 87 of the second fixture part 83 has slidingly engaged 89 with the lesser diameter 79 of the first fixture part 75 and the second fixture part 83 has been pushed downwards past its tapered section 84 such that the second open end 82 of the tube 20 has passed the tapered section 24 and firmly abuts against the shoulder 86 and snugly fits against the intermediate diameter 85 of the second fixture part 83.

A substantially enclosed internal cavity 90 has now been created inside the tube 20, bounded by the first fixture part 75 and the second fixture part 83, with the exception of access into the internal cavity 90 via the flow pathways 81. In the preferred embodiment, the internal cavity 90 is fully enclosed, with the exception of access into the internal cavity 90 via the flow pathways 81.

With modern day extruders, production control systems have advanced to the point where wall thickness and diameters can be very tightly controlled. Diametral tolerances in the order of +/−0.05 mm can routinely be achieved. Given that such tight production tolerances on diameter can readily and repeatedly be achieved it will equally be routinely possible to maintain a close control over the snugness of fit between intermediate diameter sections 77 and 85 of the first and second fixture parts 75 and 83 and with the first and second open ends 74 and 82 of the tube 20.

Figures 26A, 26B:
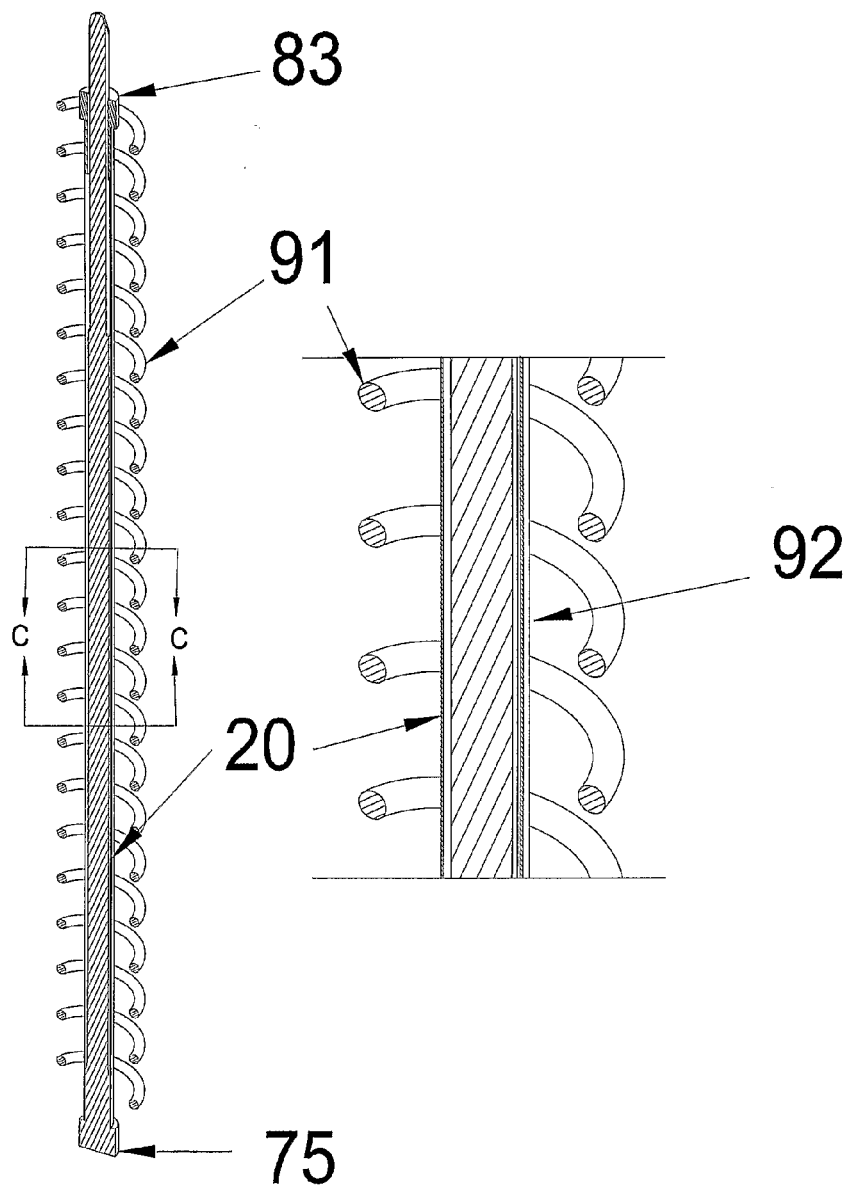
FIG. 26a shows a perspective cross-section view of the tube, first fixture and second fixture of FIG. 25a wherein heat is being applied by a heating element of the second preferred embodiment tube profiling apparatus to heat-soften the section of the tube bounded by the two fixtures.
FIG. 26b shows detail CC.

Referring to FIGS. 26a and 26b, the tube 20 engaged with the first fixture part 75 and the second fixture part 83 is depicted in cross-sectional view and in enlarged partial detail view exposed to a heat source 91 which will heat-soften the tube 20 in the free wall section 92 of the tube 20 bounded by the first fixture part 75 and the second fixture part 83. The heat source shown is in the form of an electrical coil heating element, however other heat sources could be used such as a source of heated air or gas, radiant heat or a heat tunnel for example. In the embodiment shown, the heat source 91 extends substantially along the length of the free wall section 92 of the tube 20. It will be appreciated that is not essential, and could extend along only the portion of the length of the tube 20 that is to be profiled by the apparatus, and the heat source 92 could also provide different levels of heat in different zones down its length as and where required.

Figures 27A, 27B:
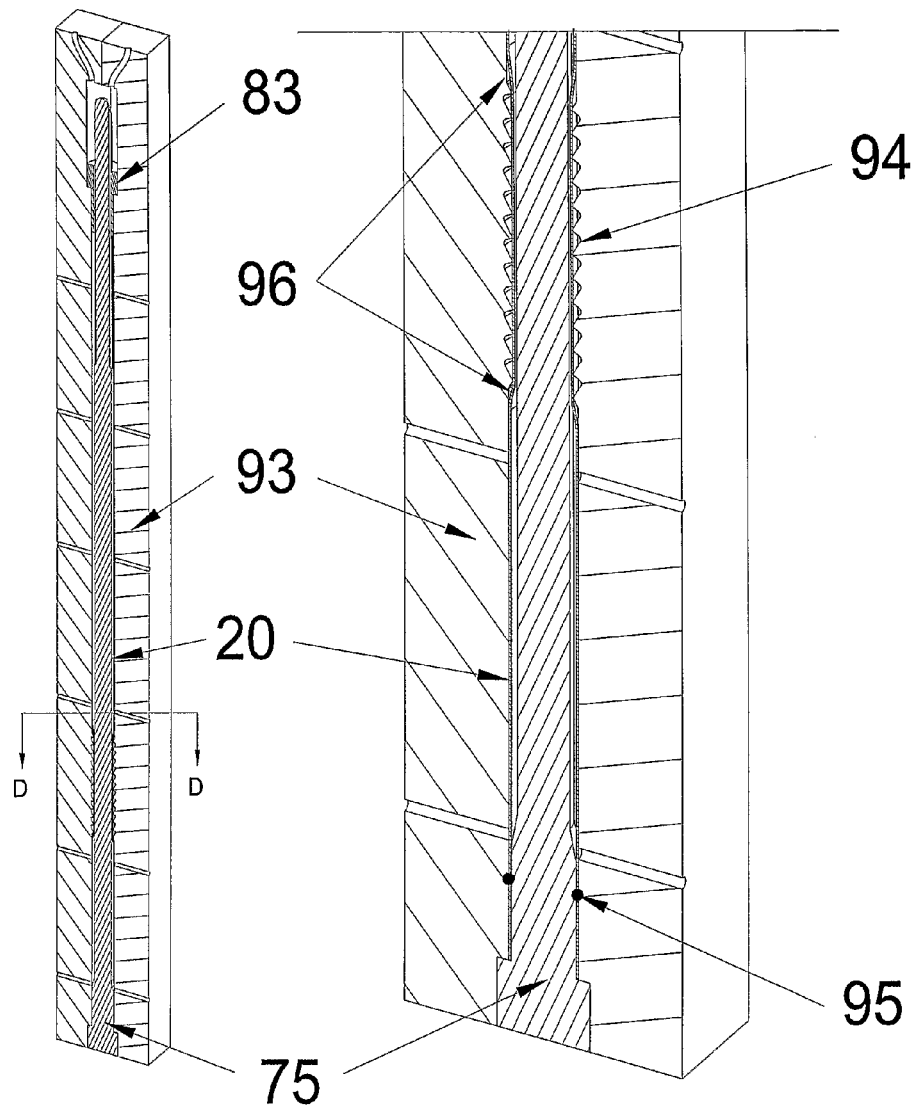
FIG. 27a shows a perspective cross-section view of the heat-softened tube, first fixture and second fixture of FIG. 26a sealingly encased in a mould of the second preferred embodiment tube profiling apparatus, which mould includes a profiled cavity, and additionally shows inwards deformation of the heat-softened tube.
FIG. 27b shows detail DD.

Referring to FIGS. 27a and 27b, the heat-softened tube 20 of FIGS. 26a and 26b, while still engaged with the first fixture part 75 and the second fixture part 83 is depicted in cross-sectional view and with the lower section in enlarged partial detail view fully encased in a mould 93 with a cavity profile 94. Once the heat-softened tube 20 has been fully encased in the mould 93, the heat-softened tube 20 is substantially sealed on to the first fixture part 75 and the second fixture part 83 (FIG. 23), and also to the mould at seals 95.

The seals 95 can be any form of seal known to those versed in the art including, but by no means limited to:
The deformation of the heat-softened tube 20 between the fixtures 75 and 83;
A separately deformable seal such as a rubber seal ring set in the mould 93; or
A localised seal point whereby the mould 93 pinches a small section of the heat-softened tube 20 into circumferential recesses in the fixtures 75 and 83.

If sealing is effected by small pinch-points into circumferential recesses in the fixture parts 75 and 83 then simple ejection techniques may well be subsequently required when releasing the final as-profiled tube from the fixture parts 75 and 83.

The mould 93 once substantially sealed with the heat-softened tube 20 may in one or more places inwardly deform 96 the heat softened wall of the heat-softened tube 20 thereby conforming in part the heat softened wall of the heat-softened tube 20 to the cavity profile 94 of the mould 93.

Figures 28A, 28B:
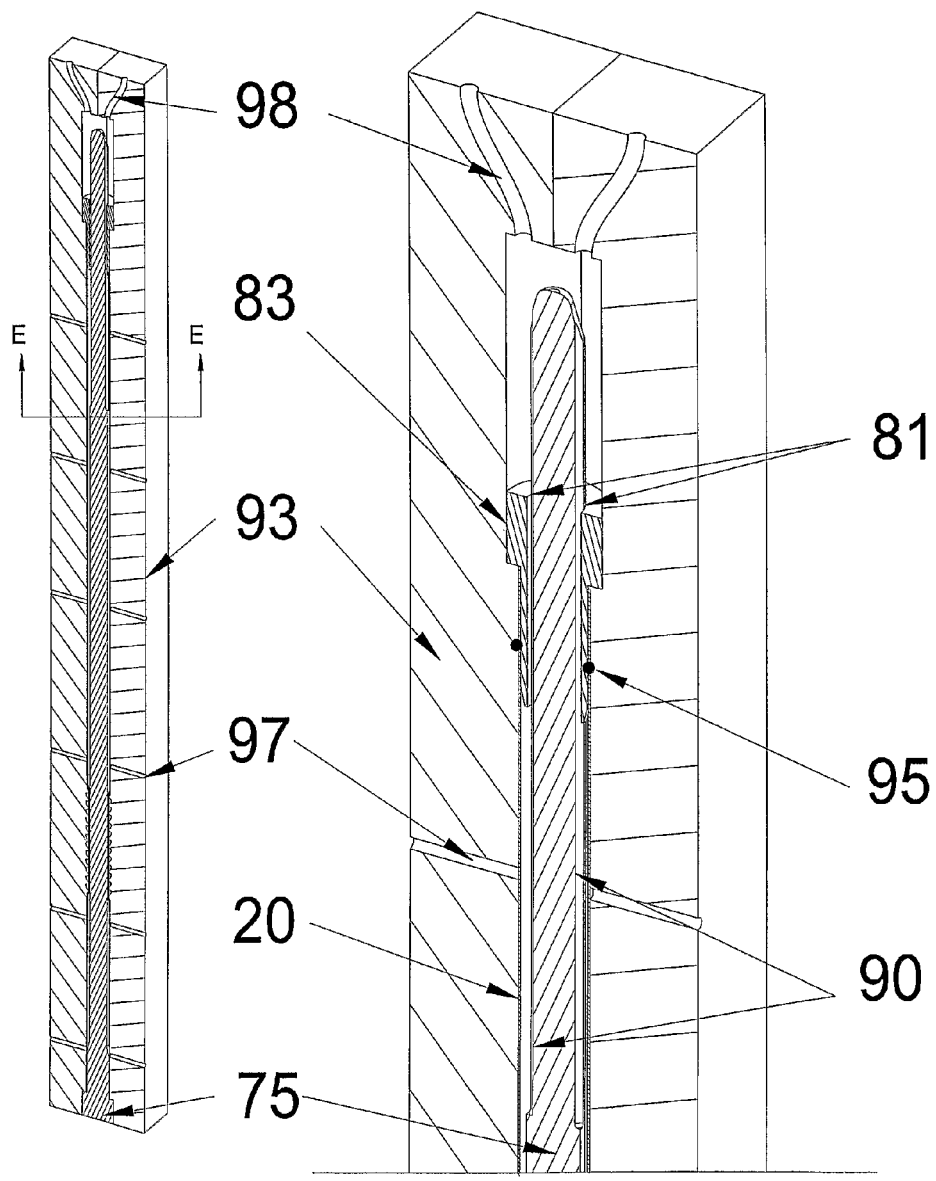
FIG. 28a shows a perspective cross-section view of the heat-softened tube, first fixture and second fixture and mould of FIG. 27a with pressure source pathways.
FIG. 28b shows detail EE.

Referring to FIGS. 28a and 28b, the heat-softened tube 20, first fixture part 75 and the second fixture part 83 and mould 93 of FIGS. 27a and 27b is depicted in cross-sectional view and with the upper section in enlarged partial detail view. The heat-softened tube 20 is sealingly engaged between the first fixture part 75, second fixture part 83 and mould 93 due to the seals 95 with the exception of vent pathways that include external low pressure vents 97 whereby a reduction in pressure can be applied to the outside of the heat-softened tube 20 to thereby draw outwardly the heat-softened section of the heat-softened tube 20 to conform to the mould 93 and high pressure vents 98 whereby an increase in pressure can be passed down through the flow pathways 81 into the substantially enclosed internal cavity 90 whereby the heat-softened section of the heat-softened tube 20 can be outwardly deformed to conform to the mould 93.

During the closing of the mould, indexing motions may have induced unwanted lateral movement in the fixture assembly and therefore the second fixture part 83 and also first fixture part 75 can be used in conjunction with the mould 93 to dampen such lateral fixture assembly motion. The mould 93 closing movement can ensure that first contact is with the second fixture part 83 and first fixture part 75 and that any fixture assembly lateral movement has been fully dampened prior to mould 93 contact with the heat-softened tube 20.

Figures 29A, 29B:
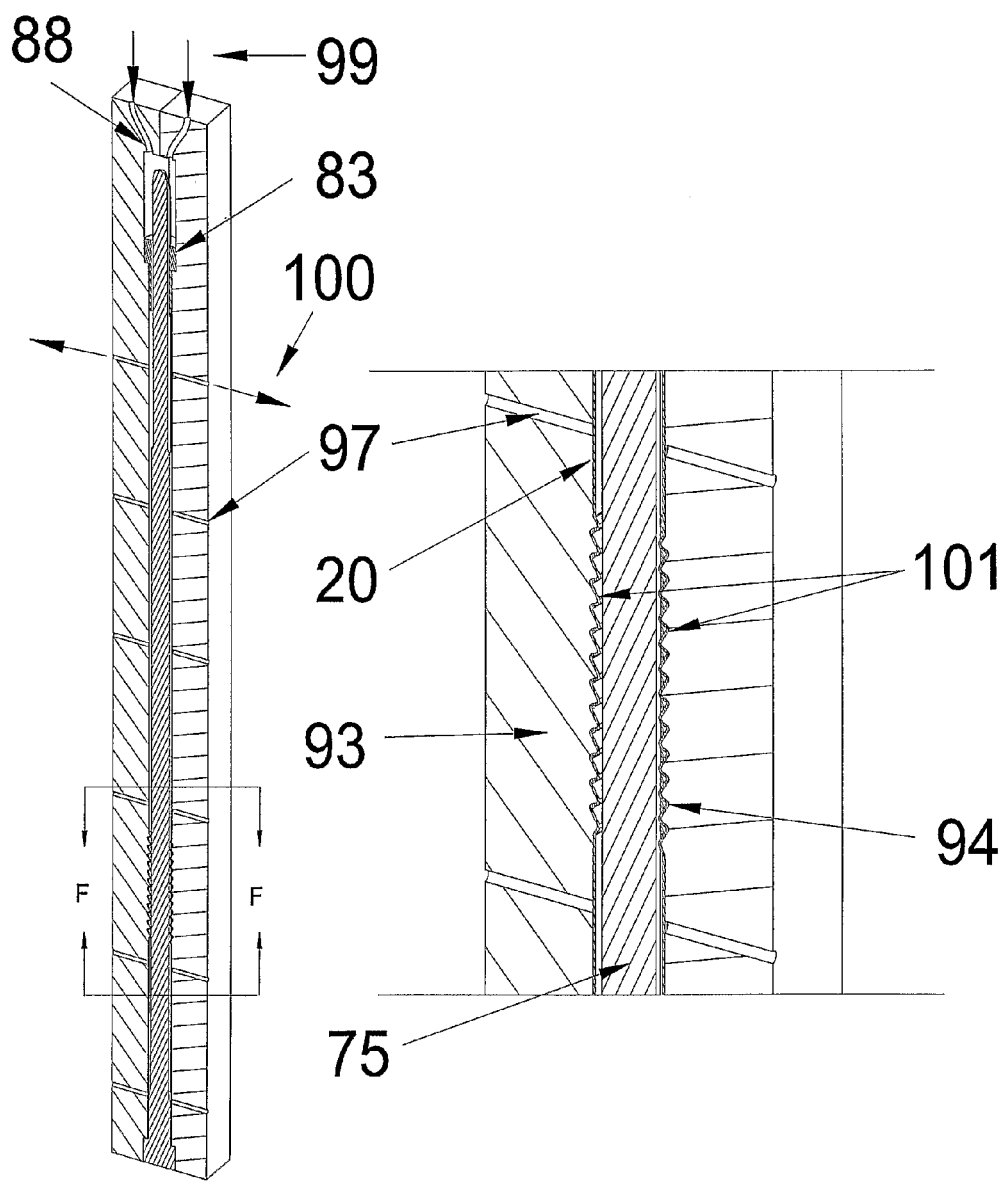
FIG. 29a shows a perspective cross-section view of the heat-softened tube of FIGS. 27a and 28a radially conformed to the configuration of the mould cavity through pressure sources being applied to the mould.
FIG. 29b shows detail FF.

Referring to FIGS. 29a and 29b, the heat softened tube 20 of FIGS. 27a, 27b, 28a, and 28b, while sealingly encased in the mould 93 and sealingly engaged with the fixture parts 75 and 83 is depicted in cross-sectional view and in enlarged partial detail view with a pressure source applying an increase in pressure into the mould 93 through the high pressure vents 98 and a pressure source applying a decrease in pressure 100 into the mould 93 through the low pressure vents 97 thereby radially deforming 101 the heat-softened tube 20 to conform to the cavity profile 94 of the mould 93.

Figures 30A, 30B:
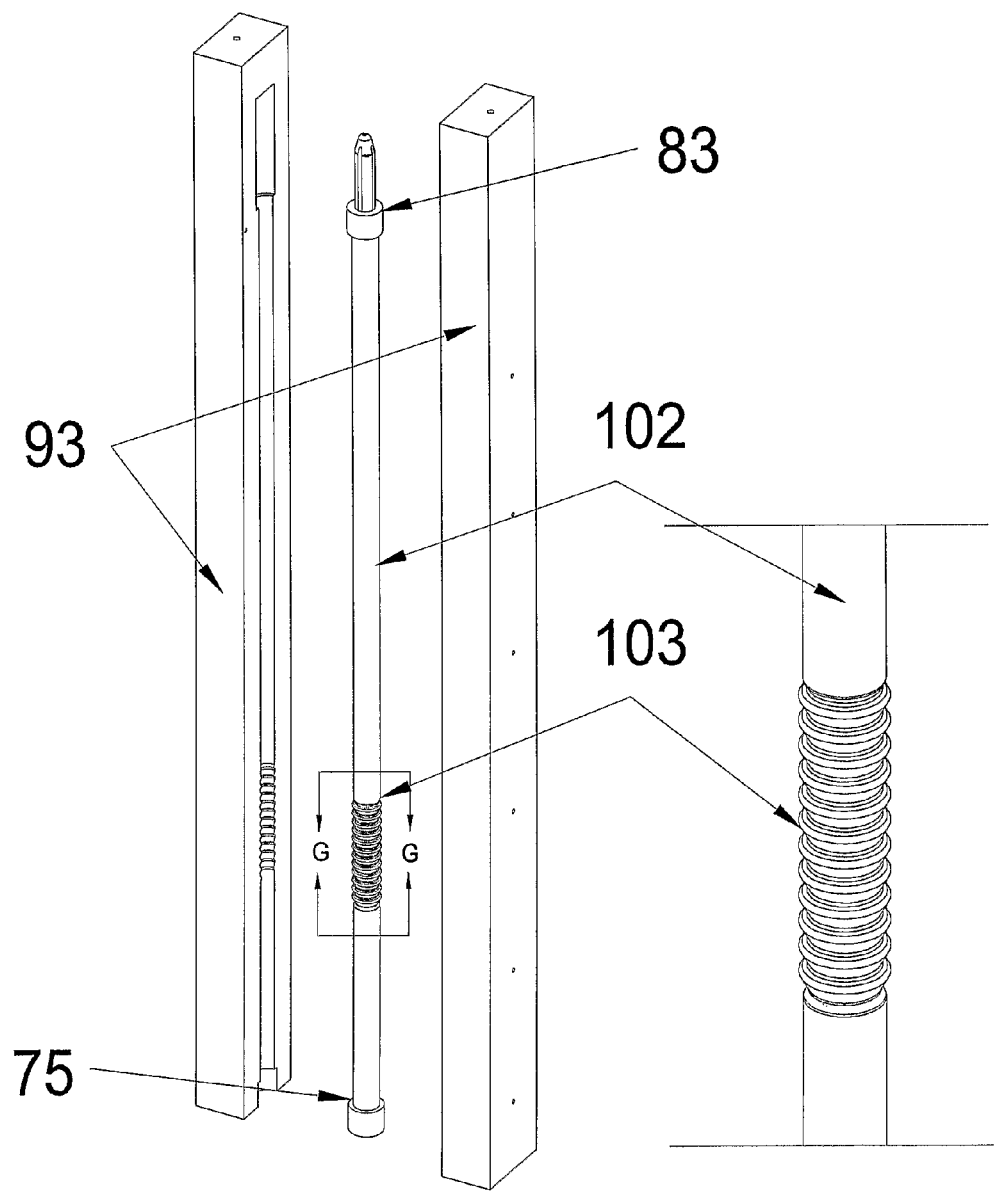
FIG. 30a shows a perspective cross-section view of the radially deformed tube of FIG. 29a with the mould removed but still engaged with the first and second fixtures.
FIG. 30b shows detail GG.

Referring to FIGS. 30a and 30b, an as-profiled drinking straw with a first open end and second open end 102 is depicted upon removal from the mould 93. The as-profiled drinking straw with a first open end and second open end 102 is still engagingly attached to the fixture parts 75 and 83 and has circumferential grooves 103 as a result of the forming process.

Figure 31:
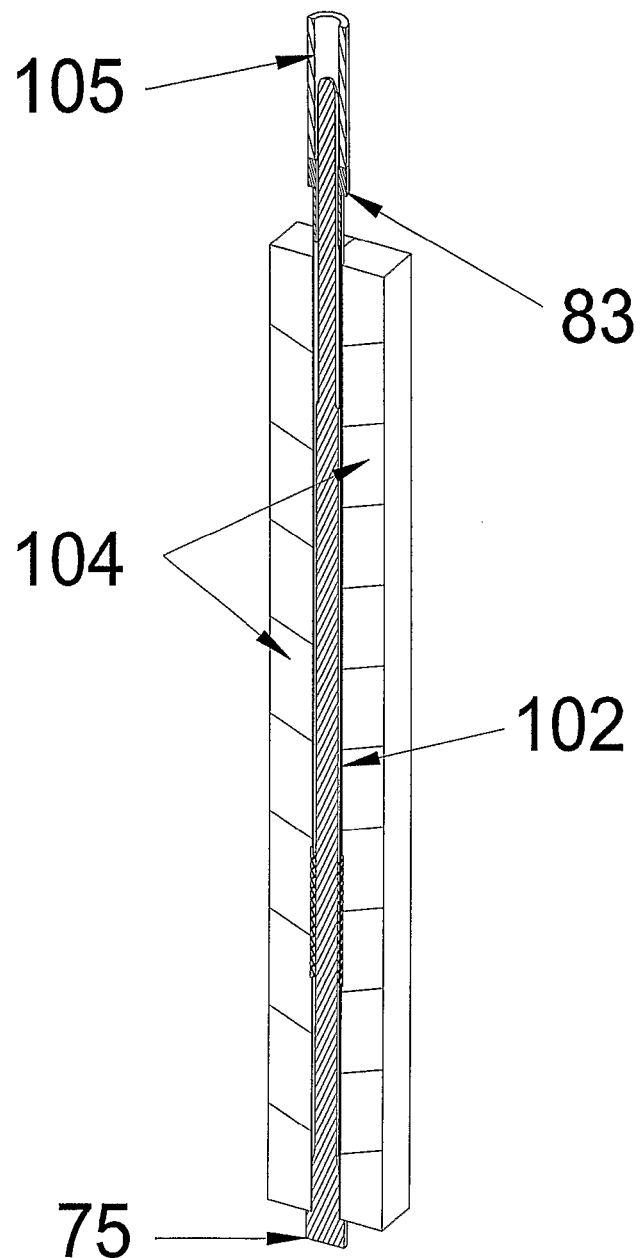
FIG. 31 shows a perspective cross-section view of the radially deformed tube still engaged with the first and second fixtures of FIG. 30, wherein an external guide of the second preferred embodiment tube profiling apparatus is used in conjunction with the second fixture being moved with respect to the first fixture in order to longitudinally deform the radially deformed tube, and thereby ensuring that the radially deformed tube remains substantially straight during this further deformation.

Referring to FIG. 31, the as-profiled drinking straw with a first open end and second open end 102 still engagingly attached to fixture parts 75 and 83 is depicted in cross-sectional view encased in guides 104, which in conjunction with a pushing arrangement 105 can move the second fixture part 83 with respect to the first fixture part 75, thereby further deforming the as-profiled drinking straw 102 in the longitudinal direction.

Figures 32A, 32B:
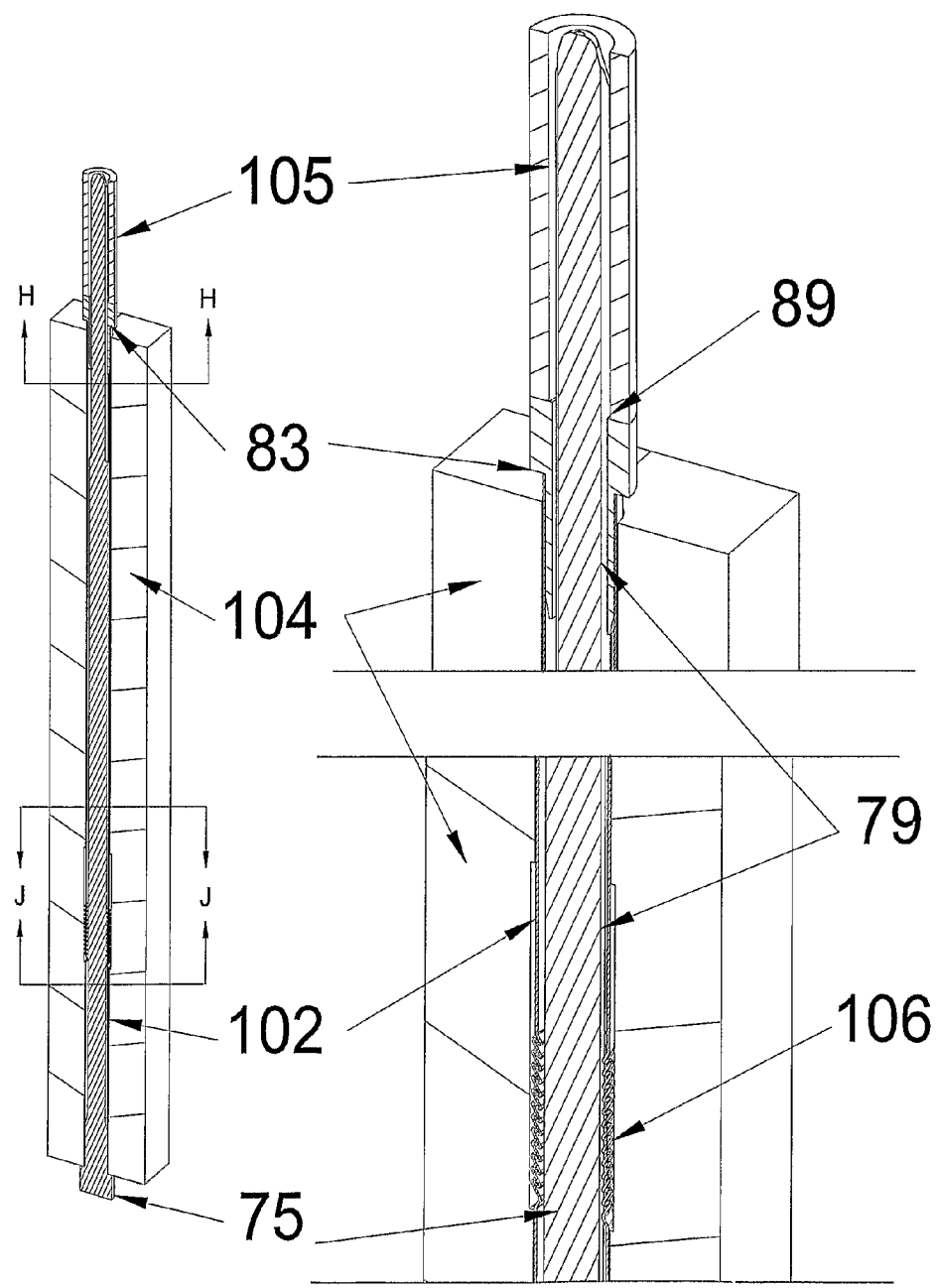
FIG. 32a shows a perspective view of the radially deformed tube of FIG. 31 in the form of an as-profiled drinking straw and longitudinally deformed grooves, the upper part of FIG. 32b shows detail HH, and the lower part of FIG. 32b shows detail JJ.

Referring to FIGS. 32a and 32b, the as-profiled drinking straw 102 still engagingly attached to fixture parts 75 and 83 and encased in the guides 104 of FIG. 31 is depicted in cross sectional view and in two enlarged partial detail views with longitudinally compressed grooves 106 as a result of the sliding engagement 89 between the two fixture parts 75 and 83 and the pushing arrangement 105. The guides 104 and also the lesser diameter 79 of the first fixture part 75 serve to keep the as-profiled drinking straw with a first open end and second open end 102 substantially straight during any longitudinal deformation. It will be appreciated that while advantages can be achieved from the longitudinal deformation, that is not necessarily required and a desirable drinking straw could be produced if the process is ended at the step shown in FIG. 30a and 30b.

Figures 33A, 33B:
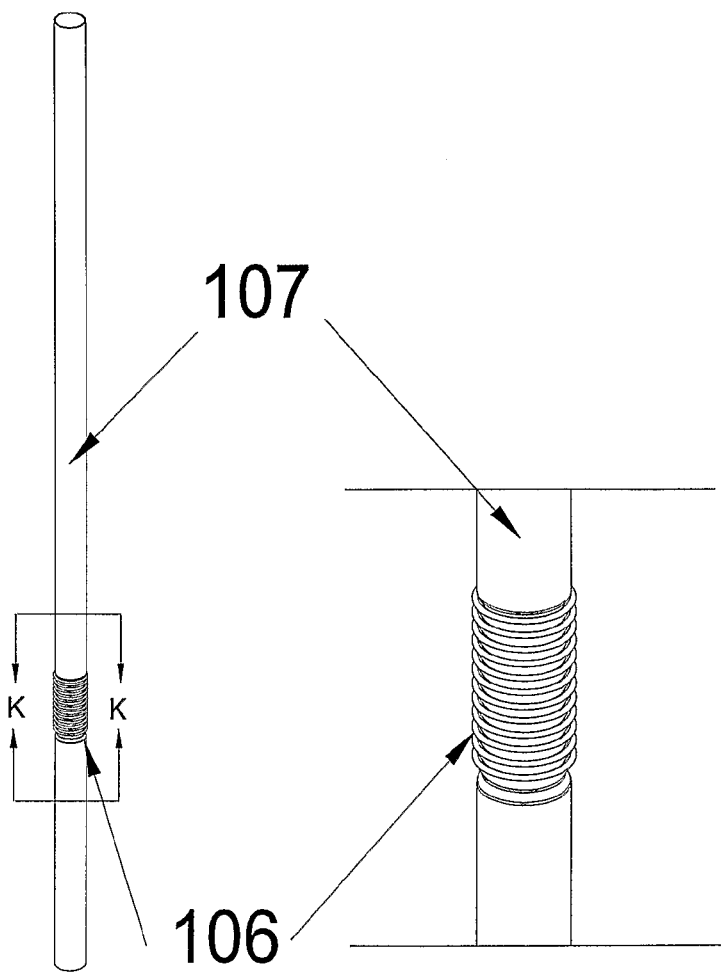
FIG. 33a shows a perspective view of the fully as-profiled drinking straw with a first open end and second open end in accordance with an eleventh preferred embodiment of the present invention removed from the first and second fixtures and guides.
FIG. 33b shows detail KK.

Referring to FIGS. 33a and 33b, the final as-profiled drinking straw 102 according to an eleventh preferred embodiment of the present invention has a first open end and second open end and longitudinally compressed grooves 106, and is made using the second preferred embodiment tube profiling apparatus of the present invention. The straw 102 is shown in three dimensional view and in enlarged partial detail view removed from any encasement or engagement with fixtures, moulds or guides.

The apparatus and method can be modified to form profiled drinking straws or tubes or products having other profiles.

Figure 34:
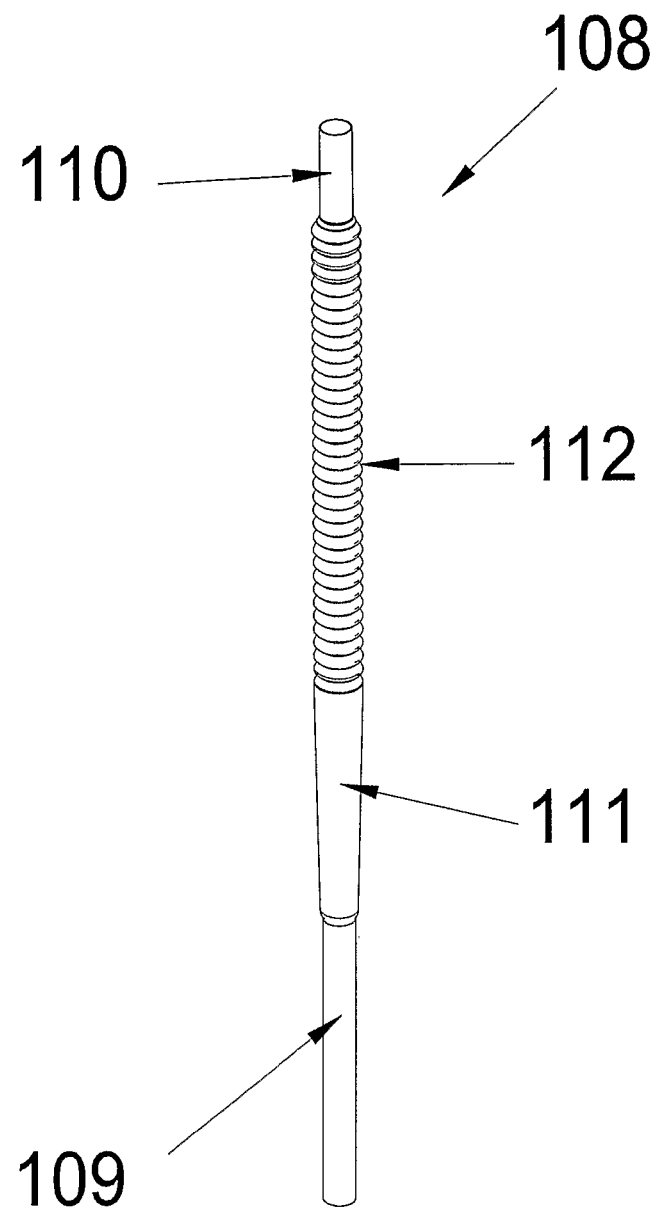
FIG. 34 shows a perspective view of an as-profiled drinking straw with a first open end and second open end in accordance with a twelfth preferred embodiment of the present invention which has a combination of circumferential and longitudinal profiles and grooves along its length.

Referring to FIG. 34, a twelfth preferred embodiment as-profiled drinking straw 108 with a first open end and second open end is depicted, whereby variations in profile can be used to significantly reduce the drinking straw's length during transit. The as-profiled drinking straw 108 with a first open end and second open end has compound geometric cross sections including substantially circular cross sections 109 and 110 at either end of the as-profiled drinking straw, a tapered circular section 111 and a larger diameter of circumferentially grooved cross section 112.

Figures 35A, 35B:
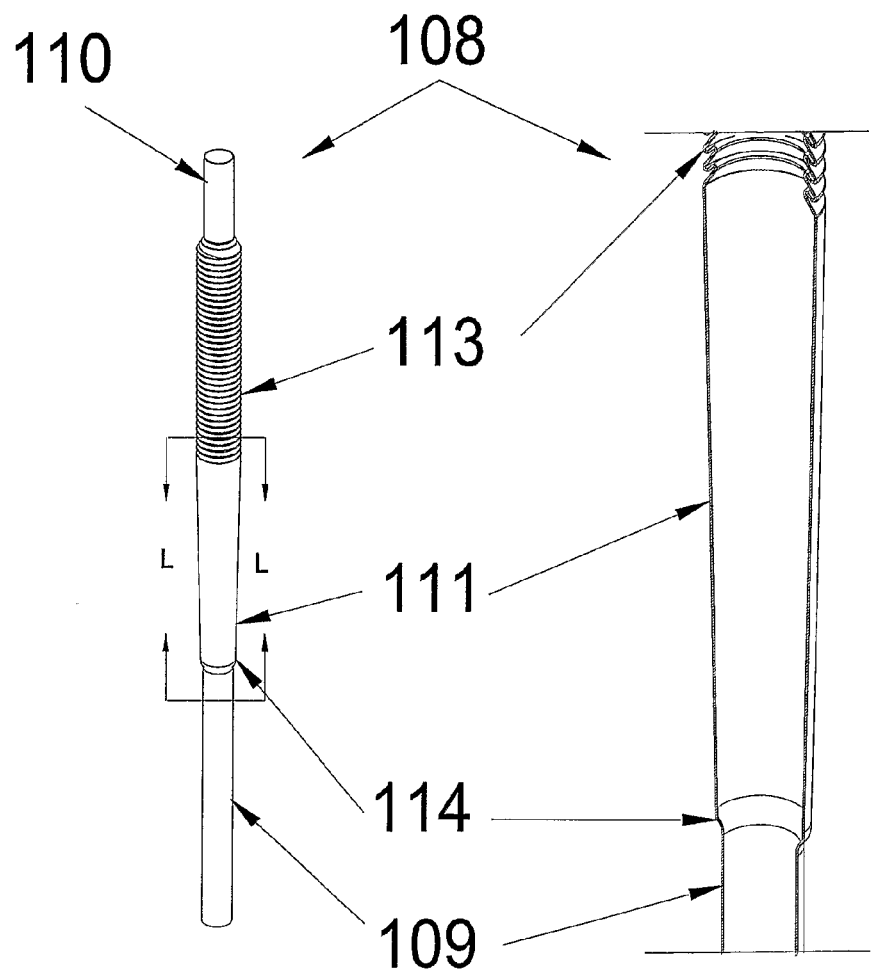
FIG. 35a shows a perspective view of the as-profiled drinking straw with a first open end and second open end as depicted in FIG. 34 wherein the circumferential grooves have been longitudinally deformed to reduce the length of the as-profiled drinking straw.
FIG. 35b shows detail LL in cross section.

Referring to FIGS. 35a and 35b, the as-profiled drinking straw 108 with a first open end and second open end of FIG. 34 is depicted in three-dimensional view and in enlarged partial detail cross-sectional view partially reduced in length due to longitudinal deformation. As longitudinal deformation is applied to the as-profiled drinking straw 108, the first effect of the longitudinal deformation is the deformation of the circumferentially grooved cross section 112 of FIG. 34 resulting in the formation of longitudinally compressed grooves 113. The transition wall 114 between the circular cross section 109 and the tapered section 111 is an angled wall of approximately 45° such that when further longitudinal deformation occurs following the formation of the longitudinally compressed grooves 113, this wall is able to deform from an approximately 45° outwards angle to an approximately 45° inwards angle.

Figures 36A, 36B:
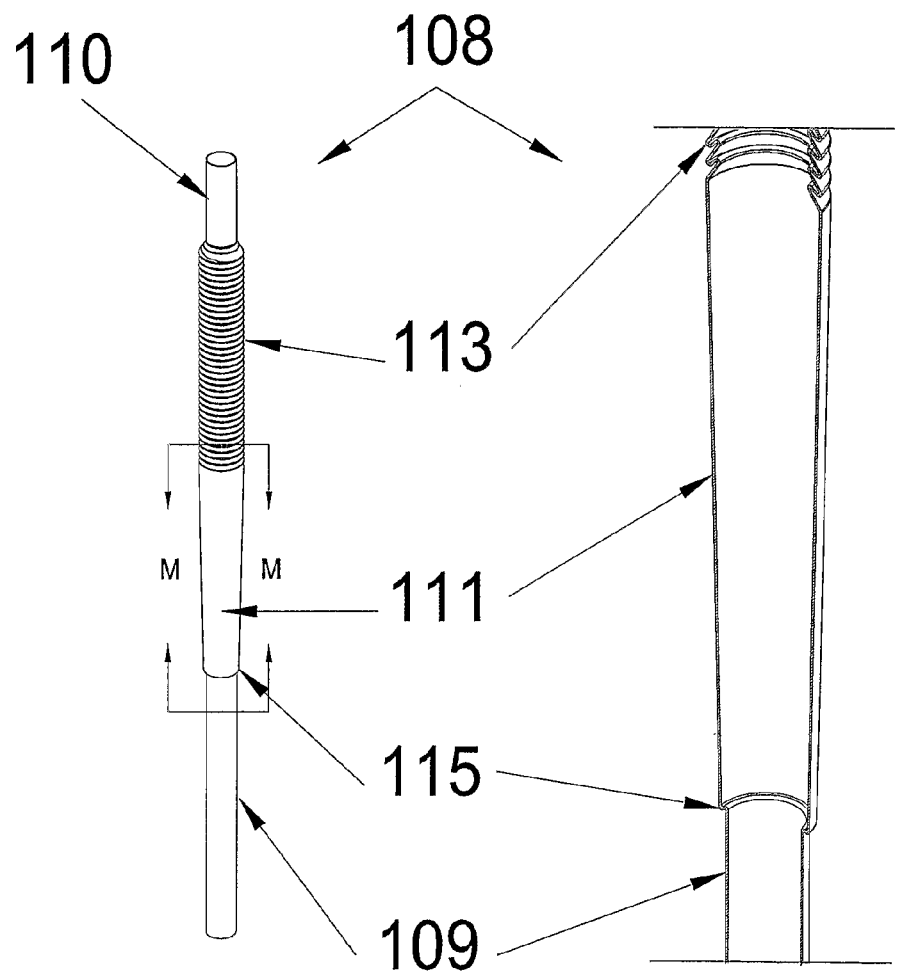
FIG. 36a shows a perspective view of the as-profiled drinking straw with a first open end and second open end as depicted in FIGS. 34 and 35a wherein longitudinal deformation has inverted an angular wall section.
FIG. 36b shows detail MM in cross section.

Referring to FIGS. 36a and 36b, the as-profiled drinking straw 108 with a first open end and second open end of FIGS. 34 and 35a and 35b is depicted in three-dimensional view and in enlarged partial detail cross-sectional view further reduced in length due to continuing longitudinal deformation inverting the transition wall 114 of FIG. 35 such that it becomes an inverted transition wall 115.

The inversion of this wall into the inverted transition wall 115 serves as a lead-in to progressively invert the tapered circular section 111 as further longitudinal deformation is applied to the as-profiled drinking straw 108 with a first open end and second open end. As more longitudinal deformation is applied and the tapered circular section 111 starts to invert, the circular cross section 109 will start to move up inside firstly the tapered circular section 111 and then inside the longitudinally compressed grooves 113.

Figures 37A, 37B:
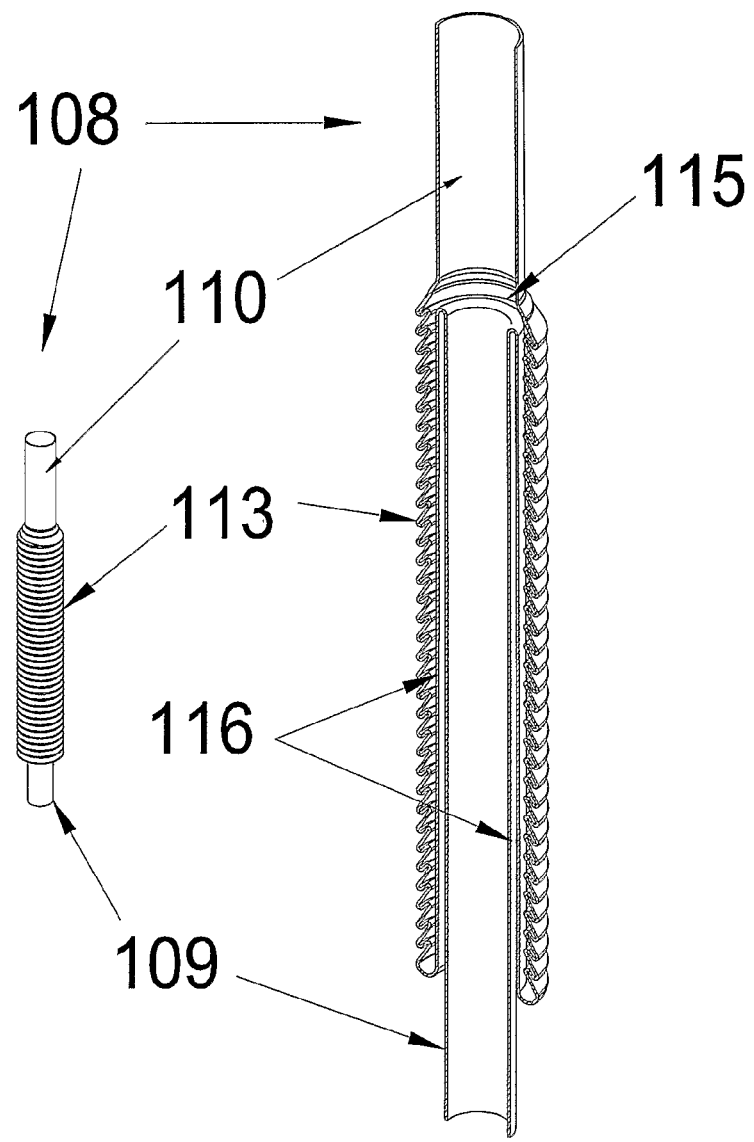
FIG. 37a shows a perspective view of the as-profiled drinking straw with a first open end and second open end as depicted in FIGS. 34, 35 and 36 wherein the combination of circumferential and longitudinal profiles has enabled die as-profiled drinking straw to be integrally telescoped and compressed in length.
FIG. 37b shows an enlarged cross-sectional view thereof.

Referring to FIGS. 37a and 37b, the as-profiled drinking straw 108 with a first open end and second open end of FIGS. 34, 35 and 36 is depicted in three-dimensional view and in enlarged detail cross-sectional view significantly reduced in length for transportation purposes. The circular cross section 109 has been pushed up inside the as-profiled drinking straw 108 with a first open end and second open end whereby the tapered section 111 of FIGS. 34 and 35a and 35b has been fully inverted to become the inverted tapered section 116 such that it is now integrally telescoped up inside the longitudinally compressed grooves 113. The as-profiled drinking straw 108 with a first open end and second open end has now been now compressed to its minimum length.

The overall effect of the combination of these profiles and deformations is the reduction of the in-transit length of the as-profiled drinking straw 108 with a first open end and second open end by a significant factor. In order to use the as-profiled drinking straw 108 with a first open end and second open end, a user simply grips hold of the two circular cross sections 109 and 110 and pulls longitudinally to reform the as-profiled drinking straw with a first open end and second open end back to its original length. It will be appreciated that the straw can be compressed without compressing the portion 109 that can telescope at least partly into the integral portion and without expanding the integral portion 113.

It will be appreciated that these features could be provided in a drinking straw having other cross sectional shapes than those shown.

Figure 38:
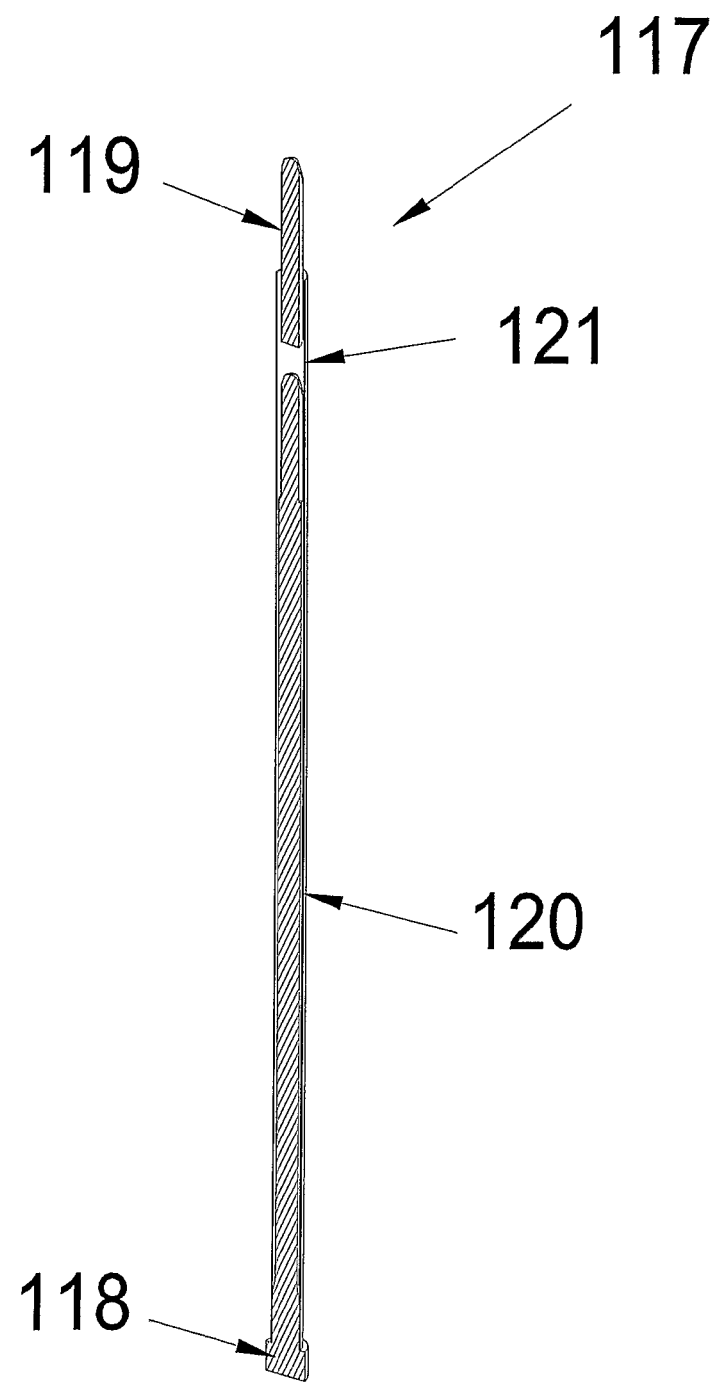
FIG. 38 shows a perspective cross-sectional view a substantially rigid fixture and tube in accordance with a third preferred fixture embodiment of the present invention.

Referring to FIG. 38, a third preferred embodiment fixture or support is depicted. FIG. 6 depicts a single-piece substantially solid and substantially rigid fixture embodiment and FIGS. 25a and 25b depicts a multi-piece fixture whereby the multiple pieces of the fixture at least partially engage. FIG. 38 depicts a fixture 117 which comprises a multiple-piece substantially solid and substantially rigid fixture arrangement whereby the multiple pieces do not engage. The lower substantially solid and substantially rigid fixture part 118 and the upper substantially solid and substantially rigid fixture part 119 substantially support a tube with a first open end and second open end 120, however they do not engage (as indicated by numeral 121). The upper fixture part 119 will be supported by any suitable means (not shown).

Figure 39:
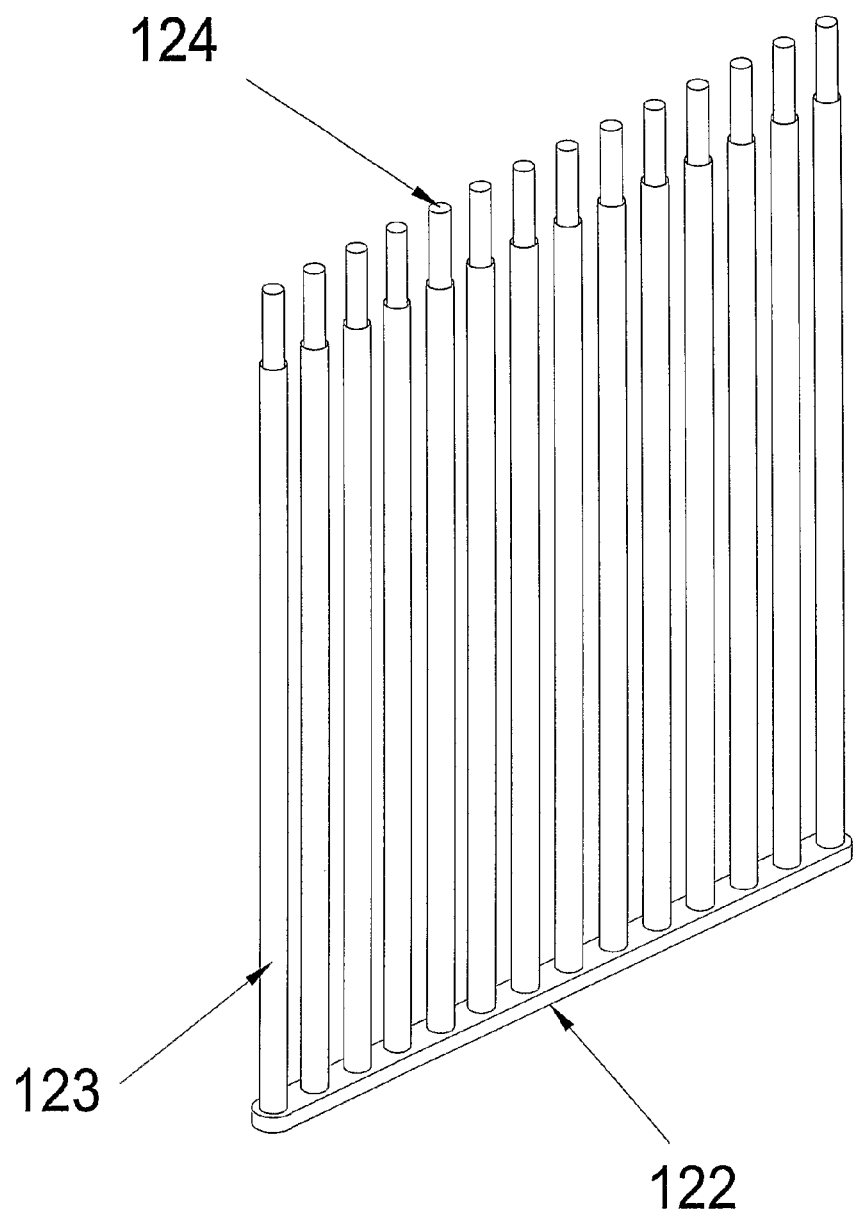
FIG. 39 shows a plurality of substantially rigid fixtures and tubes in a comb arrangement in accordance with a fourth preferred fixture embodiment of the present invention.

Referring to FIG. 39, a fourth preferred embodiment fixture or support arrangement is depicted wherein a plurality of substantially solid and substantially rigid fixtures or supports 124 can be integrated into a single integral fixture comb arrangement 122 thereby enabling a plurality of substantially solid and substantially rigid fixtures 124 to be used integrally and in parallel in a single mould as part of one integral fixture comb arrangement 122. The integral fixture comb arrangement 122 comprises a plurality of substantially solid and substantially rigid fixtures 124 each holding a separate tube 123 with a first open end and second open end. This mechanism can be used to profile one product per fixture 124, or multiple products per fixture 124. Additionally, this arrangement can be used in a single mould with multiple cavities, in multiple moulds each with a single cavity, in multiple moulds each with multiple cavities, or any suitable combination.

The comb 122 can also serve as a manifold to interconnect the integral flow pathways of the substantially solid and substantially rigid fixtures or supports 124.

Figure 40:
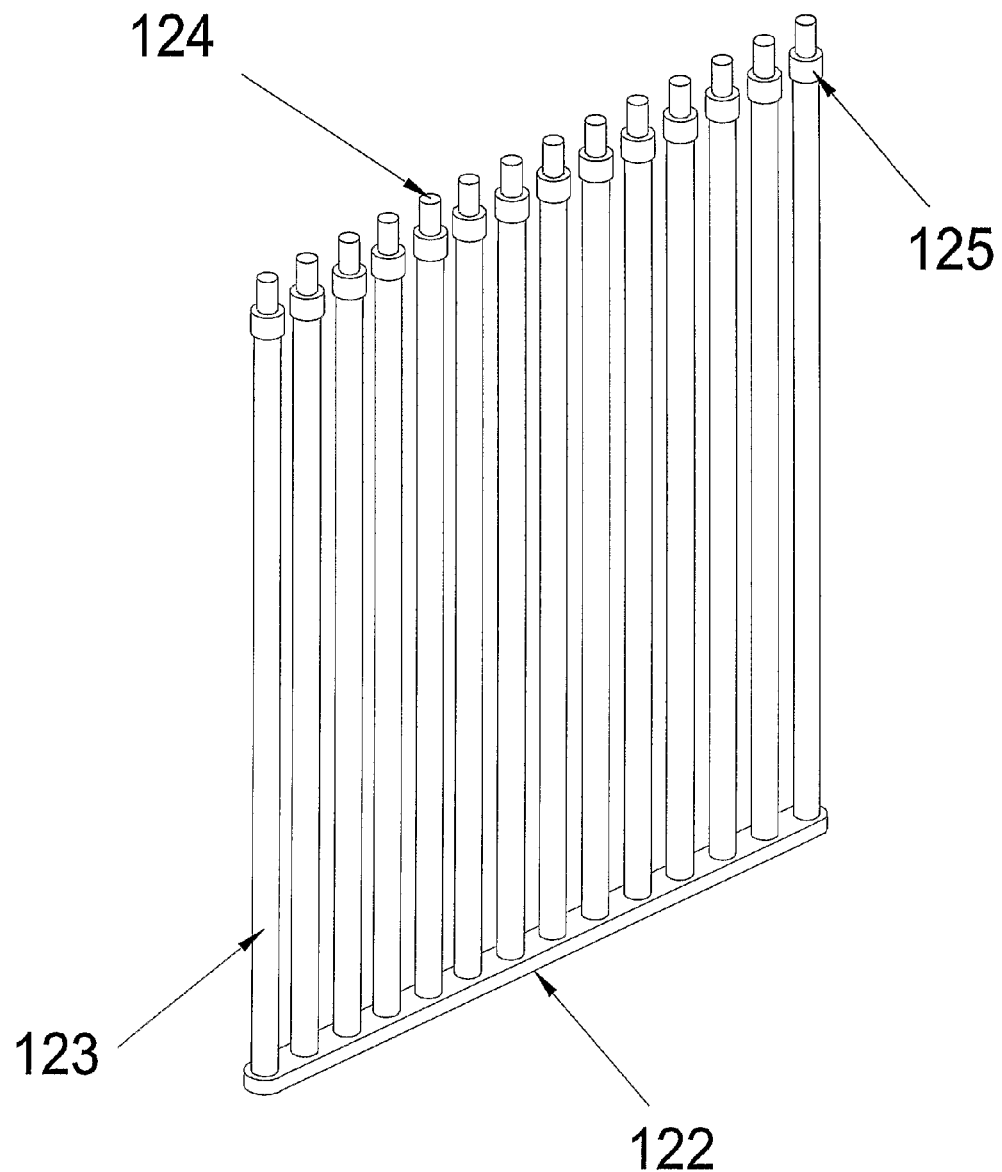
FIG. 40 shows a plurality of substantially rigid fixtures and tubes in a comb arrangement in accordance with a fifth preferred fixture embodiment of the present invention.

Referring to FIG. 40, a fifth preferred embodiment fixture or support arrangement is depicted wherein a plurality of substantially solid and substantially rigid fixtures or supports 124 can be integrated into a single integral fixture comb arrangement 122 thereby enabling a plurality of substantially solid and substantially rigid fixtures 124 to be used integrally and in parallel in a single mould as part of one integral fixture comb arrangement 122 and whereby the substantially solid and substantially rigid fixtures or supports 124 can have additional support and dampening elements 125 which assist in reduction of lateral fixture movement when being encased into a mould.

As the mould faces (not shown) close around the comb arrangement 122, first contact between the mould and the comb arrangement 122 will be between the mould and the additional support and dampening elements 125. Such first contact will serve to dampen any fixture lateral movements prior to contact between the mould and the separate tubes 123 with a first open end and second open end The additional support and dampening elements 125 can be at the top of the fixture, at the bottom of the fixture or at both the top and bottom of the fixture. Further dampening can also occur between the mould faces (not shown) and the separate tubes 123 with a first open end and second open end in the specific regions where subsequent trimming and/or product separation will occur as any damage as a result of such contact will be subsequently removed in the trimming or cutting operation.

Figure 41:
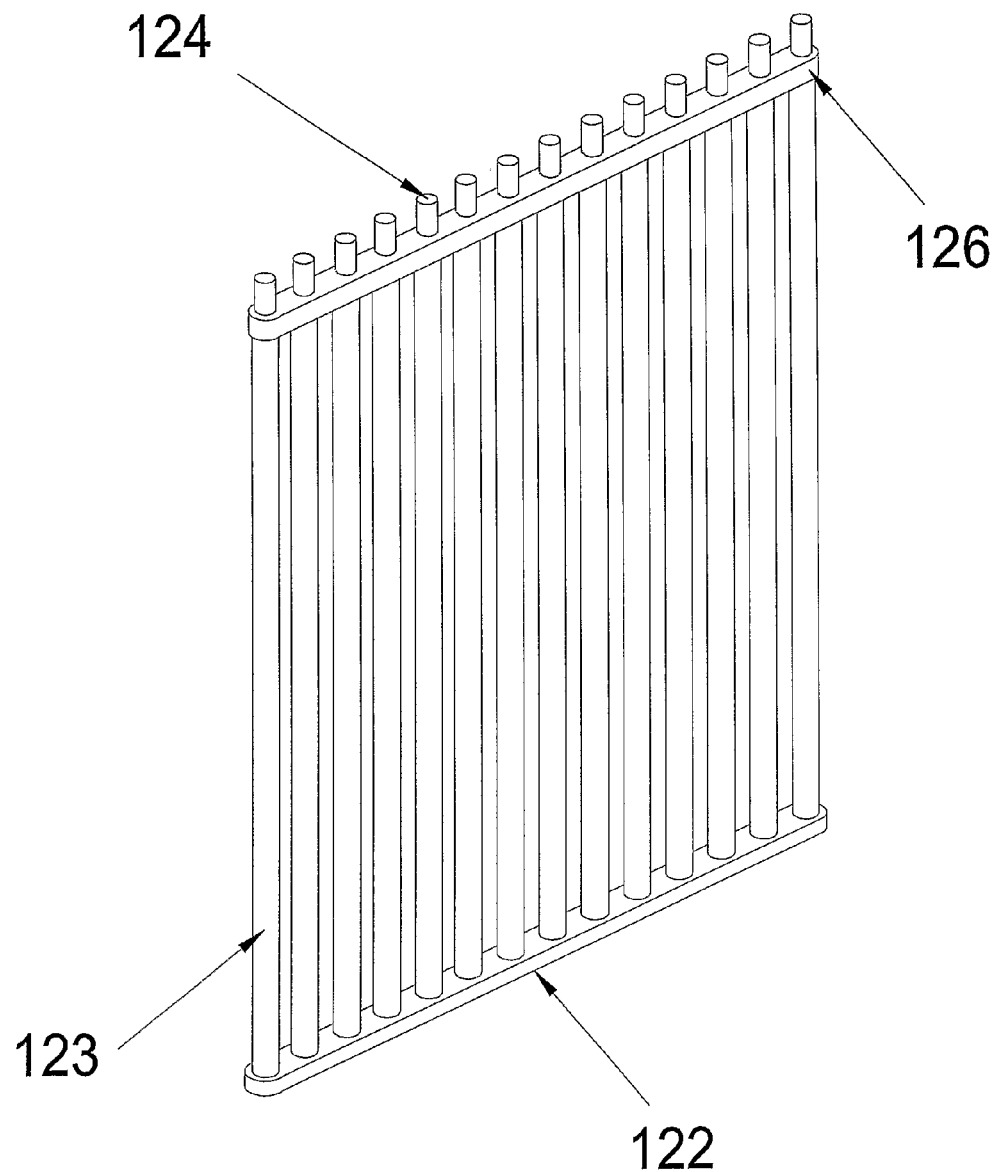
FIG. 41 shows a plurality of substantially rigid fixtures and tubes in a comb arrangement in accordance with a sixth preferred fixture embodiment of the present invention.

Referring to FIG. 41, a sixth preferred embodiment fixture or support arrangement is depicted wherein a plurality of substantially solid and substantially rigid fixtures or supports 124 can be integrated into a single integral fixture comb arrangement 122 thereby enabling a plurality of substantially solid and substantially rigid fixtures 124 to be used integrally and in parallel in a single mould as part of one integral fixture comb arrangement 122 and whereby the substantially solid and substantially rigid fixtures or supports 124 can have an additional integral support and a dampening element 126 which assist in reduction of lateral fixture movement when being encased into a mould.

As the mould faces (not shown) close around the comb arrangement 122, first contact between the mould and the comb arrangement 122 will be between the mould and the additional integral support and dampening element 126. Such first contact will serve to dampen any fixture lateral movements prior to contact between the mould and the separate tubes 123 with a first open end and second open end The integral support and dampening element 126 further dampens unwanted fixture movement by interconnecting the fixtures at both their upper ends and their lower ends at all times during movement.

The individual fixtures can have individual dampening elements, integral dampening elements, or any combination thereof.

Figure 42:
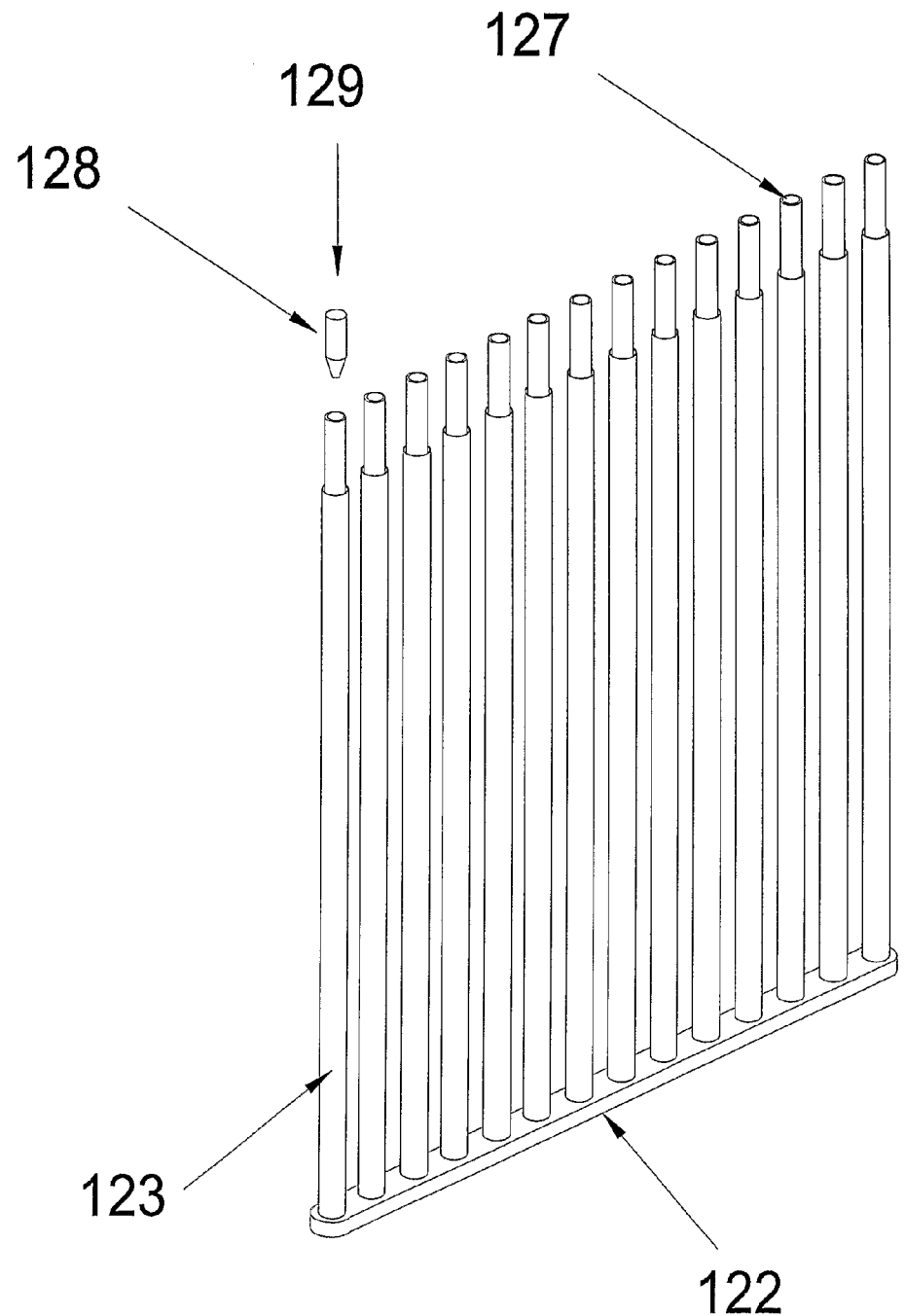
FIG. 42 shows a plurality of substantially rigid fixtures and tubes in a comb arrangement in accordance with a seventh preferred fixture embodiment of the present invention.

Referring to FIG. 42, a seventh preferred embodiment fixture or support arrangement is depicted wherein a plurality of substantially solid and substantially rigid fixtures or supports with hot air, gas, or other fluid vent apertures 127 can be integrated into a single integral fixture comb arrangement 122 thereby enabling a plurality of substantially solid and substantially rigid fixtures with hot air vent apertures 127 to be used integrally and in parallel in a single mould as part of one integral fixture comb arrangement 122 and whereby the substantially solid and substantially rigid fixtures or supports with vent apertures 127 can have hot air, gas, or other fluid passed through them during the heating process, thereby providing a heat source to the inside of the tubes 123 with a first open end and second open end as well as provide a source of latent heat once the source of hot air has been removed.

The integral comb arrangement 122 can also serve as a manifold for the introduction of the hot air into the plurality of substantially solid and substantially rigid fixtures or supports with hot air vent apertures 127 as well as be an additional source of latent heat.

The additional air vents of the plurality of substantially solid and substantially rigid fixtures or supports with hot air vent apertures 127 can either be sealed by the mould or can be separately sealed, as for example by a separate plug or plugs 128 which move downwards 129 prior to the heat-forming process.

Figure 43:
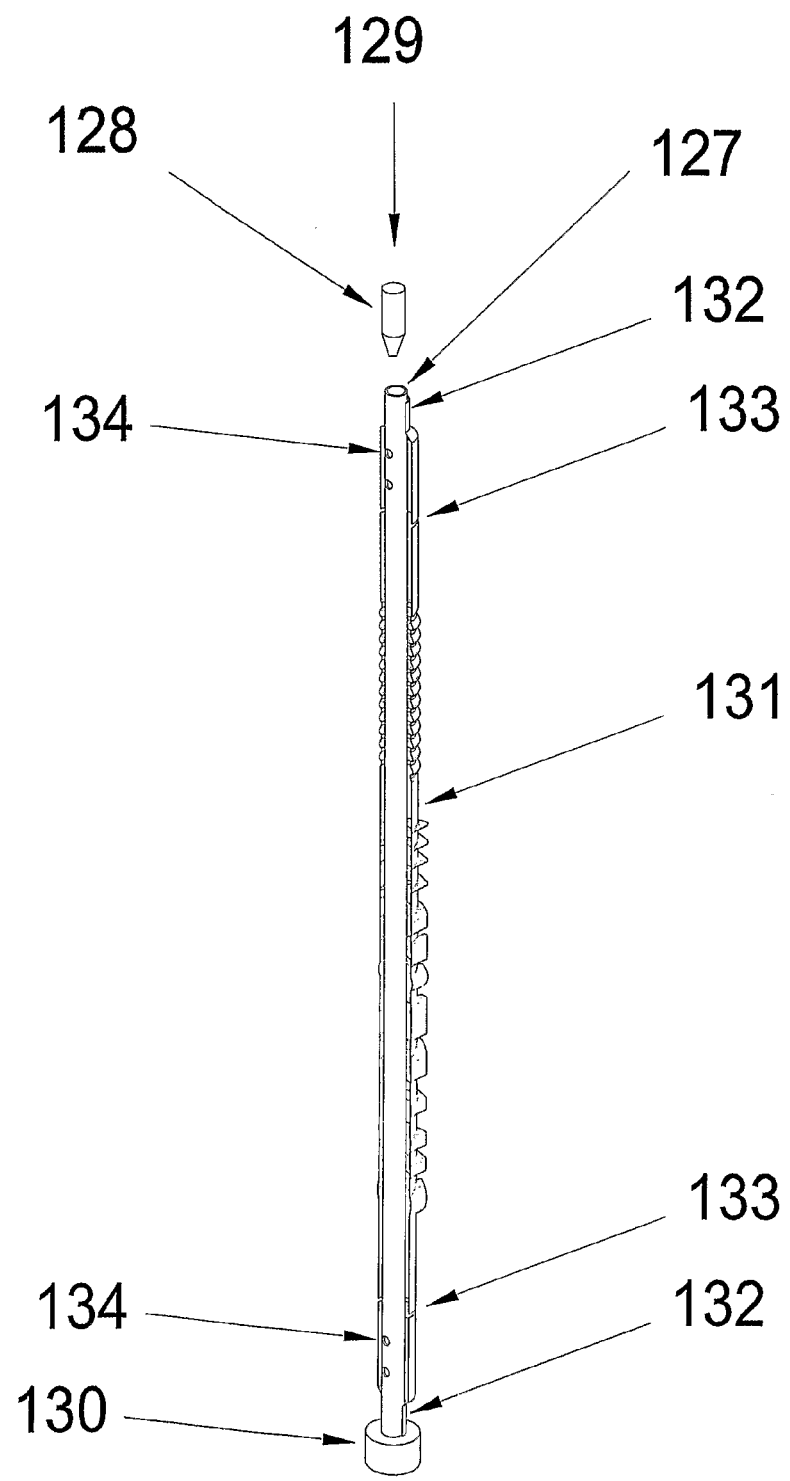
FIG. 43 shows a partial perspective view of a substantially rigid fixture and as-profiled drinking straw in accordance with an eighth preferred fixture embodiment of the present invention.

Referring to FIG. 43, an eighth preferred embodiment fixture or support arrangement is depicted wherein an as-profiled drinking straw with a first open end and second open end 131 has been formed on a substantially solid and substantially rigid fixture 130 with air flow pathways 134.

The substantially solid and substantially rigid fixture 130 may be of tubular construction providing a hot air flow pathway through the hot air vent aperture 127 to enable the substantially solid and substantially rigid fixture 130 to be used as part of the tube heating process.

During the heat-forming process, the hot air vent aperture 127 can be either closed off by the mould or by a separate plug 128 which moves downwards 129 prior to the heat-forming process. Once the mould has encased the heat-softened tube and the hot air vent aperture 127 has been sealed, a pressure change can be applied to the heat-softened tube via the with air flow pathways 134.

Following the heat-forming process, the as-profiled drinking straw with a first open end and second open end 131 has pinch-sealing points 132 as part of the partial or full sealing of the first open end and second open end of the heat-softened tube prior to heat-forming.

The as-profiled drinking straw with a first open end and second open end 131 can then have the pinch-sealing points 132 removed by a cutting action at the trim points 133. The air flow pathways 134 can be located on the substantially solid and substantially rigid fixture 130 in order to be bounded by the pinch-seal points 132 and the trim points 133.

The air flow pathways may also be located adjacent to the as-profiled drinking straw with a first open end and second open end 131, either toward the trim points 133 of the drinking straw or elsewhere. The substantially solid and substantially rigid fixture 130 with air flow pathways 134 may be used as a single fixture or in a comb arrangement.

Figure 44:
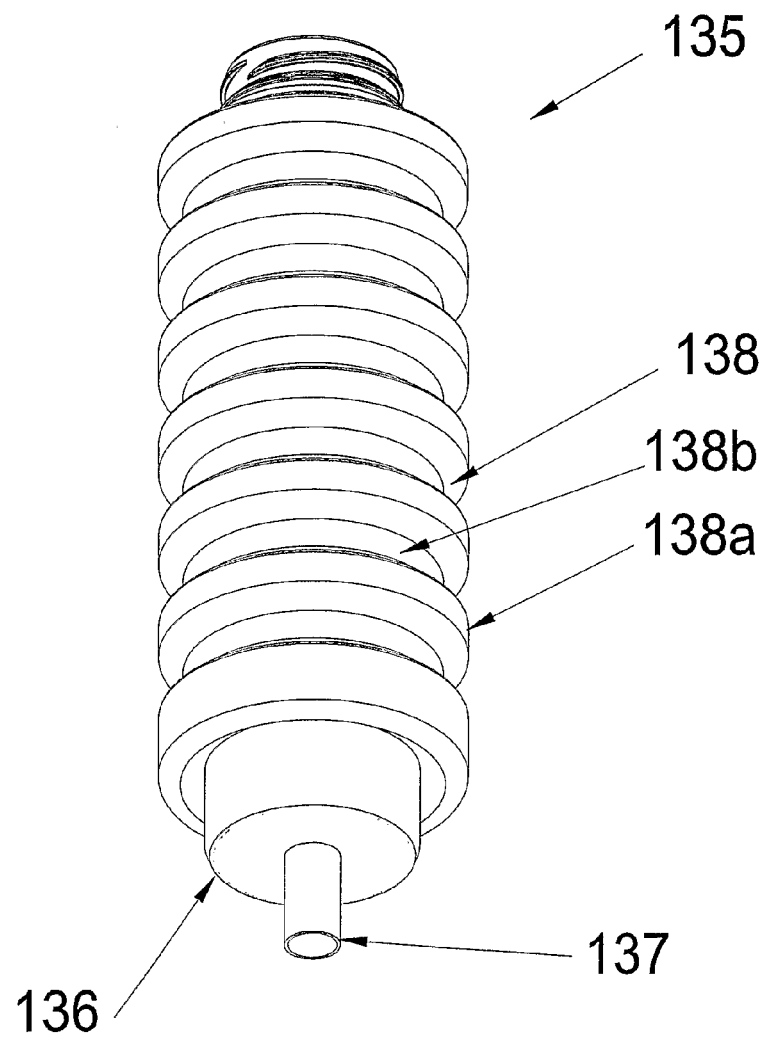
FIG. 44 shows a perspective view of an as-profiled product with a first open end and second open end in accordance with a thirteenth preferred embodiment of the present invention in the form of an bottle suitable for telescoping, to be concertina'd or for collapsing to save space during storage and transit, following removal from the mould and substantially rigid fixture.

Referring to FIG. 44, a thirteenth preferred embodiment as profiled product is depicted wherein a bottle has been formed that can be reduced in height for transit and storage purposes by means of a telescoping, concertina or collapsing action that is provided by one or more profile features. The telescoping, concertina or collapsible bottle 135 in its as-formed state may have a neck, a generally cylindrical body, and a base. The base or bottom 136 preferably protrudes outwardly from the body for ease of removal from the mould and substantially rigid and substantially solid fixture, neither of which are shown. The telescoping, concertina or collapsible bottle 135 may also have pinch-sealing points 137 and one or more telescoping, concertina or collapsible sections 138 in the body. The bottle may be made using an apparatus similar to those outlined above.

The telescoping, concertina or collapsible sections 138 may be sections that can fully invert to maximise the degree of height reduction, or may partially telescope or collapse downwards or inwards, thereby still yielding a significant height reduction. In the form shown, the body has a plurality of larger diameter annular wall sections 138a and a plurality of smaller diameter annular wall sections 138b between the larger diameter sections. The smaller diameter sections 138b are sized and configured to fit within the larger diameter annular wall sections 138a when the bottle is reduced in height.

Figure 45:
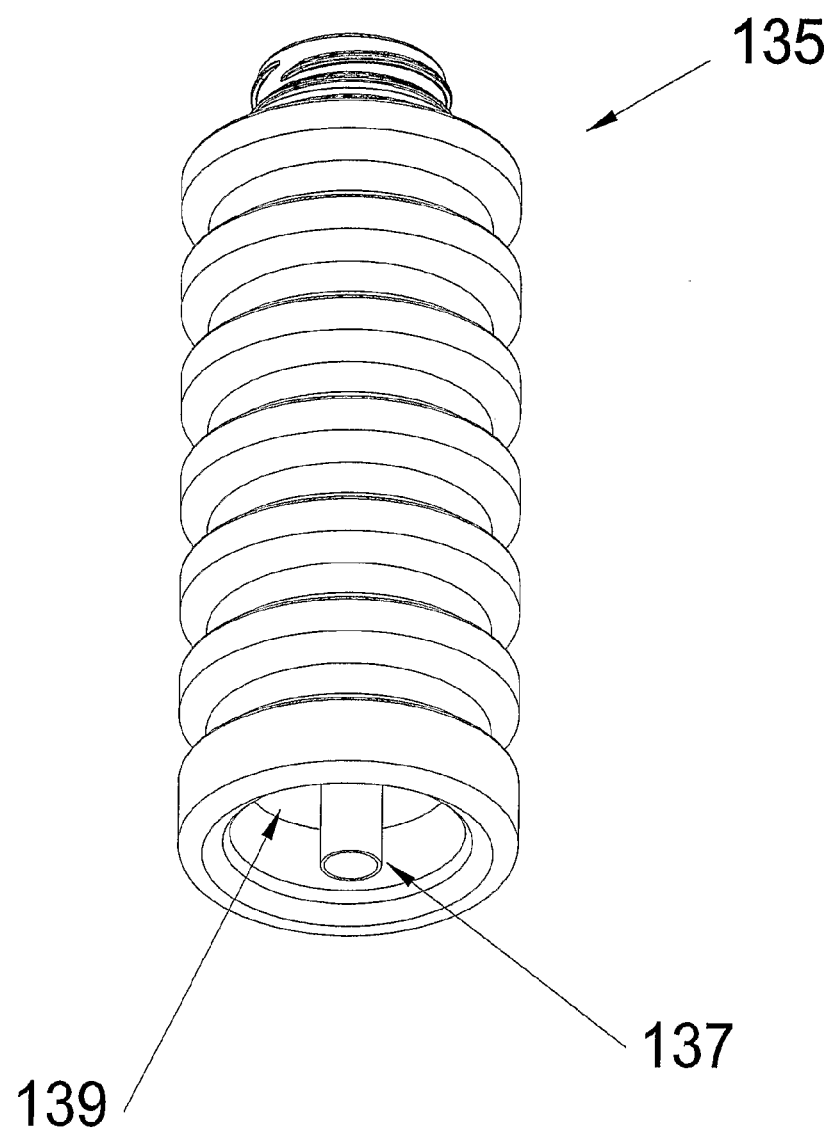
FIG. 45 shows a perspective view of the as-profiled product with a first open end and second open end as depicted in FIG. 44 with the bottom section inverted to a concave form.

Referring to FIG. 45, the telescoping, concertina or collapsible bottle 135 of FIG. 44 is depicted wherein the outwardly protruding or generally convex bottom of FIG. 44 has been pushed inside the body, or deformed so as to be an inverted or generally concave bottom 139, in order to create a bottom to the telescoping, concertina or collapsible bottle 135 that will enable it to stand upright on the body. The pinch-seal point 137 as depicted has not been trimmed from the telescoping, concertina or collapsible bottle 135 prior to bottom deformation. However, the pinch-seal point 137 may have been trimmed prior to the bottom deformation process.

Figure 46:
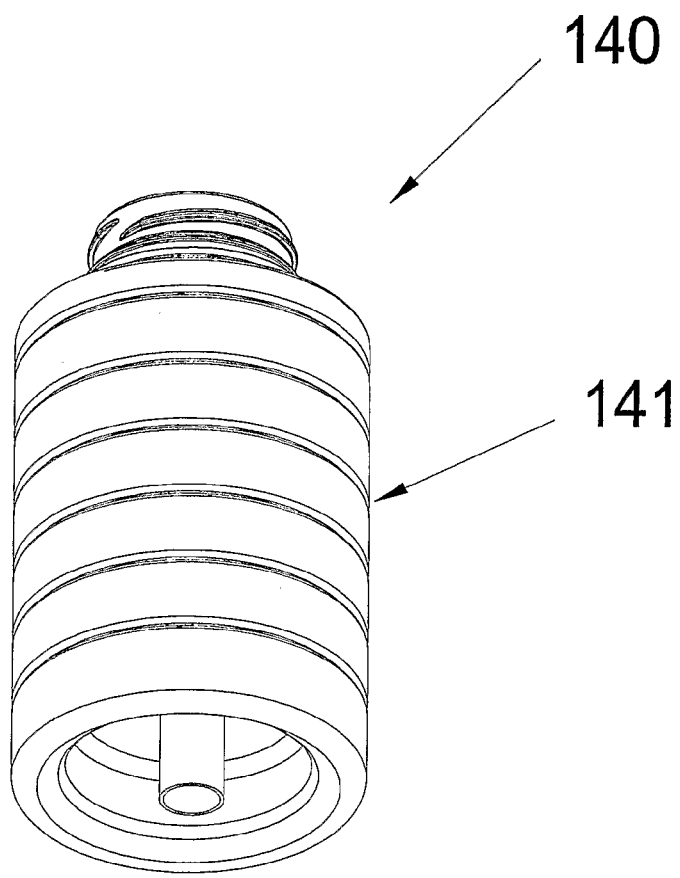
FIG. 46 shows a perspective view of the as-profiled product with a first open end and second open end as depicted in FIG. 44 following telescoping, concertinaing or collapsing.

Referring to FIG. 46, the telescoping, concertina or collapsible bottle with inverted bottom 140 of FIG. 45 is depicted in a reduced height configuration with all telescoping, concertina or collapsible sections now fully inwardly telescoped, concertina'd or collapsed 141 and the telescoping, concertina or collapsible bottle with concave bottom 140 is now at its minimum height for transit and storage.

The configuration of the bottle is such that the bottle is stable in the reduced height configuration; that is it is capable of maintaining the reduced height configuration in the absence of any external force. A simple pulling action of the base of the bottle away from the neck can restore the telescoped, concertina'd or collapsed bottle back to its original height prior to usage.

The substantially rigid and substantially solid fixture, which is not shown, may or may not be used during the deformation processes to assist with keeping the telescoping, concertina or collapsible bottle 135 substantially straight at all times. One or more external guides may additionally or alternatively be used.

The first open ends and second open ends of the as-profiled product or plurality of as-profiled products may remain with either or both of the first open ends and second open ends in their open state, or the one or both of the open ends may be closed by a subsequent process.

Figure 47:
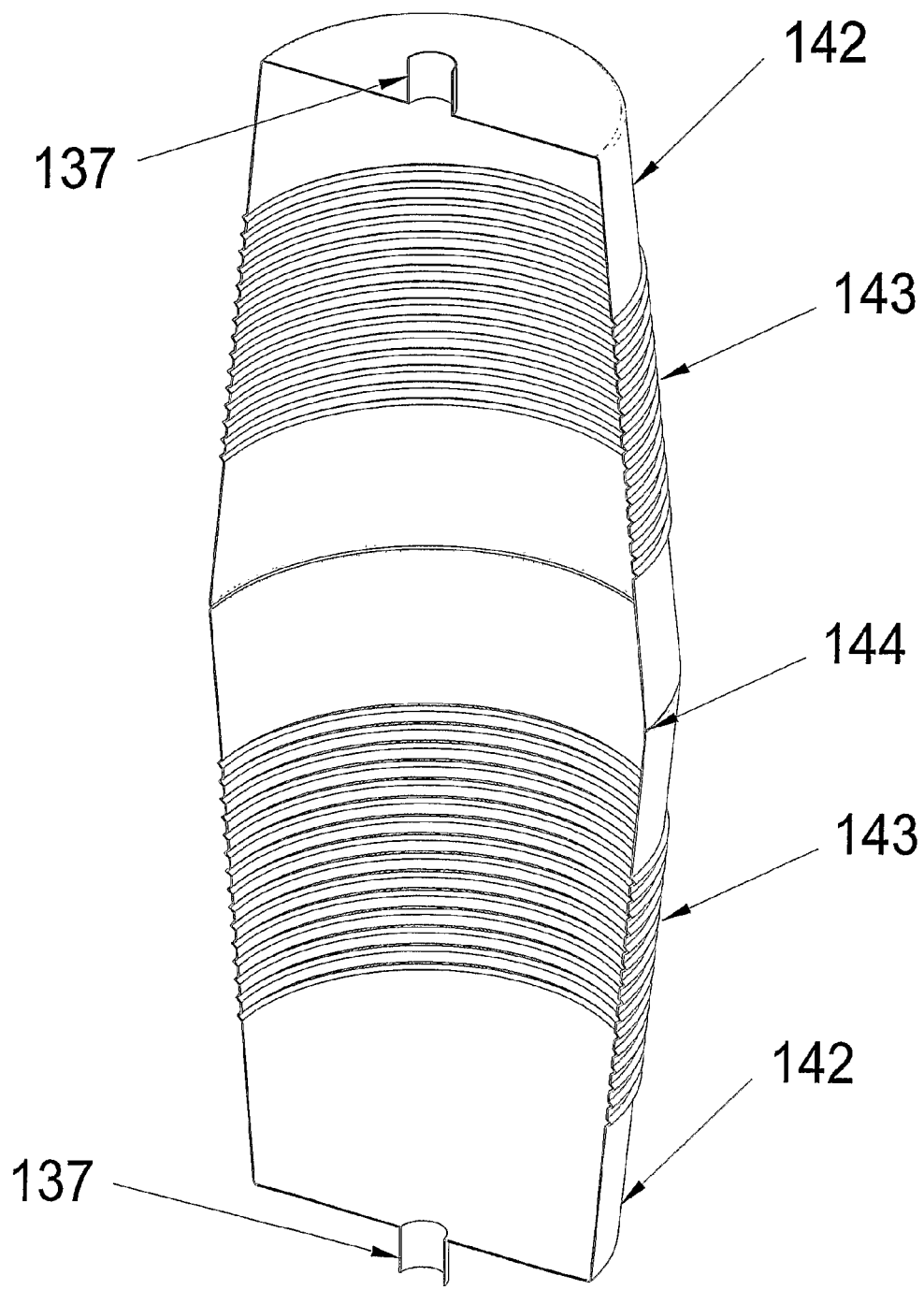
FIG. 47 shows a perspective cross-sectional view of an as-profiled product with a first open end and second open end in accordance with a fourteenth preferred embodiment of the present invention in the form of a single-walled drinking cup suitable for hot beverages, following removal from the mould and substantially rigid fixture.

Referring to FIG. 47, a fourteenth preferred embodiment as-profiled product is depicted in cross-sectional view wherein two single walled thermal barrier cups 142 have been formed. The two single walled thermal barrier cups 142 have pinch-sealing points 137, a cut point 144 to separate the two single walled thermal barrier cups 142 and protruding thermal ribs 143 that isolate the hot internal contents from the user's hands without the need for a separate thermal sleeve arrangement.

The first open ends and second open ends of the as-profiled product or plurality of as-profiled products may remain with either or both of the first open ends and second open ends in their open state, or the one or both of the open ends may be closed by a subsequent process. The first and second open ends may be trimmed as requited.

Figure 48:
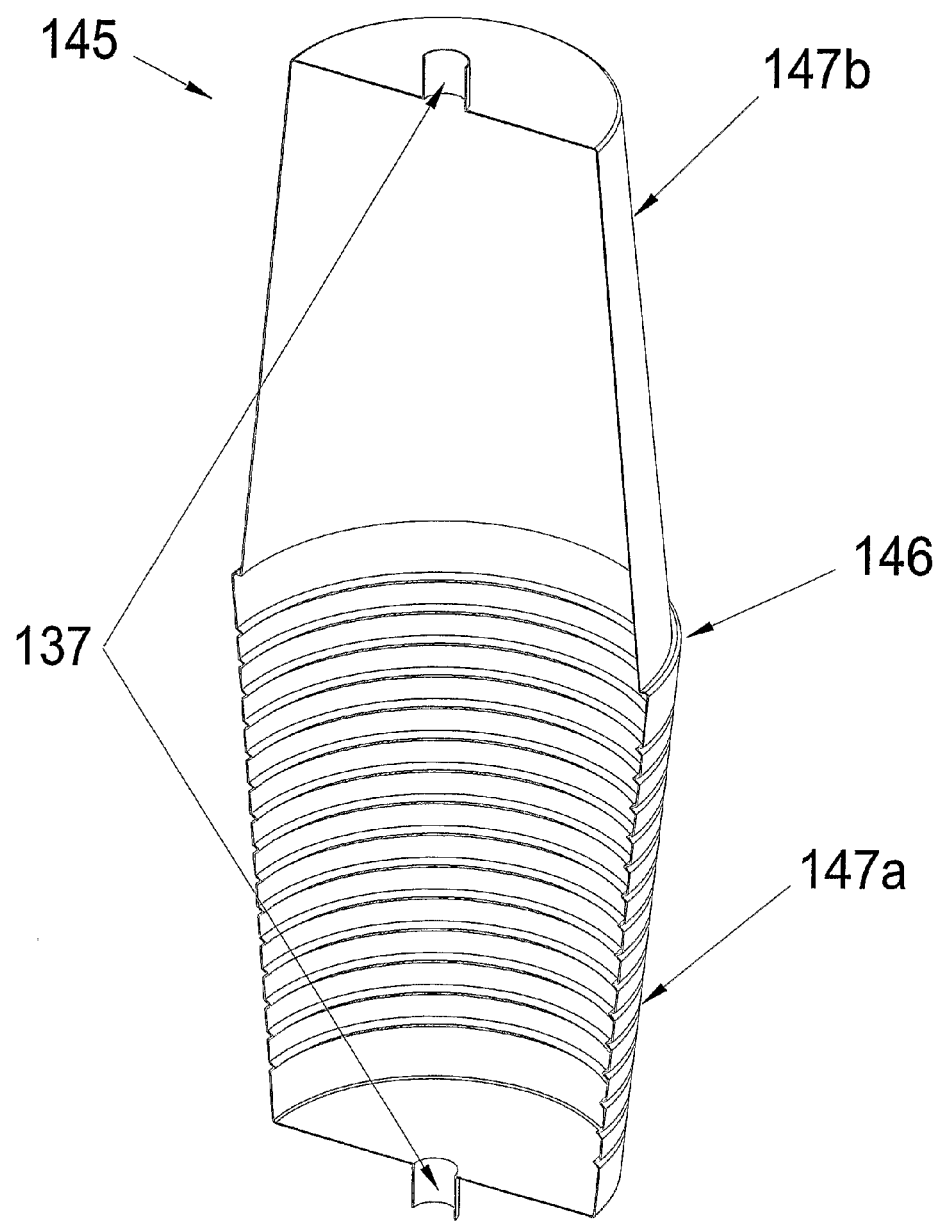
FIG. 48 shows a perspective cross-sectional view of an as-profiled product with a first open end and second open end in accordance with a fifteenth preferred embodiment of the present invention in the form of a double-walled drinking cup suitable for hot and cold beverages, following removal from the mould and substantially rigid fixture.

Referring to FIG. 48, a fifteenth preferred embodiment as-profiled product is depicted in cross-sectional view wherein a partially completed double walled thermal barrier cup 145 is been part-formed. The partially completed double walled thermal battier cup 145 has pinch-sealing points 137 and a transition region comprising an axis-fold point 146 between a first section 147a and a second section 147b. The second section 147b is invertible into the interior of the first section 147a, so that the second section 147b is positioned inside the first section 147a and is preferably at least partly spaced from the first section 147a. The second section thereby forms an inner layer of the cup and the first section forms an outer layer of the cup.

Figure 49:
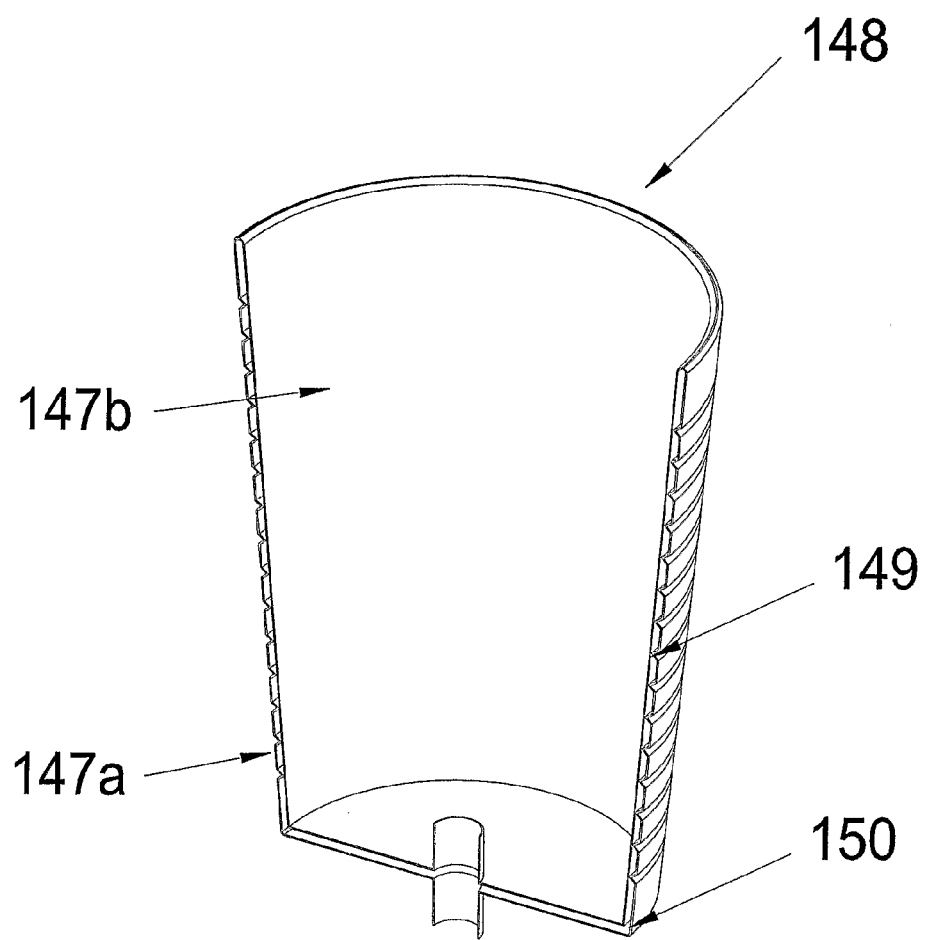
FIG. 49 shows a perspective cross-sectional view of the as-profiled product with a first open end and second open end as depicted in FIG. 48 following deformation into its final shape.

Referring to FIG. 49, the double walled thermal barrier cup 145 of FIG. 49 is depicted following the deformation of the second section 147b so it is positioned inside the first section 147a, thereby forming a double walled thermal barrier cup 148. The thermal ribs 149 serve to keep the two walls of the cup separate thereby creating a thermal barrier zone 150. The thermal ribs 149 can be in the inner wall, the outer wall, or in both the inner and outer walls or there can be no thermal ribs 149 in either wall. If the thermal ribs 149 are in both the inner and outer walls, then they can either align between the inner and outer walls, or be non-aligned.

The thermal barrier zone 150 serves to keep a user's hands isolated from the heat when used with hot beverages and serves as a condensation barrier when used with cold beverages.

The substantially rigid and substantially solid fixture, which is not shown, may or may not be used during the deformation processes to assist with keeping the double walled thermal barrier cup 145 substantially straight at all times. Additionally, or alternatively, one or more external guides may be used.

The first open ends and second open ends of the as-profiled product or plurality of as-profiled products may remain with either or both of the first open ends and second open ends in their open state, or one or both of the open ends may be closed by a subsequent process. The first and second open ends may be trimmed as required.

Figure 50:
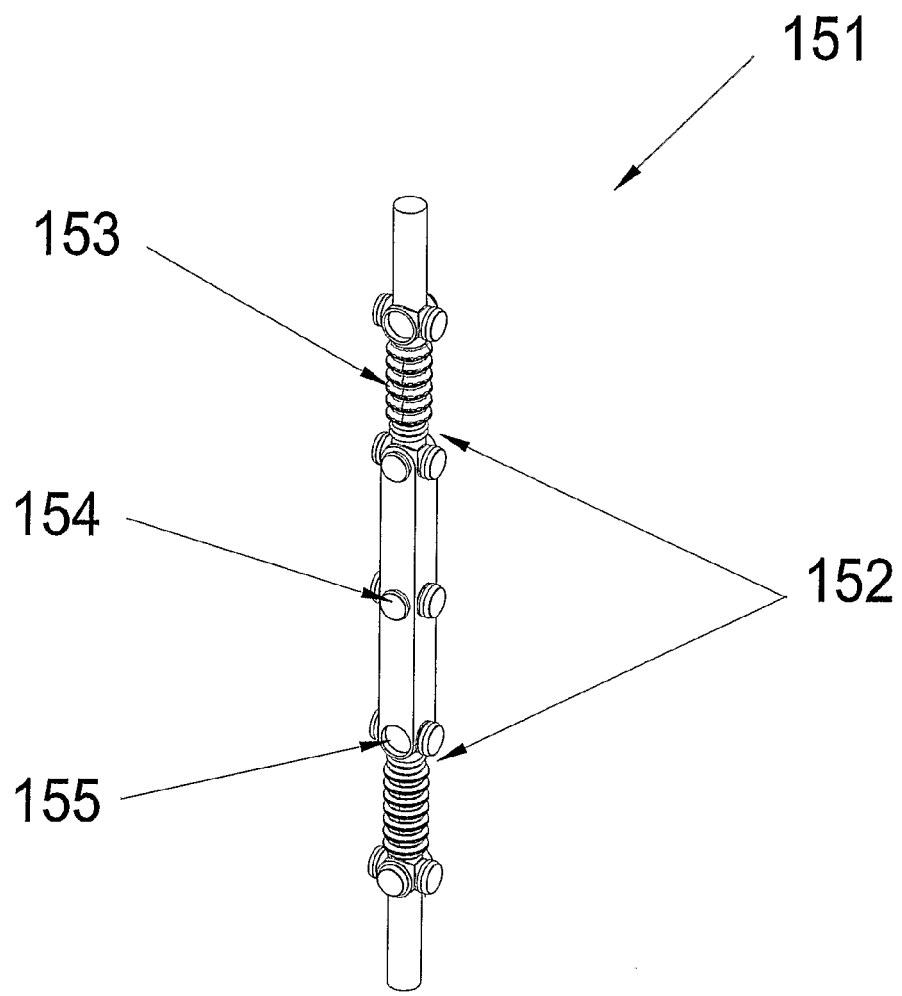
FIG. 50 shows a perspective view of an as-profiled product with a first open end and second open end in accordance with a sixteenth preferred embodiment of the present invention in the form of an as-profiled building block drinking straw that can be subsequently used as part of a building block set and also cut into further sub-component building block pieces.

Referring to FIG. 50, a sixteenth preferred embodiment as-profiled product is depicted in the form of an as-profiled building block drinking straw 151 with pre-defined cut zones 152 that allow the as-profiled building block drinking straw 151 to be either used as a building block piece in its full form and/or cut by a user into separate and smaller sub-component building block pieces.

The as-profiled building block drinking straw 151 may also have one or more flexible sections 153, one or more male attachment sections 154 and one or more female attachment sections 155, all of which enable one or more as-profiled building block drinking straws 151 to be attached to one another, or to other objects or items, to form alternate structures, shapes or forms. The components are sized such that the male attachment section is receivable and engageable in a female attachment section of another block.

Figure 51:
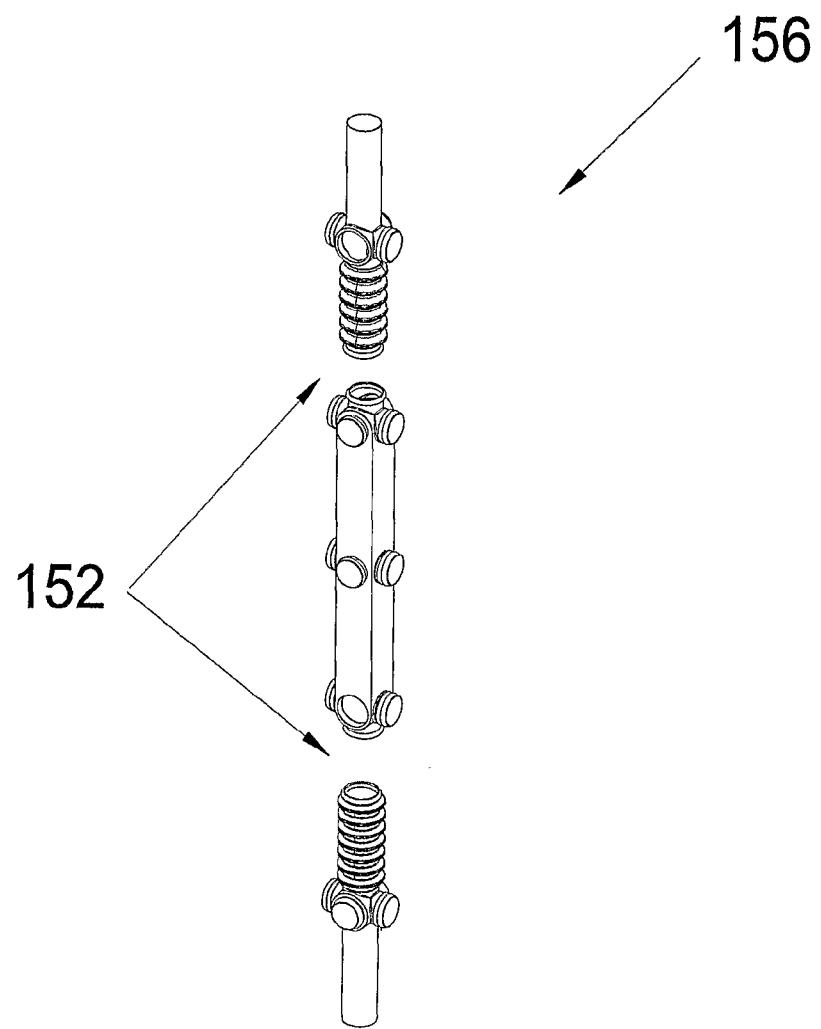
FIG. 51 shows a perspective view of the as-profiled building block drinking straw of FIG. 50 cut into separate sub-component pieces of a building block set.

Referring to FIG. 51, the as-profiled building block drinking straw 151 of FIG. 50 is depicted cut into separate and smaller sub-component building block pieces 156.

The concept of forming a pre-defined cut zone that a user can subsequently utilize to reduce any as-profile product into sub-components can be used in any as-profiled embodiment as disclosed, or in any other suitable as-profiled embodiment.

The predefined cut zone can be either protruding outwards or protruding inwards, or a combination of protruding outwards and protruding inwards.

Figure 52:
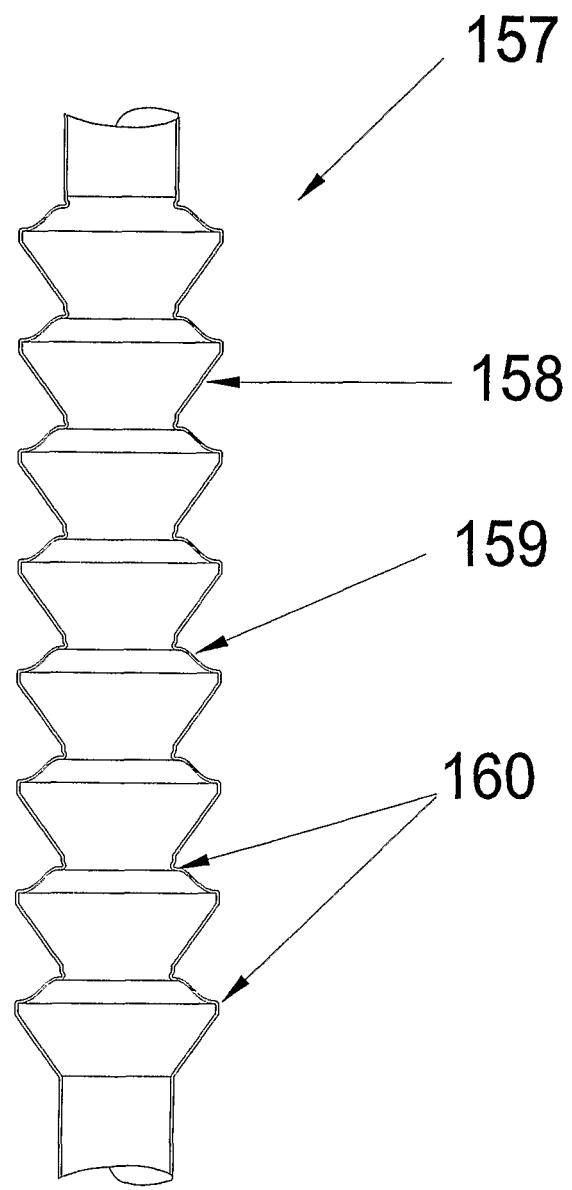
FIG. 52 shows a two-dimensional partial cross-section view of a first preferred embodiment flexible section profile of an as-profiled product in its as-formed and extended stated.

Referring to FIG. 52, a first preferred embodiment as-profiled flexible section profile of an as-profiled product is depicted in two-dimensional partial cross-section form. The as-profiled flexible section 157 is in the form of a saw-tooth arrangement comprising substantially straight low pitch-angled walls 158 adjacent to sinuous walls 159, with substantially perpendicular wall transitions 160 between each alternate wall. The as-profiled flexible section 157 is in its as-formed of extended state.

Figure 53:
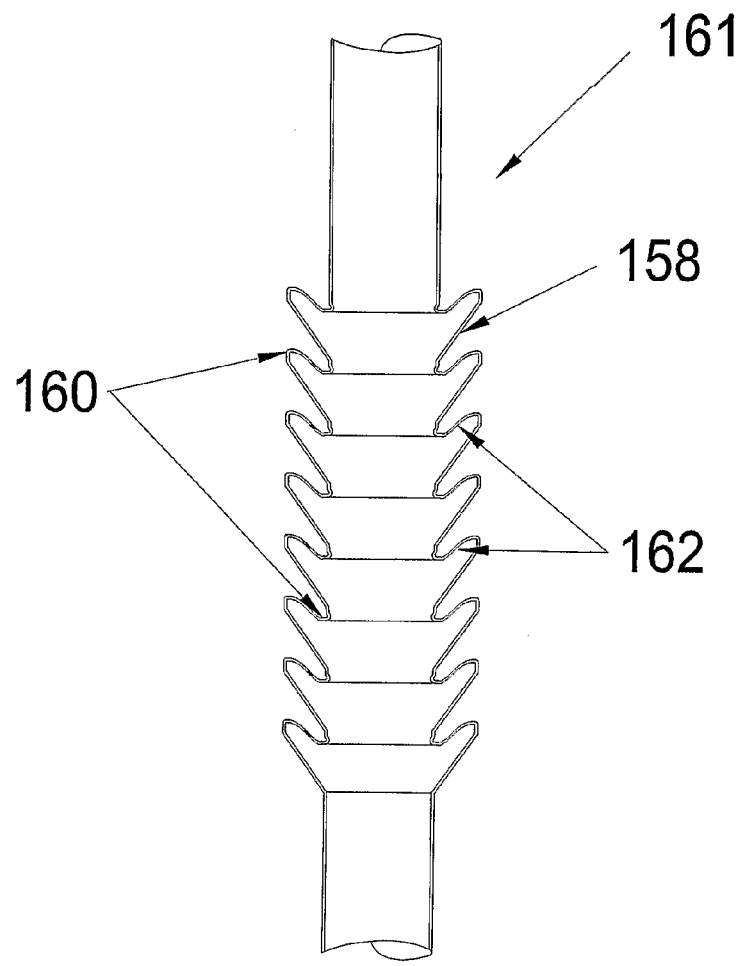
FIG. 53 shows the two-dimensional partial cross-section view of the flexible section profile of FIG. 52 in its fully flexed and retracted state.

Referring to FIG. 53, the as-profiled flexible section profile of an as-profiled product of FIG. 52 is depicted in its retracted state. The retracted as-profiled flexible section 161 occurs as a result of minimal if any angular displacement in the substantially perpendicular wall transitions 160 and minimal if any deformation in the substantially straight low pitch-angled walls 158, however the sinuous walls 159 of FIG. 52 have been inverted into inverted sinuous walls 162.

The inversion of the sinuous walls 159 into inverted sinuous walls 162 preferably occurs via a snap-action, and causes the as-profiled flexible section to telescope, concertina or collapse thereby provide a degree of flexibility, whilst requiring minimal if any plastic or elastic angular changes between the adjacent substantially straight low pitch-angled walls 158 and inverted sinuous walls 162.

The substantially rigid and substantially solid fixture, which is not shown, may or may not be used during the deformation processes to assist with keeping the retracted as-profiled flexible section 161 substantially straight at all times. Additionally, or alternatively, one or more external guides may be used.

The configuration shown in FIG. 52 and FIG. 53 can be used in any as-profiled product to provide selective reduction in size of the product.

The methods can be used to form any suitable profiled product that may be a final product or a component of a final product, such as those listed in the "Summary of the Invention" section.

The wall thickness of the starting tube will be chosen depending on the application. For applications such as profiled drinking straw production, the tube will preferably be small or thin-walled, typically in the range of about 0.1 mm to about 0.5 mm in wall thickness. For applications such as the production of oral care and cosmetic tubes or the production of bottles, cups, beakers and pottles and the like, the preferred wall thickness will be greater or thick-walled, typically in the range of about 0.5 mm or more in wall thickness.

The profiled product wall thickness will also be chosen depending on the application. For example, where the profiled product is a drinking straw having one or more three dimensional profile features, the wall thickness may be as thin as between about 0.1 mm and about 0.5 mm, and more preferably between about 0.1 mm and about 0.3 mm. For non-drinking straw applications such as bottles, tubes, and cups for example, the wall thickness of the product may about 0.35 mm or greater.

When increased pressure is applied to the interior of the tube to outwardly expand the tube into one or more products, the as-expanded wall thickness is a direct function of the initial wall thickness prior to expansion and the expansion ratio.

In the preferred form process, the temperatures, pressures and cycle times will typically vary dependant on the material being blow-formed as well as the wall thicknesses involved. Whatever the material being formed, the tube may be heated to its melt temperature or to a temperature in the range immediately below the melt temperature. The pressures applied in the preferred form blow-forming process are typically in the range of 100 psi to 500 psi.

Advantageously, the lowest forming temperature is used in conjunction with the highest pressure, primarily to reduce the time to heat the material to be profiled and thereby also reduce the cooling period after profiling.

In the preferred form process, preferably the lowest temperature suitable for profiling in conjunction with the highest pressure is chosen to ensure that the tube is always as far away from the melt temperature as possible for handling purposes.

When the tube is used in conjunction with a substantially solid and substantially rigid fixture, by keeping well away from the melt temperature, it is a straightforward process to also rotate the tube around the substantially solid and substantially rigid fixture during the heating process in order to ensure an even wall temperature is attained. This rotational action is best achieved when the tube is at the lowest temperature possible, so that the material has no tendency to stick.

Using polypropylene as an example, the preferred temperature would be in the range of about 120° C. to about 130° C. and the pressure in the range of about 250 psi to about 500 psi.

The cycle time is primarily dependent on the wall thicknesses involved and the degree of cooling in the mould. The preferred profiling cycle time is in the range of about 2 seconds to about 3 seconds, and the heating cycle time would vary depending on the wall thickness of the tube, but would likely be about 10 to about 30 seconds or more.

Temperatures, pressures and cycle times outside this range are also acceptable within the scope of this invention.

It will be apparent to those versed in the art following these examples that the processes as herein described to heat-form a tube with a first open end and second open end can be used to heat-form any tube with a first open end and second open end into any profile, any contour, any shape or any combination thereof where the profile, contour or shape is suitable for blow-moulding, using any number of fixture or support arrangements, any number of fixtures or supports per mould and producing any number of as-profiled tube-based products with a first open end and second open end per fixture or support.

The invention has been described by way of example only and with reference to possible embodiments thereof, and it will be appreciated that modifications may be made thereto without departing from the scope of the invention as defined by the appended claims. Example modifications and other features of preferred embodiments are discussed in the "Summary of the Invention" section.

As a further example, where single components such as a heating element has been described, multiple components could readily be used. Similarly, a plurality of pressure sources could be used.

Where in the foregoing description reference has been made to integers or components having known equivalents, then such equivalents are herein incorporated as if individually set forth.

At least preferred embodiments of the present invention provide maximum freedom relative to the possible profiles achievable in any tube with a first open end and second open end without compromising production speed, and provides a foundation for significantly increasing production speeds relative to existing equipment and processes. The preferred methods and apparatuses enable products to be made using significantly less material than existing methods and apparatuses, resulting in significant cost savings.

The invention claimed is:

1. A method of profiling a tube to form at least one profiled product having a first open end and a second open end, comprising the steps of
   providing a thin-walled tube having a thickness between about 0.1 mm and about 0.5 mm and having a first open end and a second open end;
   supporting the tube on a substantially solid support along the entire length of the tube corresponding to the length of the product to be formed, said support containing at least one flow pathway;
   heating at least a portion of the tube while the tube is supported on the substantially solid support to form at least one heat-softened portion of the tube; and
   applying a fluid pressure change to the heat-softened portion of the tube via said flow pathway to form a profiled region of the tube, the tube defining a profiled product having a first open end, a second open end, and a predetermined three dimensional profile region.

2. A method as claimed in claim 1, and further comprising the steps of forming a plurality of profiled products from the tube on the support and, following the forming of the products, separating the products from one another.

3. A method as claimed in claim 1, wherein the tube is profiled using one or more shaped exterior moulds which surround the tube, and wherein the tube is at least partly sealed by pinching at least one end of the tube between the support and the mould.

4. A method as claimed in claim 3, wherein the fluid pressure change is applied to the interior of the heat-softened portion of the tube.

5. A method of profiling a tube as claimed in claim 1, and further comprising the step of applying a fluid pressure change around the exterior of the heat-softened portion of the tube in one or more shaped moulds.

6. A method as claimed in claim 1, wherein the support maintains a longitudinal axis of the tube substantially straight when in the heated state.

7. A method as claimed in claim 1, wherein the support includes at least one aperture in communication with said flow pathway and through which fluid can be delivered to the interior of the tube, to increase pressure in the interior of the heat-softened portion of the tube.

8. A method as claimed in claim 1, wherein the support comprises at least first and second support parts and the method further comprises the steps of bringing the first support part into contact with the first open end of the tube to at least partly seal the first end of the tube and bringing the second support part into contact with the second open end of the tube to at least partly seal the second end of the tube prior to applying the fluid pressure change, said flow pathway being defined between said first and second support parts.

9. A method as claimed in claim 1, wherein the tube is heated by heating the support to maintain the tube at an elevated temperature as the pressure change is applied.

10. A method as claimed in claim 1, and further comprising the step of longitudinally compressing the tube to form a further profiled feature in the profiled product.

11. A method as claimed in claim 1, and further comprising the step of providing circumferential grooving in said tube wherein at least a portion of each profiled product is flexible.

12. A method as claimed in claim 1, wherein product is formed in one or more sections of the product integrally telescoping inside at least one other section of the product in order to reduce the length of the product during storage and transportation.

13. A method as claimed in claim 1, wherein the profiled product is a drinking straw having one or more three dimensional profile features.

14. A method as claimed in claim 1, wherein the profiled product is a bottle for holding a liquid.

15. A method as claimed in claim 1, wherein the profiled product is a cup for holding a liquid that has an integral heat and condensation barrier.

* * * * *